United States Patent
Takata et al.

(10) Patent No.: US 11,756,289 B2
(45) Date of Patent: Sep. 12, 2023

(54) INFORMATION PROCESSING APPARATUS, ARITHMETIC PROCESSING DEVICE, AND METHOD OF CONTROLLING INFORMATION PROCESSING APPARATUS

(71) Applicant: FUJITSU LIMITED, Kawasaki (JP)

(72) Inventors: Ryo Takata, Kawasaki (JP); Masanori Higeta, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 563 days.

(21) Appl. No.: 16/742,948

(22) Filed: Jan. 15, 2020

(65) Prior Publication Data
US 2020/0257498 A1 Aug. 13, 2020

(30) Foreign Application Priority Data
Feb. 8, 2019 (JP) .................................. 2019-021938

(51) Int. Cl.
*G06F 7/48* (2006.01)
*G06V 10/82* (2022.01)
(Continued)

(52) U.S. Cl.
CPC ............... *G06V 10/82* (2022.01); *G06F 7/48* (2013.01); *G06F 18/253* (2023.01); *G06N 3/02* (2013.01);
(Continued)

(58) Field of Classification Search
CPC ........ G06F 7/48; G06F 15/17; G06F 15/7807; G06K 9/629; G06K 9/6271; G06N 3/02;
(Continued)

(56) References Cited

U.S. PATENT DOCUMENTS 4,394,688 A * 7/1983 Iida ...................... H04N 5/202
382/254
4,688,095 A * 8/1987 Beg ...................... G06T 1/20
348/674
(Continued)

FOREIGN PATENT DOCUMENTS

EP        3346423 A1    7/2018
EP        3545436       10/2019
(Continued)

OTHER PUBLICATIONS

Radu, Valentin et al., "Multimodal Deep Learning for Activity and Context Recognition", Proceedings of the ACM on Interactive, Mobile, Wearable and Ubiquitous Technologies, ACM, 2 Penn Plaza, Suite 701 New York, NY 10121-0701, USA, vol. 1, No. 4, Jan. 8, 2018, pp. 1-27, XP058385555.
(Continued)

*Primary Examiner* — Solomon G Bezuayehu
(74) *Attorney, Agent, or Firm* — Fujitsu Patent Center

(57) ABSTRACT

An information processing apparatus includes: a first preprocessing arithmetic device configured to execute preprocessing for analog data from a first sensor; and a first post-processing arithmetic device connected to the first preprocessing arithmetic device and configured to execute post-processing for first preprocessed data, wherein the first preprocessing arithmetic device includes a first processor configured to: receive the analog data from the first sensor and convert the analog data into digital data; output feature data on the basis of a result of execution of feature extraction processing for the digital data; and output the feature data, and the first post-processing arithmetic device includes a second processor configured to: input the feature data; store the feature data in a first memory; and store, in the first
(Continued)

memory, recognition result data based on a result of execution of recognition processing for the feature data.

12 Claims, 51 Drawing Sheets

(51) Int. Cl.
    *G06N 3/02*     (2006.01)
    *G06N 5/04*     (2023.01)
    *G10L 25/51*     (2013.01)
    *G06F 18/25*     (2023.01)
    *G06V 10/764*     (2022.01)

(52) U.S. Cl.
    CPC .............. *G06N 5/04* (2013.01); *G06V 10/764* (2022.01); *G10L 25/51* (2013.01)

(58) Field of Classification Search
    CPC .......... G06N 5/04; G06N 3/0481; G06N 3/08; G06N 3/0454; G06N 3/0445; G06N 3/063; G06V 10/28; G06V 10/40; G06V 10/82; G10L 25/51
    See application file for complete search history.

(56) References Cited

U.S. PATENT DOCUMENTS

| | | | | |
|---|---|---|---|---|
| 5,127,063 | A * | 6/1992 | Nishiya | G06T 9/001 706/900 |
| 6,373,523 | B1 * | 4/2002 | Jang | H04N 9/04557 348/262 |
| 6,832,194 | B1 * | 12/2004 | Mozer | G10L 15/28 712/213 |
| 11,475,289 | B2 * | 10/2022 | Okanohara | G06N 3/08 |
| 2005/0069153 | A1 * | 3/2005 | Hall | H04S 7/307 381/103 |
| 2005/0151883 | A1 * | 7/2005 | Arai | G09G 3/20 348/E5.073 |
| 2006/0020464 | A1 * | 1/2006 | Ju | G10L 15/08 704/E15.044 |
| 2006/0224382 | A1 * | 10/2006 | Taneda | G10L 25/78 704/E11.003 |
| 2007/0244842 | A1 | 10/2007 | Ishii et al. | |
| 2008/0021352 | A1 * | 1/2008 | Keegan | A61B 5/1121 600/595 |
| 2008/0167871 | A1 * | 7/2008 | Kim | G10L 15/22 704/E15.04 |
| 2013/0057394 | A1 * | 3/2013 | Andiappan | H04M 1/72454 340/10.51 |
| 2013/0262539 | A1 * | 10/2013 | Wegener | G06F 7/483 708/203 |
| 2014/0257813 | A1 * | 9/2014 | Mortensen | G10L 15/02 704/251 |
| 2016/0171049 | A1 * | 6/2016 | Hill | G06F 16/24544 707/714 |
| 2016/0217795 | A1 * | 7/2016 | Lee | G10L 17/24 |
| 2016/0300566 | A1 * | 10/2016 | Hofer | G10L 15/08 |
| 2017/0169814 | A1 * | 6/2017 | Pashine | G10L 15/06 |
| 2017/0300776 | A1 | 10/2017 | Yamamoto et al. | |
| 2018/0121800 | A1 * | 5/2018 | Kanda | G06N 3/04 |
| 2018/0137691 | A1 | 5/2018 | Satou | |
| 2018/0181867 | A1 | 6/2018 | Seibold et al. | |
| 2018/0189650 | A1 | 7/2018 | Wang et al. | |
| 2018/0350351 | A1 * | 12/2018 | Kopys | G06N 3/0445 |
| 2019/0025773 | A1 | 1/2019 | Yang et al. | |
| 2019/0102678 | A1 * | 4/2019 | Chang | G06K 9/6277 |
| 2019/0147304 | A1 * | 5/2019 | Liu | G06N 3/0454 382/157 |
| 2020/0160151 | A1 * | 5/2020 | Urtasun | G06V 10/454 |
| 2020/0387794 | A1 * | 12/2020 | Baker | G06N 5/046 |

FOREIGN PATENT DOCUMENTS

| | | |
|---|---|---|
| JP | 9-80034 A | 3/1997 |
| JP | 2005-141591 A | 6/2005 |
| JP | 2005-346472 | 12/2005 |
| JP | 2006-203900 A | 8/2006 |
| JP | 2017-191458 | 10/2017 |
| JP | 2018-77779 A | 5/2018 |
| JP | 2018-109947 | 7/2018 |
| JP | 2018-129033 | 8/2018 |
| KR | 10-2018-0080098 A | 7/2018 |

OTHER PUBLICATIONS

Ordonez, Francisco Javier et al., "Deep Convolutional and LSTM Recurrent Neural Networks for Multimodal Wearable Activity Recognition", Sensors, vol. 16, No. 1, Jan. 18, 2016, 25 pages, XP055368352.

Liu, Zuozhu et al., "Deep Fusion of Heterogeneous Sensor Data", 2017 IEEE Internation Conference on Acoustics, Speech and Signal Processing (ICASSP), IEEE, Mar. 5, 2017, pp. 5965-5969, XP033259555.

Extended European Search Report dated Oct. 2, 2020 for corresponding European Patent Application No. 20151931.1, 8 pages.

Japanese Office Action dated Oct. 4, 2022 for corresponding Japanese Patent Application No. 2019-021938, with English Translation, 10 pages.

Chinese Office Action dated Mar. 14, 2023 for corresponding Chinese Patent Application No. 202010080583.9, with English Translation, 17 pages. *Please note NPL "Multimodal Deep Learning for Activity and Context Recognition," cited herewith, was previously cited in an IDS filed on Dec. 4, 2020*.

* cited by examiner

FIG. 12

| mode_i[2:0] | DATA REPRESENTATION OF data_i[31:0] | DATA REPRESENTATION OF data_o[31:0] |
|---|---|---|
| 0 (MODE 0, FP16 → FP32) | UPPER 16 BITS : FP16, LOWER 16 BITS : FP16 | FP32, FP32 |
| 1 (MODE 1, INT16 → FP32) | UPPER 16 BITS : FP16, LOWER 16 BITS : FP16 | FP32, FP32 |
| 2 (MODE 2, FP32 → FP32) | FP32 | FP32 |
| 3 (MODE 3, FP32 → FP16) | FP32 | FP16 (UPPER 16 BITS=0) |
| 4 (MODE 4, FP32 → INT16) | FP32 | INT16 (UPPER 16 BITS=0) |

FIG. 17

| SENSOR SoC | NUMBER OF DATA GENERATED BY ARITHMETIC CORE | NUMBER OF DATA OUTPUT BY SENSOR SoC |
|---|---|---|
| 20A (IMAGE DATA) | 2048 | 1024 |
| 20B (SOUND DATA) | 1024 | 1024 |
| TOTAL NUMBER OF DATA | 3072 | 2048 |

FIG. 23

| VALUE OF FEATURE DATA BEFORE COMPRESSION | | |
|---|---|---|
| OFFSET | INDEX | FEATURE DATA |
| 0 | x[0] | -0.823501 |
| 1 | x[1] | -6.032104 |
| 2 | x[2] | 1.564544 |
| 3 | x[3] | 3.329223 |
| 4 | x[4] | -4.544921 |
| 5 | x[5] | 0.716925 |
| 6 | x[6] | 7.480957 |
| 7 | x[7] | 2.928955 |
| 0 | x[8] | 17.642089 |
| 1 | x[9] | -2.17395 |
| 2 | x[10] | 1.895324 |
| 3 | x[11] | 0.635215 |
| 4 | x[12] | -3.830688 |
| 5 | x[13] | 0.579795 |
| 6 | x[14] | |
| 7 | x[15] | |

| VALUE OF FEATURE DATA AFTER COMPRESSION | | |
|---|---|---|
| INDEX | FEATURE DATA | |
| xsprs[0] | -0.823501 | 0 |
| xsprs[1] | -6.032104 | 1 |
| xsprs[2] | -4.544921 | 4 |
| xsprs[3] | 7.480957 | 6 |
| xsprs[4] | 17.642089 | 0 |
| xsprs[5] | -2.17395 | 1 |
| xsprs[6] | 1.895324 | 2 |
| xsprs[7] | -3.830688 | 4 |

| WEIGHT INDEX | WEIGHT W |
|---|---|
| w[0] | 0.564633 |
| w[1] | -0.055207 |
| w[2] | 0.869898 |
| w[3] | 0.214598 |
| w[4] | -0.673973 |
| ⋮ | ⋮ |
| w[2045] | 0.020977 |
| w[2046] | 0.058897 |
| w[2047] | 0.404476 |

FIG. 27

VALUE OF FEATURE DATA BEFORE DECODING

| INDEX | FEATURE DATA | OFFSET |
|---|---|---|
| xsprs[0] | -0.823501 | 0 |
| xsprs[1] | -6.032104 | 1 |
| xsprs[2] | -4.544921 | 4 |
| xsprs[3] | 7.480957 | 6 |
| xsprs[4] | 17.642089 | 0 |
| xsprs[5] | -2.17395 | 1 |
| xsprs[6] | 1.895324 | 2 |
| xsprs[7] | -3.830688 | 4 |

VALUE OF FEATURE DATA AFTER DECODING

| INDEX | FEATURE DATA | OFFSET |
|---|---|---|
| x[0] | -0.823501 | 0 |
| x[1] | -6.032104 | 1 |
| x[2] | CONSTANT Z | 2 |
| x[3] | CONSTANT Z | 3 |
| x[4] | -4.544921 | 4 |
| x[5] | CONSTANT Z | 5 |
| x[6] | 7.480957 | 6 |
| x[7] | 2.928955 | 7 |
| x[8] | 17.642089 | 0 |
| x[9] | -2.17395 | 1 |
| x[10] | 1.895324 | 2 |
| x[11] | CONSTANT Z | 3 |
| x[12] | -3.830688 | 4 |
| x[13] | CONSTANT Z | 5 |
| x[14] | CONSTANT Z | 6 |
| x[15] | CONSTANT Z | 7 |

FIG. 31

| SENSOR SoC | NUMBER OF DATA GENERATED BY ARITHMETIC CORE | NUMBER OF DATA OUTPUT BY SENSOR SoC |
|---|---|---|
| 20A (IMAGE DATA) | 2048 | 512 |
| 20B (SOUND DATA) | 1024 | 512 |
| 20C (DIGITAL MOTION DATA) | 1024 | 1024 |
| TOTAL NUMBER OF DATA | 4096 | 2048 |

FIG. 38

VALUE OF FEATURE DATA AFTER COMPRESSION

| INDEX | FEATURE DATA | OFFSET |
|---|---|---|
| xsprs[0] | -6.032104 | 1 |
| xsprs[1] | -6.032104 | 3 |
| xsprs[2] | -4.544921 | 4 |
| xsprs[3] | 7.480957 | 6 |
| xsprs[4] | 17.642089 | 0 |
| xsprs[5] | -2.17395 | 1 |
| xsprs[6] | 1.895324 | 2 |
| xsprs[7] | -3.830688 | 4 |

VALUE OF FEATURE DATA BEFORE COMPRESSION

| OFFSET | INDEX | FEATURE DATA |
|---|---|---|
| 0 | x[0] | -0.823501 |
| 1 | x[1] | -6.032104 |
| 2 | x[2] | 1.564544 |
| 3 | x[3] | 3.329223 |
| 4 | x[4] | -4.544921 |
| 5 | x[5] | 0.716925 |
| 6 | x[6] | 7.480957 |
| 7 | x[7] | 2.928955 |
| 0 | x[8] | 17.642089 |
| 1 | x[9] | -2.17395 |
| 2 | x[10] | 1.895324 |
| 3 | x[11] | 0.635215 |
| 4 | x[12] | -3.830688 |
| 5 | x[13] | 0.5789795 |
| 6 | x[14] | |
| 7 | x[15] | |

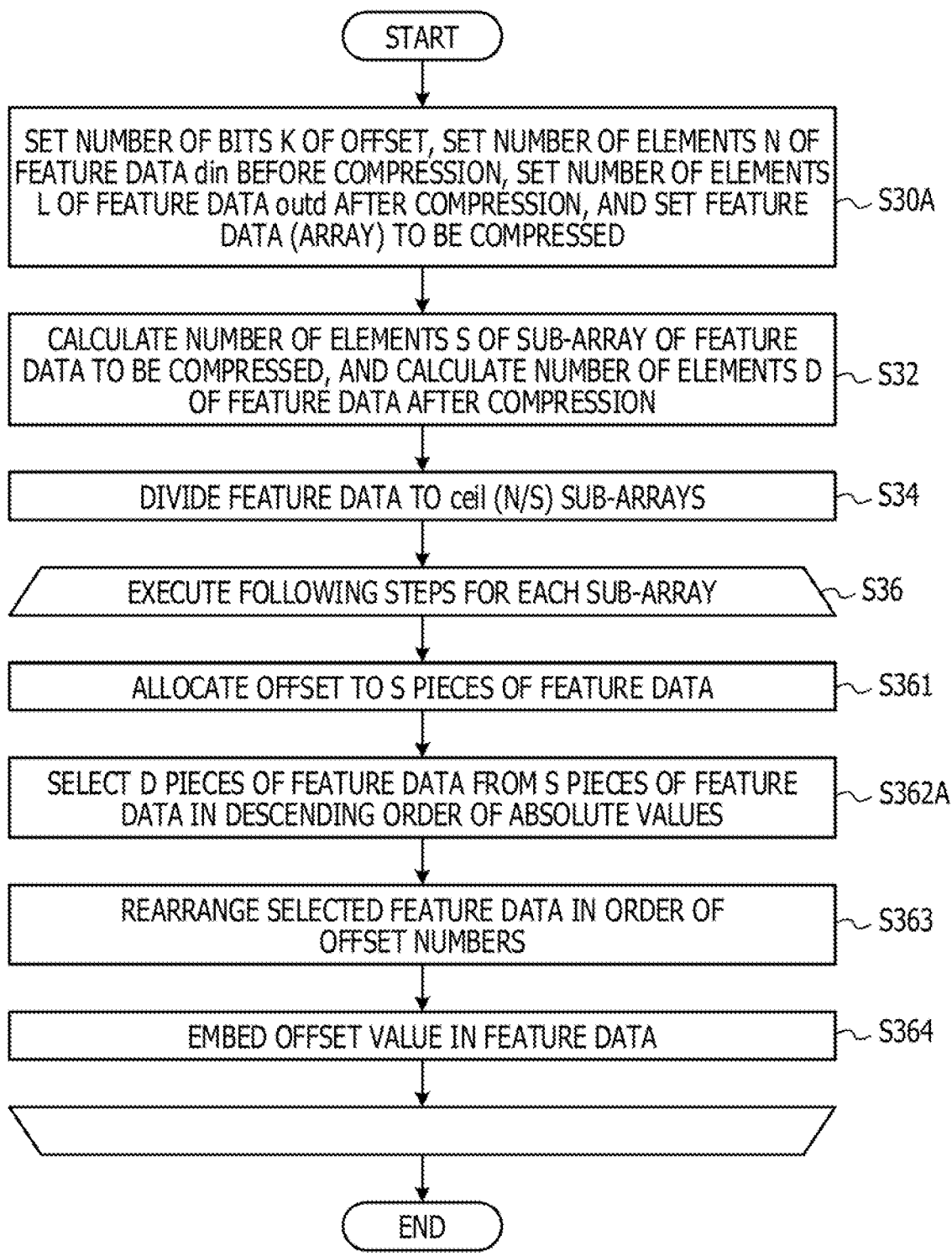

INFORMATION PROCESSING APPARATUS, ARITHMETIC PROCESSING DEVICE, AND METHOD OF CONTROLLING INFORMATION PROCESSING APPARATUS

CROSS-REFERENCE TO RELATED APPLICATION

This application is based upon and claims the benefit of priority of the prior Japanese Patent Application No. 2019-21938, filed on Feb. 8, 2019, the entire contents of which are incorporated herein by reference.

FIELD

The embodiments discussed herein are related to an information processing apparatus, an arithmetic processing device, and a method of controlling an information processing apparatus.

BACKGROUND

In a neural network such as a deep neural network (hereinafter also referred to as DNN), each of a plurality of neurons included in each layer is connected to a plurality of neurons included in other layers, and each neuron executes a product-sum operation or the like. [0003] Japanese aid-open Patent Publication No. 2018-129033, Japanese Laid-open Patent Publication No, 2018-109947, Japanese Laid-open Patent Publication No. 2005-346472, and Japanese Laid-open Patent Publication No. 2017-191458 are disclosed as related art.

SUMMARY

According to an aspect of the embodiments, an information processing apparatus includes: a first preprocessing arithmetic device configured to execute preprocessing for analog data from a first sensor; and a first post-processing arithmetic device connected to the first preprocessing arithmetic device and configured to execute post-processing for first preprocessed data output by the first preprocessing arithmetic device, wherein the first preprocessing arithmetic device includes a first processor configured to: receive the analog data from the first sensor and convert the analog data into digital data; output feature data on the basis of a result of execution of feature extraction processing for the digital data; and output the feature data, and the first post-processing arithmetic device includes a second processor configured to: input the feature data; store the feature data in a first memory; and store, in the first memory, recognition result data based on a result of execution of recognition processing for the feature data.

The object and advantages of the invention will be realized and attained by means of the elements and combinations particularly pointed out in the claims.

It is to be understood that both the foregoing general description and the following detailed description are exemplary and explanatory and are not restrictive of the invention.

In one aspect, the embodiments are able to suppress a decrease in processing performance of inference processing of a neural network regardless of a type of a sensor to be used.

BRIEF DESCRIPTION OF DRAWINGS

FIG. 12 is a diagram illustrating an example of a data type conversion specification by a type conversion unit in FIG. 11;

FIG. 17 is a diagram illustrating an example of the number of pieces of feature data output for each operation cycle in which a sensor SoC in FIG. 16 extracts the feature data;

FIG. 23 is a diagram illustrating an example of a compression operation by a compression unit in FIG. 18;

FIG. 26 is a diagram illustrating an example of a weight ma stored by a memory connected to an edge SoC in FIG. 16;

FIG. 27 is a diagram illustrating an example of a decoding operation by the sparse matrix arithmetic unit in FIG. 25;

FIG. 31 is a diagram illustrating an example of the size of feature data output for each operation cycle in which a sensor SoC in FIG. 30 extracts the feature data;

FIG. 38 is a diagram illustrating an example of a compression operation by a compression unit in FIG. 35;

FIG. 39 is a diagram illustrating an example of an operation flow of the compression operation by the compression unit in FIG. 35;

DESCRIPTION OF EMBODIMENTS

For example, to reduce the calculation amount, some of the neurons included in the neural network are removed or a dimension of a parameter matrix is reduced. Alternatively, to reduce the calculation amount, in a case where an output value of a neuron of a layer for detecting a feature is equal to or less than a predetermined threshold value, the output value is not stored in a memory, and 0 is used instead of the output value not stored in the memory in the next layer operation. Furthermore, processing efficiency is improved by executing processing in which a parameter amount is smaller than an input data amount and processing in which the parameter amount is larger than the input data amount by processing devices having different memory capacities, respectively.

For example, in a multimodal DNN inference system for respectively extracting features of data measured by a plurality of types of sensors and obtaining recognition results on the basis of the extracted features, an arithmetic processing device (semiconductor chip) with optimized architecture is designed and implemented in the system. Meanwhile, in a case of executing inference processing based on data measured by another type of sensor different from the plurality of types of sensors, using an arithmetic processing device with architecture optimized for a predetermined multimodal DNN inference system, the arithmetic processing device is not optimized for architecture for the another type of sensor, and thus processing performance may deteriorate. To suppress a decrease in the processing performance, an arithmetic processing device with architecture optimized for the another type of sensor needs to be used. In this case, the system cost increases and the time to provide the multimodal DNN inference system to a user increases.

In one aspect, a decrease in processing performance of inference processing of a neural network may be suppressed regardless of a type of a sensor to be used.

Hereinafter, embodiments ill be described with reference to the drawings.

Figure 1:
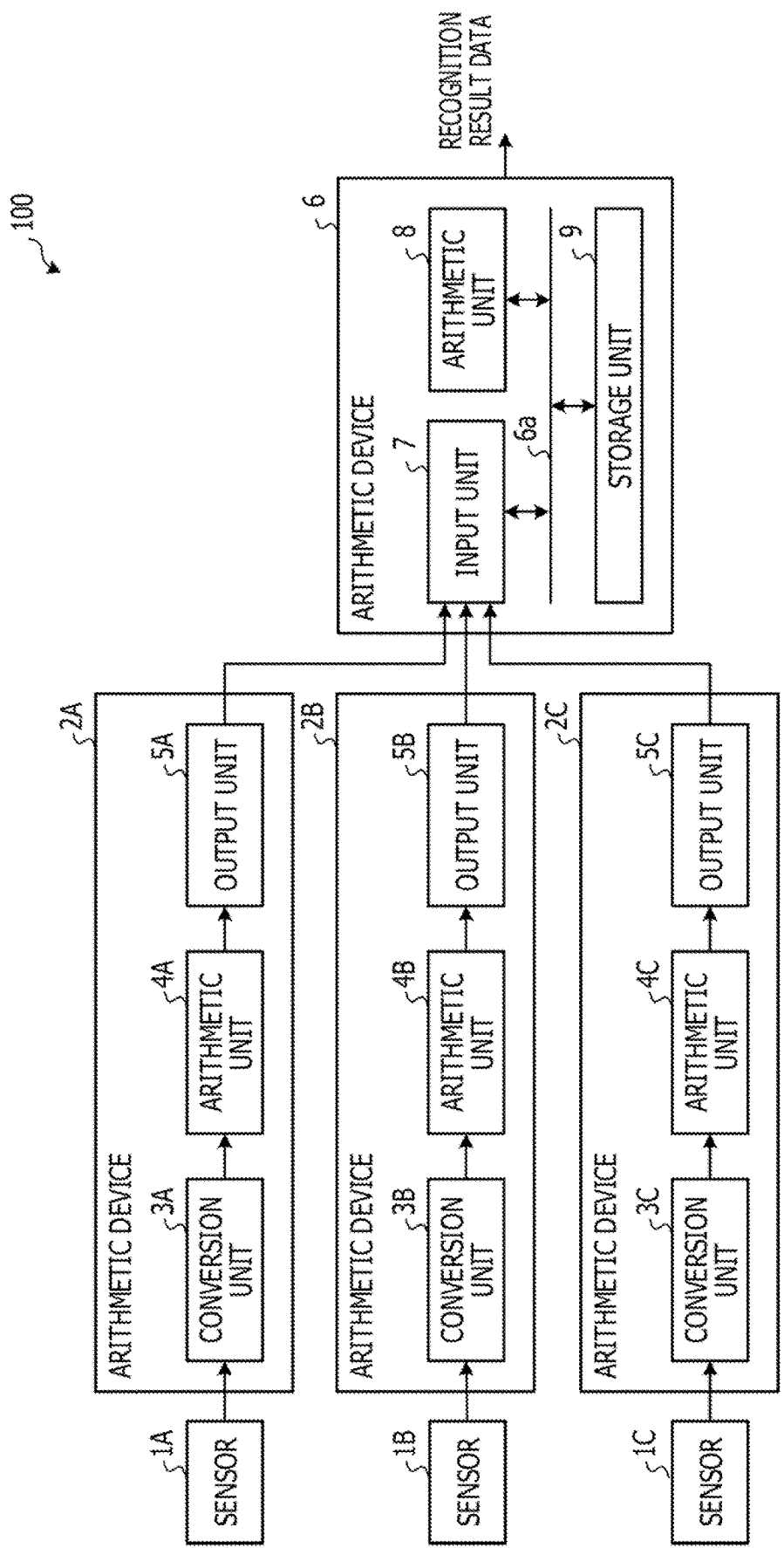
FIG. 1 is a diagram illustrating an example of an information processing apparatus according to an embodiment.

FIG. 1 illustrates an example of an information processing apparatus according to an embodiment. An information processing apparatus 100 illustrated in FIG. 1 includes a plurality of arithmetic devices 2 (2A, 2B, and 2C) and an arithmetic device 6, and executes multimodal deep neural network (DNN) inference processing. The arithmetic device 2A, 2B, or 2C is an example of a first preprocessing arithmetic device, and the arithmetic device 6 is an example of a first post-processing arithmetic device and an arithmetic processing device.

The arithmetic device 2A includes a conversion unit 3A, an arithmetic unit 4A, and an output unit 5A. The arithmetic device 2B includes a conversion unit 3B, an arithmetic unit 4B, and an output unit 56. The arithmetic device 2C includes a conversion unit 3C, an arithmetic unit 4C, and an output unit 5C. The conversion unit 3 (3A, 3B, or 3C) is an example of a first conversion unit, and the arithmetic unit 4 (4A, 48, or 4C) is an example of a first preprocessing arithmetic unit. The output unit 5 (5A, 5B, or 5C) is an example of a first output unit. For example, each of the arithmetic devices 2A, 2B, and 2C has a form of a semiconductor chip or a semiconductor package.

The conversion unit 3A converts data input from a sensor 1A connected to the arithmetic device 2A into data processable by the arithmetic unit 4A. The arithmetic unit 4A executes processing of extracting a feature of the data converted by the conversion unit 3A, and outputs feature data as an execution result. The arithmetic unit 4A has optimized architecture in order to extract the feature of data measured by the sensor 1A. The output unit 5A outputs the feature data output from the arithmetic unit 4A to the arithmetic device 6.

The conversion unit 36 converts data input from a sensor 1B connected to the arithmetic device 2B into data processable by the arithmetic unit 48. The arithmetic unit 48 executes processing of extracting a feature of the data converted by the conversion unit 3B, and outputs feature data as an execution result. The arithmetic unit 48 has optimized architecture in order to extract the feature of data measured by the sensor 1B. The output unit 5B outputs the feature data output from the arithmetic unit 48 to the arithmetic device 6.

The conversion unit 3C converts data input from a sensor 1C connected to the arithmetic device 2C into data processable by the arithmetic unit 4C. The arithmetic unit 4C executes processing of extracting a feature of the data converted by the conversion unit 3C, and outputs feature data as an execution result. The arithmetic unit 4C has optimized architecture in order to extract the feature of data measured by the sensor 1C. The output unit 5C outputs the feature data output from the arithmetic unit 4C to the arithmetic device 6.

Hereinafter, in a case of illustrating the sensors 1A, 1B, and 1C without distinction, the sensors 1A, 1B, and 1C are also referred to as sensors 1. The sensor 1A, 1B, or 1C is an example of a first sensor. For example, the sensor 1A is an image sensor, and the arithmetic device 2A has a function to extract a feature of image data output from the image sensor. For example, the sensor 1B is a sound sensor, and the arithmetic device 2B has a function to extract a feature of sound data output from the sound sensor. For example, the sensor 1C is a motion sensor, and the arithmetic device 2C has a function to extract a feature of motion data output from the motion sensor.

As described above, the types of the sensors 1A, 18, and 1C are different from one another, and data formats and data amounts output from the sensors 1A, 1B, and 1C are different from one another. Furthermore, the type (for example, the image sensor) of the sensor 1A connected to the arithmetic device 2A is determined in advance. The type (for example, the sound sensor) of the sensor 18 connected to the arithmetic device 28 is determined in advance. The type (for example, the motion sensor) of the sensor 1C connected to the arithmetic device 2C is determined in advance. For example, the arithmetic device 2 is determined for each type of the sensor 1.

For example, in a case of executing inference processing by a neural network, each conversion unit 3 sequentially converts data input from each sensor 1 in a predetermined cycle. Each arithmetic unit 4 sequentially executes feature extraction processing of extracting the feature of the data input from each conversion unit 3 to generate the feature data. Then, each output unit 5 outputs the feature data received from each conversion unit 3 to an input unit 7 of the arithmetic device 6.

For example, processing of self-localization of a mobile terminal such as a smartphone is able to be realized by the neural network by using the data acquired from the image sensor and the motion sensor. Furthermore, processing of estimating a current position (absolute coordinates) of the mobile terminal or an orientation (posture) in which the mobile terminal is directed is able to be realized by the neural network from how a landmark looks and acceleration information. Moreover, highly accurate sound recognition is able to be realized by executing sound recognition by movement of lips of a speaker detected from a moving image in addition to sound recognition by the sound data, by using the data acquired from the image sensor and the sound sensor.

The arithmetic device 6 includes the input unit 7, an arithmetic unit 8, and a storage unit 9 connected to one another via a bus 6a. The input unit 7 and the arithmetic unit 8 may be included in one semiconductor chip or one semiconductor package, or may be arranged on a system board such as a printed board. The storage unit 9 may be arranged on the system board as a memory module. The input unit 7 is an example of a first input unit. The arithmetic unit 8 is an example of a first post-processing arithmetic unit. The storage unit 9 is an example of a first storage unit.

The input unit 7 causes the storage unit 9 to store the input feature data every time the feature data is input from the arithmetic devices 2A, 2B, and 2C. In the example illustrated in FIG. 1, the input unit 7 includes a plurality of input ports for inputting the feature data from the arithmetic devices 2A, 2B, and 2C, respectively. The feature data from the arithmetic devices 2A, 2B, and 2C may be input via a selector (not illustrated).

The arithmetic unit 8 executes the inference processing based on the data measured by each sensor using a plurality of types of feature data stored in the storage unit 9, and causes the storage unit 9 to store recognition result data as the execution result of the inference processing. Thereafter, the recognition result data stored in the storage unit 9 is used for executing various types of processing and various services by an application program executed by a processor such as a central processing unit (CPU) included in the arithmetic device 6. The various types of processing are processing for controlling a control device such as an actuator connected to the information processing apparatus 100, for example. The CPU that executes the application program may be included in the arithmetic unit 8.

In the information processing apparatus 100 illustrated in FIG. 1, an arbitrary number of arithmetic devices 2 can be connected to the arithmetic device 6, the number being equal to or less than a maximum connectable number. To connect an arbitrary arithmetic device 2 to the input unit 7, each arithmetic device 2 and the arithmetic device 6 are connected by a common interface specification. With the common interface specification, the information processing apparatus 100 can execute the inference processing by connecting various sensors 1 to the common arithmetic device 6 via the arithmetic devices 2. For example, the information processing apparatus 100 can execute various types of inference processing using one type of arithmetic device 6.

Note that the order and number of the arithmetic devices 2A, 2B, and 2C connected to the input unit 7 are not limited to the example illustrated in FIG. 1. For example, only the arithmetic device 2A corresponding to the sensor 1A may be connected to the arithmetic device 6. Furthermore, the arithmetic devices 2A and 2C corresponding to the sensors 1A and 1C may be connected to the arithmetic device 6. Moreover, four or more arithmetic devices 2 corresponding to four or more types of sensors 1 may be connected to the arithmetic device 6. In this case, the input unit 7 of the arithmetic device 6 has four or more input ports. For example, the information processing apparatus 100 may extract feature data using data output from sensors other than the sensors 1A, 1B, and 1C, and execute feature data recognition processing. In this case, for example, a pressure sensor, a temperature sensor, an optical sensor, or the like may be used instead of the sensor 1C that is the motion sensor, and an arithmetic device that extracts the feature data of data output from the sensor to be used is connected to the arithmetic device 6, instead of the arithmetic device 2C.

The information processing apparatus 100 can execute the inference processing by the neural network by connecting the arithmetic device 2 including the arithmetic unit 4 with architecture optimized for each type of the sensor 1 to the common arithmetic device 6. Therefore, extraction of the feature data by each arithmetic device 2 can be executed without degrading processing performance. Note that the performance (processing time) of the recognition processing using the feature data varies depending on the size of the feature data, but does not depend on the type of the sensor 1. Therefore, the arithmetic device 6 can be designed specifically for the recognition processing using feature data, and the architecture can be optimized even in a case where the arithmetic device 6 is shared by a plurality of types of arithmetic devices 2.

As described above, in the embodiment illustrated in FIG. 1, the processing of extracting the feature data from the data acquired by each of the plurality of types of sensors 1, and the processing of recognizing information detected by the sensors 1 using the plurality of types of feature data are executed by the arithmetic devices 2 and 6 different from each other. Therefore, the feature data can be extracted by the arithmetic device 2 corresponding to an arbitrary type of sensor 1, and the recognition processing can be executed by the arithmetic device 6 using the extracted feature data. As a result, regardless of the type of the sensor 1 to be used, a plurality of the arithmetic devices 2 can be connected to the arithmetic device 6 and the inference processing by the neural network can be executed, and a decrease in efficiency of the inference processing can be suppressed even in a case of freely combining the sensors 1. For example, the information processing apparatus 100 can execute inference processing by a multimodal DNN by freely combining the sensors 1. Furthermore, the inference processing can be executed without designing a new arithmetic device 2 corresponding to the sensor 1 to be combined.

By connecting the arithmetic device 2 and the arithmetic device 6 with a common interface specification, the arithmetic device 2 can be connected to an arbitrary input port of the input unit 7 of the arithmetic device 6. Since each arithmetic device 2 is designed corresponding to the sensor 1 to be connected, the arithmetic device 2 can be specialized in the feature data extraction processing for each sensor 1. As a result, the architecture of each arithmetic device 2 can be optimized, and the chip size can be minimized. Since the arithmetic device 6 is designed specifically for recognition processing using feature data, the architecture can be optimized, and the chip size of the semiconductor chip including the arithmetic unit 8 can be minimized. As a result, for example, a multimodal DNN inference system with reduced system cost can be provided to the user.

Figure 2:
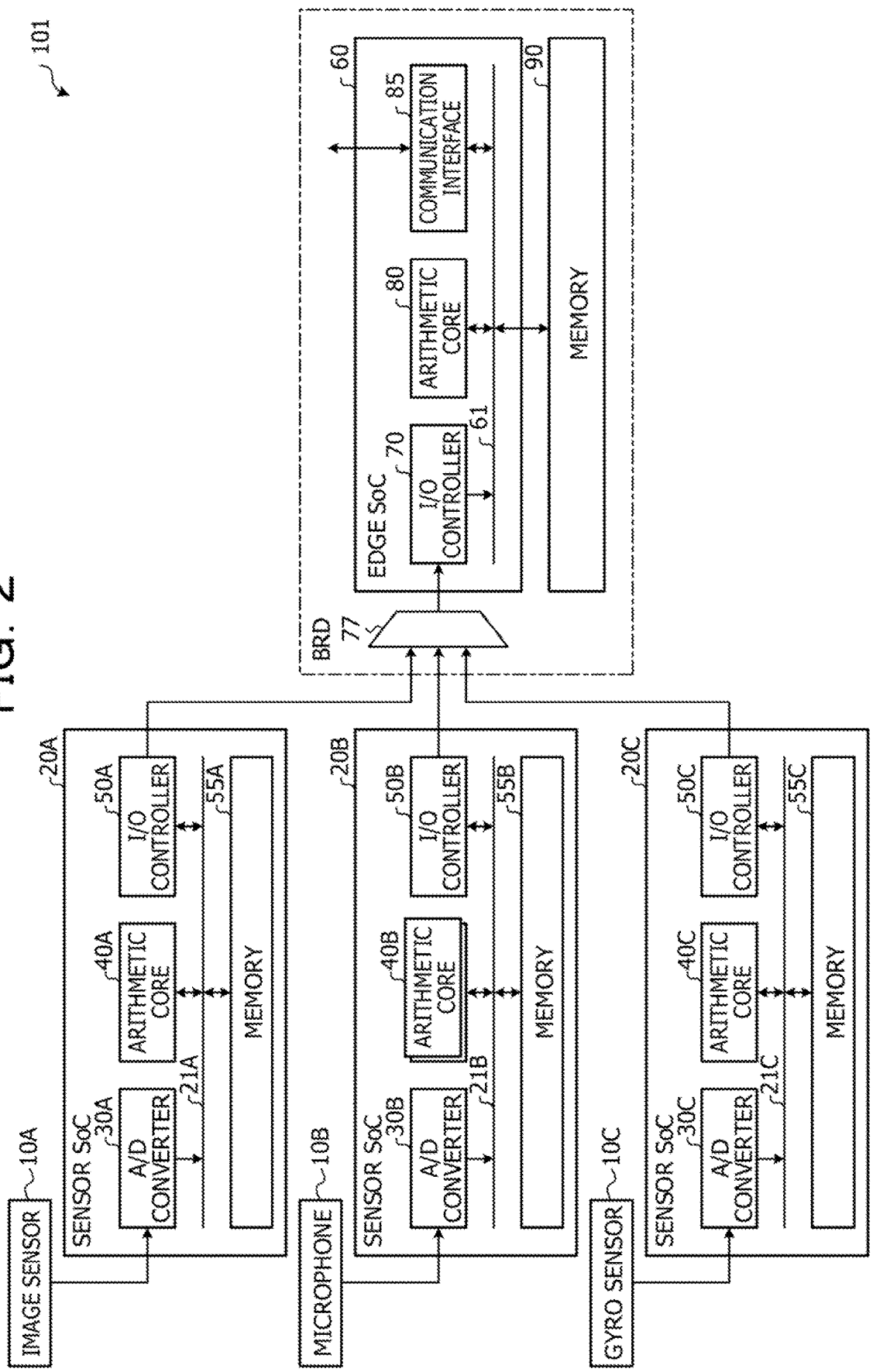
FIG. 2 is a diagram illustrating an example of an information processing apparatus according to another embodiment.

FIG. 2 illustrates an example of an information processing apparatus according to another embodiment. Detailed description of elements similar to those in FIG. 1 is omitted. An information processing apparatus 101 illustrated in FIG. 2 includes an image sensor 10A, a microphone 10B, a gyro sensor 10C, a plurality of sensor SoCs (system on a chips) 20 (20A, 208, and 20C), an edge SoC 60, a selector 77, and a memory 90. The edge SoC 60, the selector 77, and the memory 90 are mounted on a motherboard BRD of the information processing apparatus 101. For example, each sensor SoC 20 may be mounted on a peripheral component interconnect (PCI) card and connected to a PCI bus of the motherboard BRD via a connector (not illustrated). The information processing apparatus 101 executes the multimodal DNN inference processing, similarly to the information processing apparatus 100 illustrated in FIG. 1.

The sensor SoC 20A is an example of the first preprocessing arithmetic device. The sensor SoC 208 is an example of the first preprocessing arithmetic device or a second preprocessing arithmetic device. The sensor SoC 20C is an example of the first preprocessing arithmetic device or a third preprocessing arithmetic device. The edge SoC 60 is an example of the first post-processing arithmetic device and the arithmetic processing device.

The sensor SoC 20A includes an analog to digital (A/D) converter 30A, an arithmetic core 40A, an input/output (I/O) controller 50A, and a memory 55A connected to one another via a bus 21A. The AID converter 30A receives analog image data from the image sensor 10A and converts the analog image data into digital image data. The arithmetic core 40A executes feature extraction processing for the digital image data, and causes the memory 55A to store extracted image feature data. For example, the memory 55A is a static random access memory (SRAM).

The I/O controller 50A reads the image feature data stored in the memory 55A and outputs the image feature data to the selector 77. The I/O controller 50A may have a function to receive information from the edge SOC 60. The image sensor 10A is an example of the first sensor. The A/D converter 30A is an example of the first conversion unit. The arithmetic core 40A is an example of the first preprocessing arithmetic unit. The I/O controller 50A is an example of the first output unit.

The sensor SoC 20B includes an A/D converter 308, an arithmetic core 40B, an I/O controller 50B, and a memory 558 connected to one another via a bus 21B. The A/D converter 30B receives analog sound data from the microphone 10B and converts the analog sound data into digital sound data. The arithmetic core 40B executes the feature extraction processing for the digital sound data, and causes the memory 558 to store extracted sound feature data. For example, the memory 55B is an SRAM.

The I/O controller 50B reads the sound feature data stored in the memory 55B and outputs the sound feature data to the selector 77. The I/O controller SOB may have a function to receive information from the edge SoC 60. The microphone 108 is an example of the first sensor or the sound sensor. The A/D converter 308 is an example of the first conversion unit or a second conversion unit. The arithmetic core 408 is an example of the first preprocessing arithmetic unit or a second preprocessing arithmetic unit. The I/O controller 508 is an example of the first output unit.

The sensor SoC 20C includes an A/D converter 30C, an arithmetic core 40C, an I/O controller 50C, and a memory 55C connected to one another via a bus 21C. The A/D converter 30C receives analog motion data from the gyro sensor 10C and converts the analog motion data into digital motion data. The arithmetic core 40C executes the feature extraction processing for the digital motion data, and causes the memory 55C to store extracted motion feature data. For example, the memory 55C is an SRAK The I/O controller 50C reads the motion feature data stored in the memory 55C and outputs the motion feature data to the selector 77. The I/O controller 50C may have a function to receive information from the edge SoC 60. The gyro sensor 10C is an example of the first sensor or the motion sensor. The A/D converter 30C is an example of the first conversion unit or a third conversion unit. The arithmetic core 40C is an example of the first preprocessing arithmetic unit or a third preprocessing arithmetic unit. The I/O controller 50C is an example of the first output unit.

The selector 77 has three input ports respectively connected to outputs of the I/O controllers 50A, 50B, and 50C, and an output port connected to the edge SoC 60. For example, the selector 77 has a queue that holds the feature data for each input port, and transfers the feature data held in the queue toward a destination (for example, an area of the memory 90 indicated by the destination). Thereby, the feature data output from the I/O controllers 50A, 50B, and 50C is sequentially transferred to the edge SoC 60.

Note that the number of input ports included in the selector 77 may be four or more. For example, in a case where the number of input ports of the selector 77 is insufficient, the selector 77 can be replaced with another selector having a large number of ports. As a result, the number of sensor SoCs 20 connectable to the edge SoC 60 can be increased without redesigning the edge SoC 60, and different types of multimodal ANN inference processing can be executed.

The edge SoC 60 includes an I/O controller 70, an arithmetic core 80, and a communication interface 85 connected to one another via a bus 61. The memory 90 is also connected to the bus. For example, the memory 90 is a main storage device, and may be a memory module including a synchronous dynamic random access memory (SDRAM) or may include a plurality of stacked memory chips. The memory 90 may be a memory other than an SDRAM. The I/O controller 70 is an example of the first input unit. The arithmetic core 80 is an example of the first post-processing arithmetic unit. The memory 90 is an example of the first storage unit.

The I/O controller 70 causes the memory 90 to store the feature data transferred from the selector 77. The I/O controller 70 may have a function to output data and the like to the outside of the edge SoC 60 via the selector 77. The arithmetic core 80 reads the image feature data, the sound feature data, and the motion feature data stored in the memory 90, and executes the recognition processing for the aforementioned feature data. The arithmetic core 80 causes the memory 90 to store the recognition result data obtained by the recognition processing. The recognition result data is an example of image recognition result data as an recognition result of the image data, sound recognition result data as an recognition result of the sound data, or motion recognition result data as an recognition result of the motion data. For example, the communication interface 85 may have a function to control communication with another processor such as a CPU mounted on the motherboard BRD, and has a function to control communication with another device connected to the motherboard BRD.

The I/O controllers 50 (50A, 50B, and 50C), the selector 77, and the I/O controller 70 have an interface specification common to one another, and the I/O controllers 50A, 50B, and 50C can be connected to any of the input ports of the selector 77. Furthermore, a sensor SoC including another I/O controller 50 having the common interface specification may be connected to the input port of the selector 77. For example, in the information processing apparatus 101 illustrated in FIG. 2, the type and number of sensors 10 connected to the edge SOC 60 via the sensor SoC 20 can be freely switched according to the feature data used for the recognition processing. Furthermore, the edge SoC 60 (for example, the motherboard BRD) can be freely switched according to the size of the feature data used for the recognition processing, for example. Since any type and number of sensor SoCs 20 and an arbitrary edge SoC 60 can be combined, a multimodal INN inference system that executes various inferences is able to be realized by the information processing apparatus 101.

Figure 4:
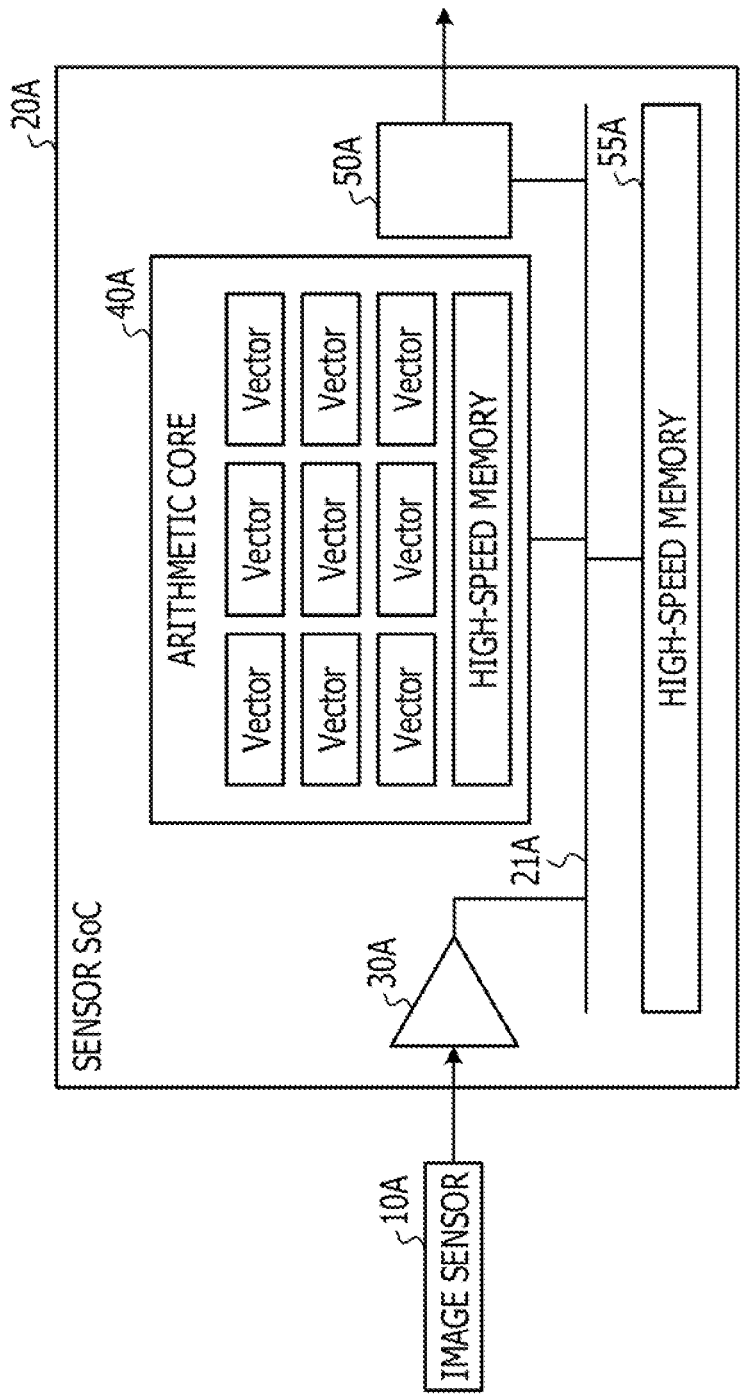
FIG. 4 is a diagram illustrating an example of a sensor SoC (system on a chips) 20A in FIG. 2.
Figure 5:
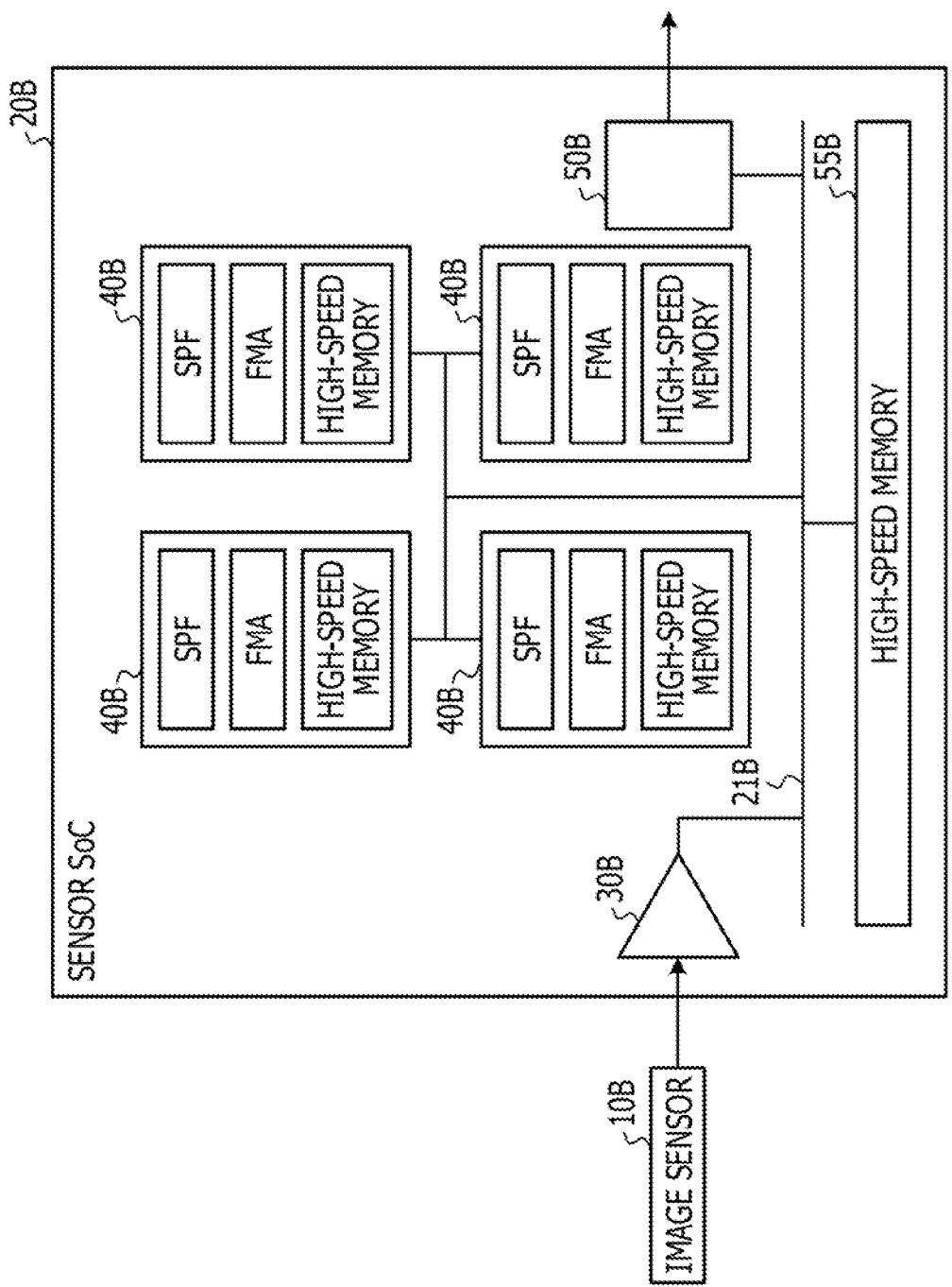
FIG. 5 is a diagram illustrating an example of a sensor SoC 20B in FIG. 2.
Figure 6:
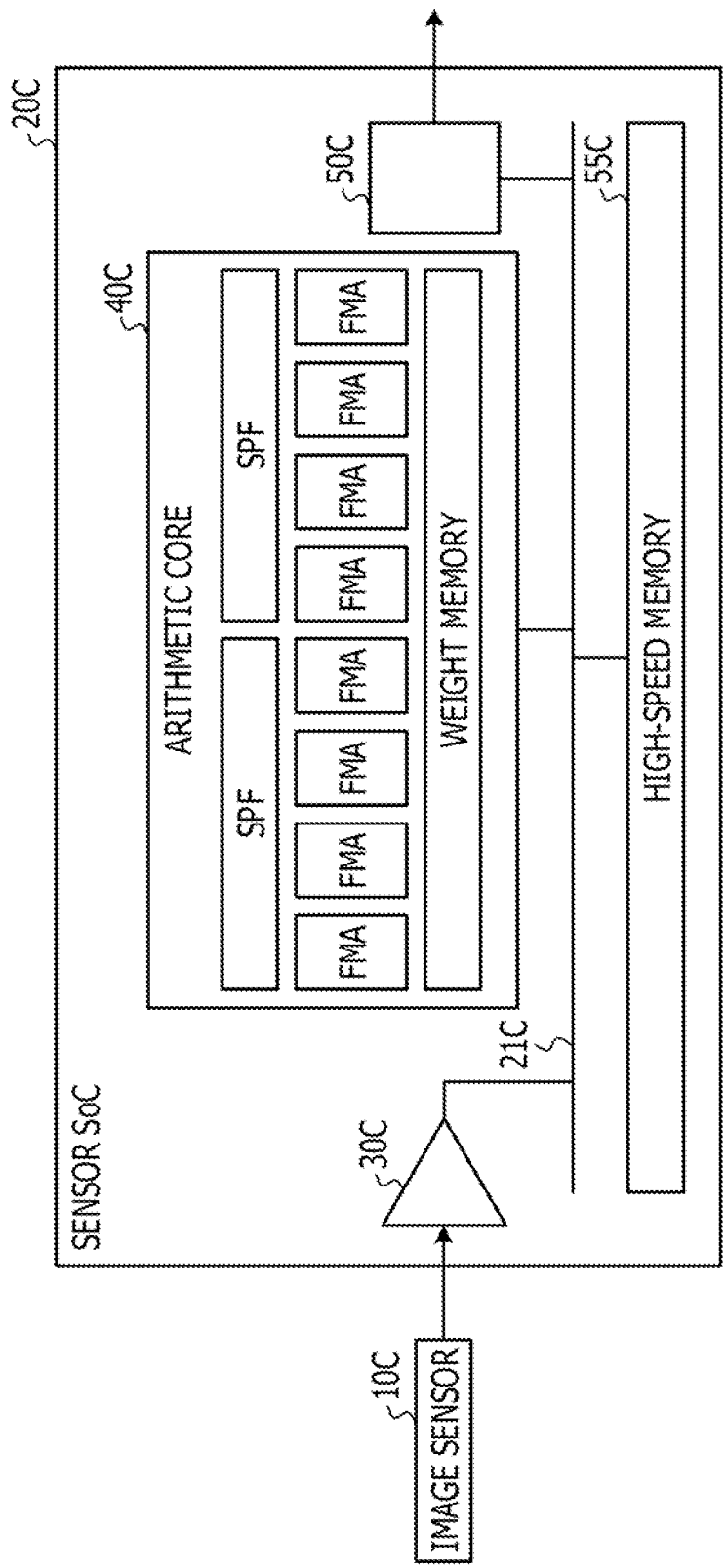
FIG. 6 is a diagram illustrating an example of a sensor SoC 20C in FIG. 2.

For example, the common interface specification may be a PCIe (registered trademark) bus. Furthermore, the feature data extracted by each sensor SoC 20 may be transferred to the memory 90 via the edge SoC 60 by direct memory access (DMA). By extracting the feature data from the data acquired by the sensor 10 using the sensor SoC 20 corresponding to each type of the sensor 10, the sensor SoC 20 with architecture optimized for extraction processing can be designed. Examples of the sensor SoC 20 with optimized architecture are illustrated in FIGS. 4 to 6.

Figure 3:
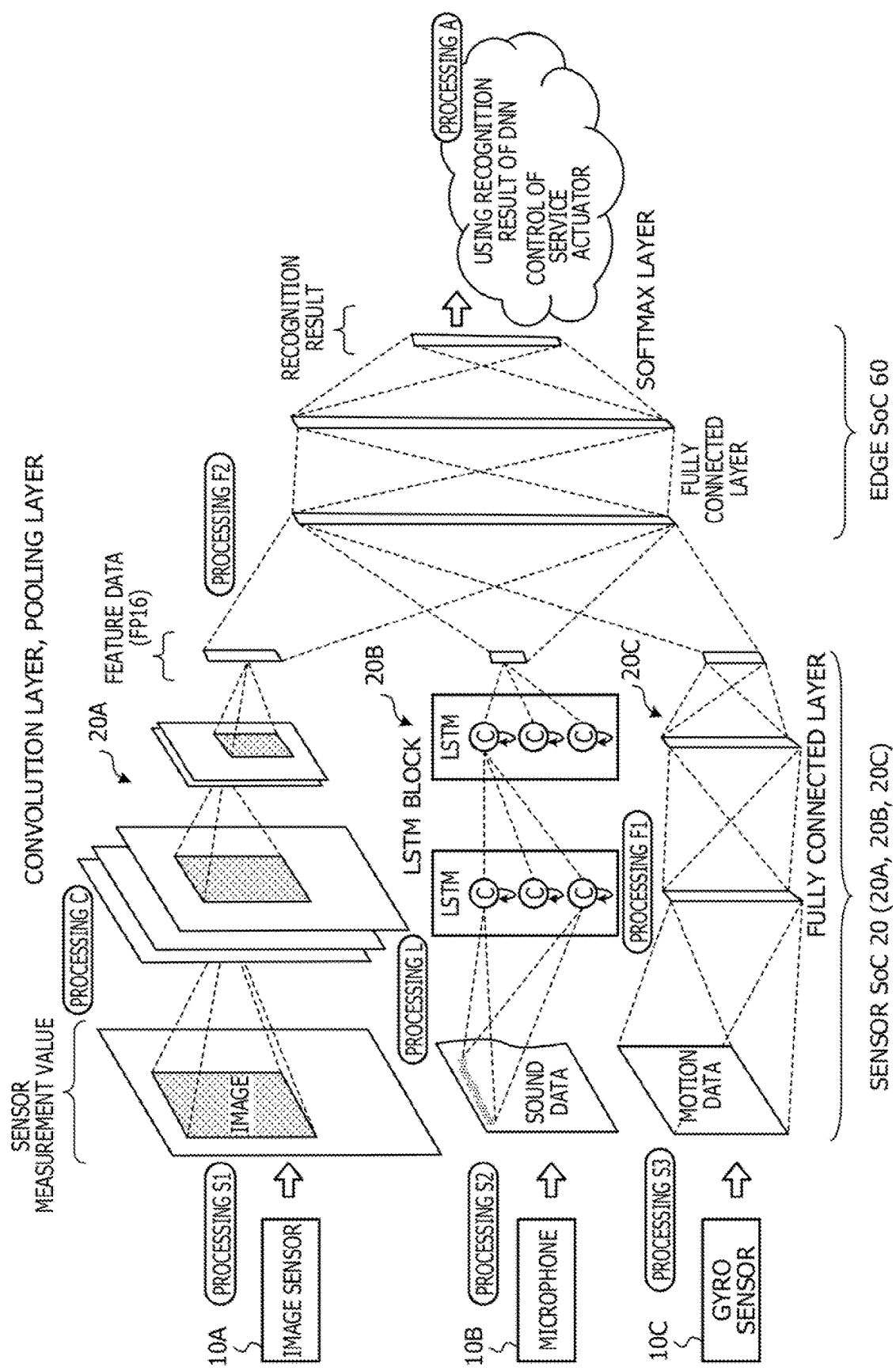
FIG. 3 is a diagram illustrating an example of a multimodal deep neural network (DNN) inference system realized by the information processing apparatus in FIG. 2.

FIG. 3 illustrates an example of the multimodal DNN inference system realized by the information processing apparatus 101 in FIG. 2. The multimodal DNN inference system illustrated in FIG. 3 includes three sensors SoCs 20A, 20B, and 20C that execute feature data extraction processing, and the edge SoC 60 that executes recognition processing using the feature data. Each sensor SoC 20 executes processing S1, S2, and S3 before the feature data extraction processing after acquiring data that is a measurement value by each sensor 10.

In a case where the measurement value is image data, in the processing S1, the sensor SoC 20A converts analog image data from the image sensor 10A into, for example, digital data in a JPEG format. Furthermore, the sensor SoC 20A converts the digital data in the JPEG format into a three-dimensional array (256 pixels in a vertical direction, 256 pixels in a horizontal direction, and RGB, or the like), and further converts a data structure of the image data in accordance with subsequent processing. The processing S1 may be executed by the arithmetic core 40A, may be executed by dedicated hardware, or may be executed by software, After the processing S1, the sensor SoC 20A extracts the feature data of the image data by, for example, processing C for executing convolution processing with a convolution layer and pooling processing with a pooling layer, using the arithmetic core 40A.

In a case where the measurement value is sound data, in the processing S2, the sensor SoC 20B performs discrete Fourier transform for analog sound data acquired from the microphone 10B to generate digital sound data. The processing S2 may be executed by the A/D converter 30B, may be executed by the arithmetic core 40B, may be executed by dedicated hardware, or may be executed by software. After the processing S2, the sensor SoC 20B extracts the feature data of the sound data by, for example, processing L with a long short-term memory (LSTM) in a recurrent neural network (RNN), using the arithmetic core 40B.

In a case where the measurement value is motion data, in the processing S3, the sensor SoC 20C converts analog motion data acquired from the gyro sensor 10C into digital motion data. After the processing S3, the sensor SoC 20C extracts the feature data by processing F1 for calculating a matrix vector product with a fully connected layer (dense layer), using the arithmetic core 40C.

Note that sensors usable in the multimodal DNN inference system are not limited to the sensors 10A, 10B, and 10C. For example, an atmospheric pressure sensor, a pressure sensor, an illuminance sensor, or the like may be used. Furthermore, the arithmetic processing executed by the sensor SoC 20 is not limited to the processing with the convolution layer, the processing with the LSTM, and the processing with the fully connected layer.

The edge SoC 60 executes recognition processing F2 based on the extracted feature data and processing A (application) based on an recognition result. For example, in the recognition processing F2, calculation of a matrix vector product (expression 1) with the fully connected layer and softmax function operation (expression 2) with a softmax layer are executed. R illustrated by a double line represents a set of real numbers, and a number on the upper right of R represents the number of elements.

In the expression (1), x1, x2, and x3 respectively represent the feature data to be transferred from the sensor SoCs 20A, 20B, and 20C to the edge SoC 60, x1 represents a vector with 2048 elements, and x2 and x3 represent vectors with 1024 elements. The total number x of the feature data is the total number (=4096) of x1, x2, and x3. In the expression (1), W represents a trained weight matrix obtained by training processing executed in advance, and is a matrix of 1000 rows and 4096 columns. Then, an output o, which is a vector with 1000 elements, is generated by a matrix product (Wx). The softmax function shown in the expression (2) is a nonlinear function defined by the expression (3). y in the expression (2) is a vector with 1000 elements and corresponds to a final recognition result of the multimodal DNN.

[Math. 1]

$$o = Wx, x = \begin{bmatrix} x_1 \\ x_2 \\ x_3 \end{bmatrix} \quad (1)$$

Where $o \in \mathbb{R}^{1000}$, $W \in \mathbb{R}^{1000 \times 4096}$, $x \in \mathbb{R}^{4096}$, $x_1 \in \mathbb{R}^{2048}$, $x_2, x_3 \in \mathbb{R}^{1024}$

[Math. 2]

$$y = \text{softmax}(o) \quad (2)$$

Where $y \in \mathbb{R}^{1000}$

[Math. 3]

$$\text{softmax}(x) := \frac{1}{\sum_i^N \exp(x[i])} \begin{bmatrix} \exp(x[0]) \\ \exp(x[1]) \\ \vdots \\ \exp(x[N-1]) \end{bmatrix} \in \mathbb{R}^N \quad (3)$$

Where $x \in \mathbb{R}^N$

Note that the multimodal DNN inference system illustrated in FIG. 3 can also be realized by the information processing apparatus 100 illustrated in FIG. 1. In this case, the sensor SoCs 20A, 20B, and 20C in FIG. 2 are replaced with the arithmetic devices 2A, 2B, and 2C in FIG. 1, and the edge SoC 60 in FIG. 2 is replaced with the arithmetic device 6 in FIG. 1.

For example, the processing C, the processing L, and the processing F1 and F2 illustrated in FIG. 3 are executed using 32-bit (single precision) floating-point number data FP32 (hereinafter referred to as FP32). Note that the processing C, the processing L, and the processing F1 and F2 may be executed using a data type other than FP32.

FIG. 4 illustrates an example of the sensor SoC 20A in FIG. 2. The sensor SoC 20A has optimized architecture for the convolution processing with the convolution layer, and the arithmetic core 40A includes a plurality of vector arithmetic units (vector arithmetic and logic unit (ALU)) arrayed in a two dimensional manner and a high-speed memory higher than the memory 55A. The vector arithmetic unit is capable of performing a vector operation for executing the same operation for a plurality of data in parallel and is suitable for the convolution processing. The two-dimensionally arrayed vector arithmetic units are suitable for executing the convolution processing because of being capable of forwarding data used for the calculation from a certain vector arithmetic unit to another adjacent vector arithmetic unit.

For example, the high-speed memory is an SRAM. However, a ferroelectric memory, a magnetic random access memory (MRAM) or a resistive random access memory (ReRAM) may be used. The storage capacity of the high-speed memory may be any size as long as the memory can accommodate arithmetic target data corresponding to a kernel (vertical size x horizontal size x the number of input channels) for one output channel, of kernels (filters) to be convoluted. Note that the arithmetic core 40A is not limited to the configuration illustrated in FIG. 4. Furthermore, the sensor SoC 20A may include a plurality of arithmetic cores 40A, and the number of vector arithmetic units included in the arithmetic cores 40A is not limited to nine.

FIG. 5 illustrates an example of the sensor SoC 20B in FIG. 2. The sensor SoC 20B has optimized architecture for specializing in the processing with the LSTM, and includes a plurality of arithmetic cores 40B connected to a bus. Since main arithmetic content with the LSTM is matrix operation and nonlinear function operation, each arithmetic core 40B includes a fused multiply-add (FMA), special function unit (SPF), and a high-speed memory. The FMA is a product-sum arithmetic unit with an accumulator and is effective for speeding up a matrix product. The SPF includes an arithmetic unit for nonlinear functions frequently used in a DNN, such as a sigmoid function and a hyperbolic tangent (tanh) function. Furthermore, the high-speed memory is an SRAM, a ferroelectric memory, an MRAM, an ReRAM, or the like, and stores data to be used for the calculation with the LSTM. Note that the number of arithmetic cores 40B included in the sensor SoC 20B is not limited to four.

FIG. 6 illustrates an example of the sensor SoC 20C in FIG. 2. The sensor SoC 20C has optimized architecture for the matrix vector product operation using the fully connected layer, and the arithmetic core 40C includes a plurality of FMAs, a plurality of SPFs, and a weight memory. The weight memory stores trained weight data to be used for the calculation with the fully connected layer in advance. The capacity of the weight memory is desirably larger than the capacity of the high-speed memories illustrated in FIGS. 4 and 5. The weight memory is an SRAM, a ferroelectric memory, an MRAM, an ReRAM, or the like. The arithmetic core 40C may employ a configuration to directly supply arithmetic target data from the weight memory to the FMA without using a register file. With the configuration, very long data can be sequentially read from the weight memory and the read data can be supplied to each FMA, so that the calculation with the fully connected layer can be efficiently executed. Note that the number of FMAs and the number of SPFs are not limited to the example illustrated in FIG. 6.

As illustrated in FIGS. 4 to 6, the optimum architecture of the sensor SoC 20 differs depending on the content of the arithmetic processing by a DNN. For example, the optimum architecture of the sensor SoC 20 differs depending on the type of the sensor 10 that acquires data. For example, by preparing the SOC 20 with optimized architecture for each type of sensor 10 or for each type of arithmetic processing by a DNN, the processing performance of the DNN can be improved as compared with the case of using the common sensor SoC for the plurality of types of sensors 10.

Figure 7A:
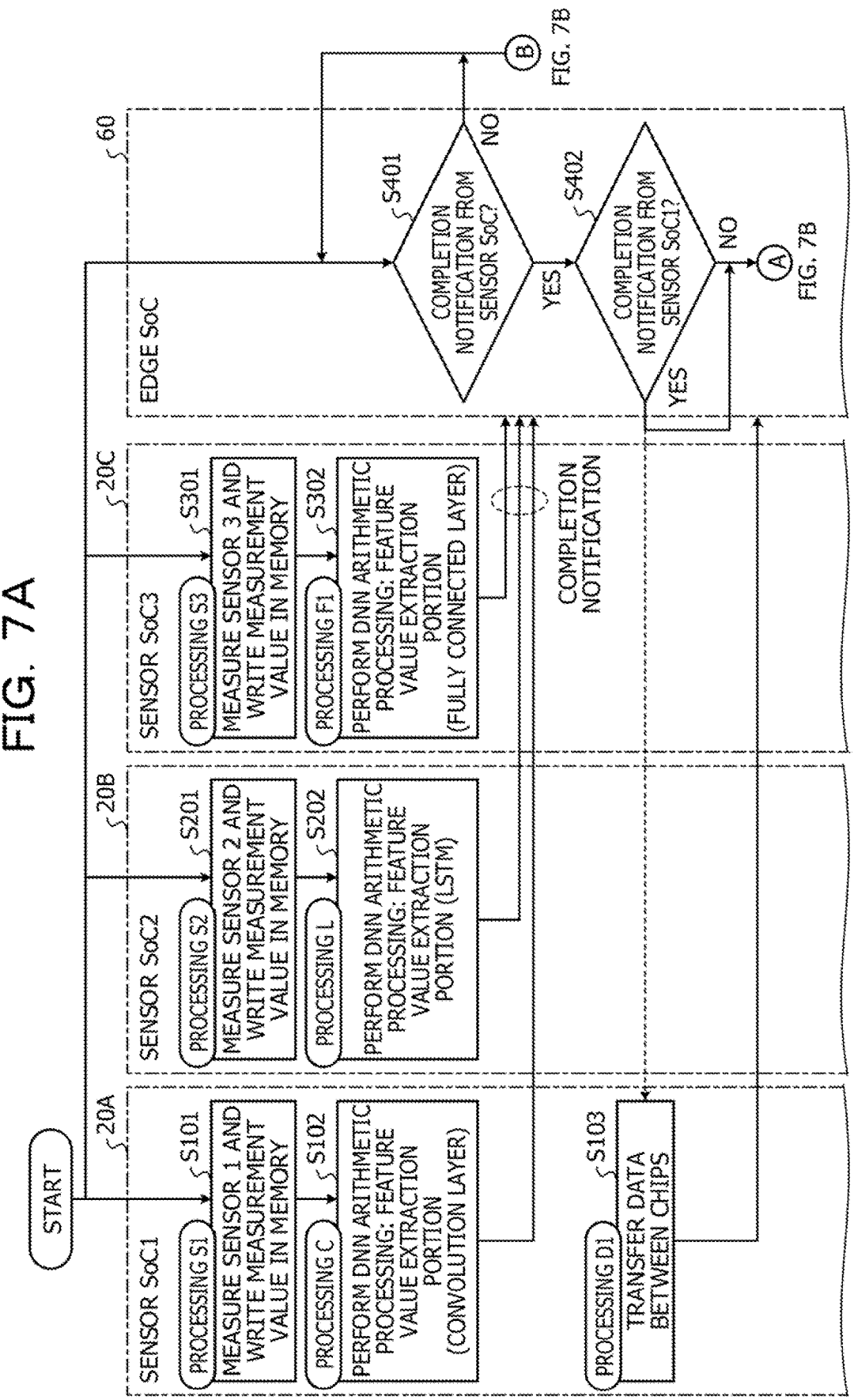
FIG. 7A is a diagram illustrating an example of an operation flow in a case where the information processing apparatus in FIG. 2 executes inference processing by a multimodal DNN.
Figure 7B:
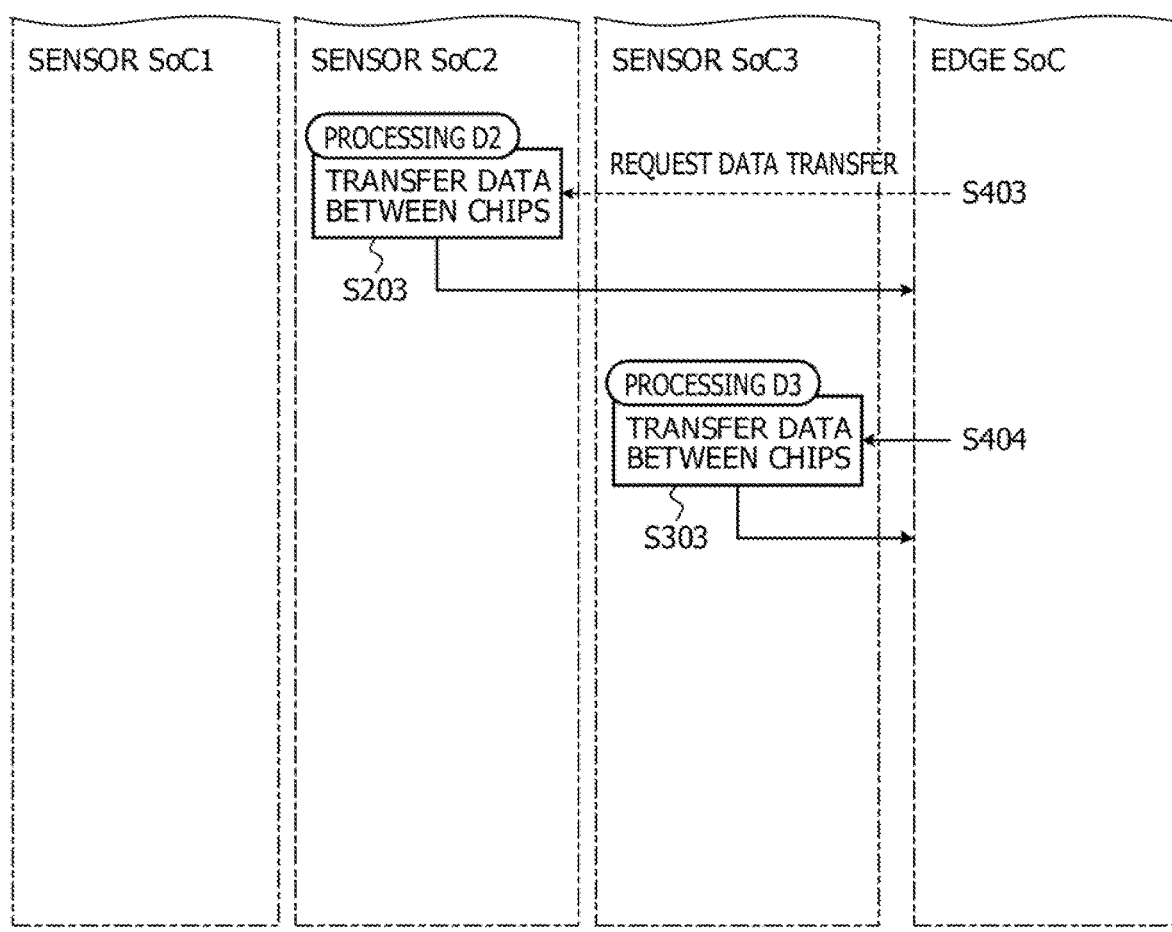
FIGS. 7B and 7C are a diagram illustrating continuation of FIG. 7A.
Figure 7C:
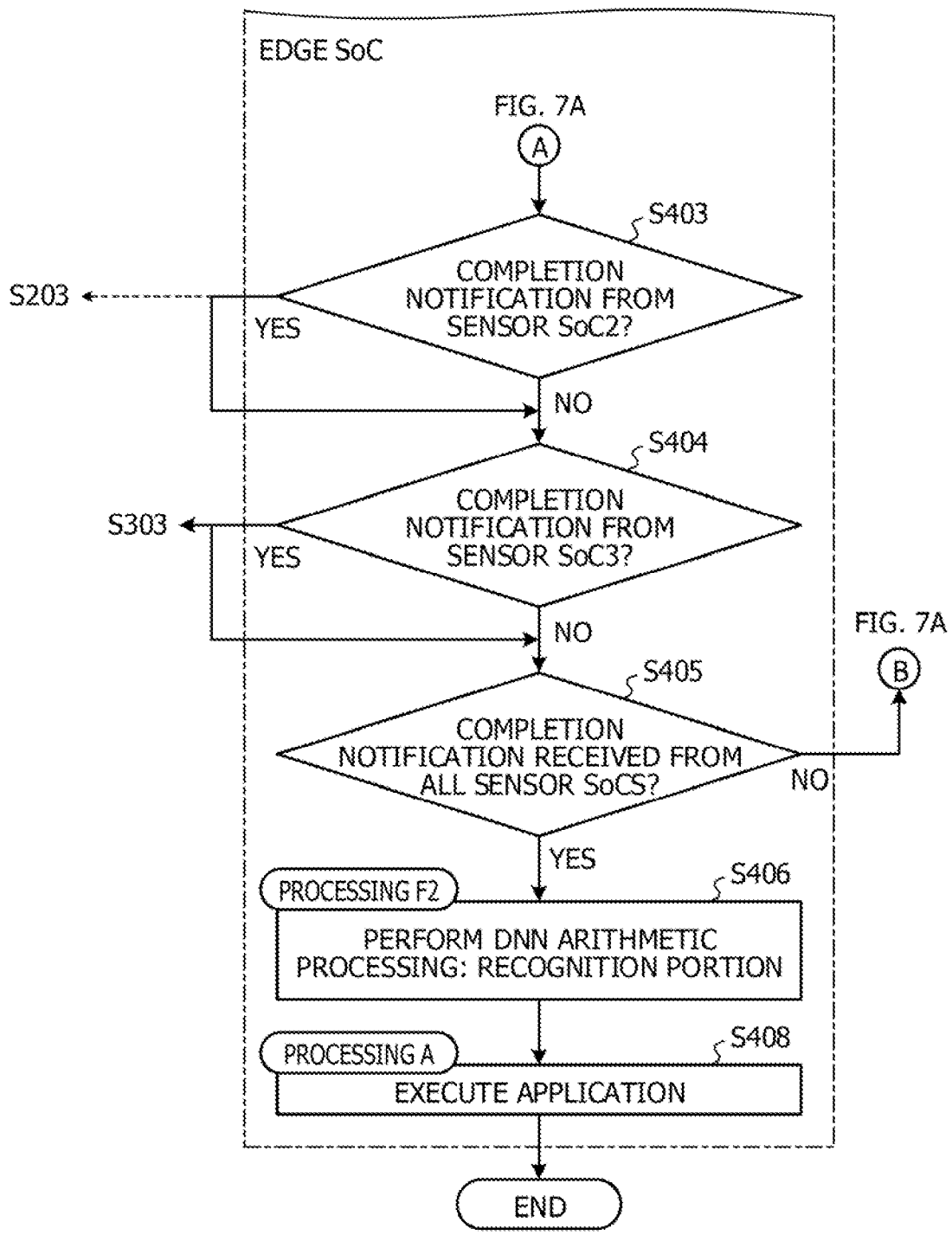

FIGS. 7A to 7C illustrate an example of an operation flow in a case where the information processing apparatus 101 in FIG. 2 executes inference processing by a multimodal DNN. For example, FIGS. 7A to 7C illustrate an example of a method of controlling the information processing apparatus 101. For example, the operations illustrated in FIGS. 7A to 7C are repeatedly executed until the inference processing is completed on the basis of the information processing apparatus 101 having received a request of a service by the multimodal DNN inference processing from the user. The period of processing from the start to the end illustrated in FIGS. 7A to 7C is referred to as an operation cycle. Hereinafter, the sensor SoCs 20A, 20B, and 20C are also referred to as sensors SoC 1, SoC 2, and SoC 3, respectively, and the edge SoC 60 is also referred to as an edge SoC. Furthermore, in a case of describing the sensors SOC 1, SoC 2, and SoC 3 without distinction, the sensors SoC 1, SoC 2, and SoC 3 are also referred to as sensor SoCs. This also similarly applies to embodiments to be described below. The sensors SoC 1, SoC 2, and SoC 3 operate in parallel with one another, and the edge SoC executes the recognition processing on the basis of reception of completion notifications from all the sensor SoCs.

In step S101 for executing the processing S1, the sensor SoC 1 transmits a measurement request to the image sensor 10A, and receives analog image data (measurement value) captured (measured) by the image sensor 10A. The sensor SoC 1 converts the received analog data into digital image data, and then writes the digital image data into the memory 55A. Next, in step S102 for executing the processing C, the sensor SoC 1 executes, as DNN arithmetic processing, the feature extraction processing with the convolution layer, using the image data stored in the memory 55A, and writes obtained feature data into the memory 55A. Thereafter, the sensor SOC 1 transmits the completion notification to the edge SoC.

In step S201 for executing the processing S2, the sensor SoC 2 transmits a measurement request to the microphone 10B, and receives analog sound data (measurement value) recorded (measured) by the microphone 10B. The sensor SoC 2 converts the received analog sound data into digital audio data, and then writes the digital sound data into the memory 55B. Next, in step S202 for executing the processing L, the sensor SoC 2 executes, as the DNN arithmetic processing, the feature extraction processing with the LSTM, using the sound data stored in the memory 55B, and writes obtained feature data into the memory 55B. Thereafter, the sensor SoC 2 transmits the completion notification to the edge SoC.

In step S301 for executing the processing S3, the sensor SoC 3 transmits a measurement request to the gyro sensor 10C, and receives analog measurement data measured by the gyro sensor 10C. The sensor SoC 3 converts the received analog measurement data into digital measurement data, and then writes the digital measurement data into the memory 55C. Next, in step S302 for executing the processing F1, the sensor SoC 3 executes, as the DNN arithmetic processing, the feature extraction processing with the fully connected layer, using the digital measurement data stored in the memory 55C, and writes obtained feature data into the memory 55C. Thereafter, the sensor SoC 3 transmits the completion notification to the edge SOC. Note that the various sensors 10 may be operated at all times, and the sensor SoC may acquire the analog data output by the various sensors 10 in accordance with start timing of an operation cycle for executing the inference processing.

In step S401, the edge SoC waits for the completion notification from any of the sensor SoCs. In a case of having received the completion notification from any of the sensor SoCs, the edge SoC transfers the operation to step S402. The edge SoC has a function to store the completion notification from the sensor SoC for each operation cycle of executing the inference processing. In step S402, in a case where the edge SoC has received the completion notification from the sensor SoC 1 for the first time during the operation cycle, the edge SoC issues a data transfer request to the sensor SoC 1 and transfers the operation to step S403 in FIGS. 7B and 7C. In a case where the edge SoC has not received the comple- tion notification from the sensor SoC 1 or in a case where the edge SoC has received the completion notification in the operation cycle, the edge SoC transfers the operation to step S403. In step S103, in a case where the sensor SoC 1 has received the data transfer request, the sensor SoC 1 transfers the feature data stored in the memory 55A to the edge SoC. The edge SoC stores the feature data received from the sensor SoC 1 in the memory 90. Transfer of the feature data from the sensor SoC 1 to the memory 90 is executed in a state where the sensor SoC 1 is connected to the edge SoC via the selector 77.

In step S403 in FIGS. 7B and 7C, in a case where the edge SoC has received the completion notification from the sensor SoC 2 during the operation cycle, the edge SoC issues the data transfer request to the sensor SoC 2 and transfers the operation to step S404. In a case where the edge SoC has not received the completion notification from the sensor SoC 2 or in a case where the edge SoC has received the completion notification in the operation cycle, the edge SoC transfers the operation to step S404. In step S203, in a case where the sensor SoC 2 has received the data transfer request, the sensor SoC 2 transfers the feature data stored in the memory 55B to the edge SoC. The edge SoC stores the feature data received from the sensor SoC 2 in the memory 90. Transfer of the feature data from the sensor SoC 2 to the memory 90 is executed in a state where the sensor SoC 2 is connected to the edge SoC via the selector 77.

In step S404, in a case where the edge SoC has received the completion notification from the sensor SoC 3 during the operation cycle, the edge SoC issues the data transfer request to the sensor SoC 3 and transfers the operation to step S405. In a case where the edge SoC has not received the completion notification from the sensor SoC 3 or in a case where the edge SoC has received the completion notification in the operation cycle, the edge SoC transfers the operation to step S405. In a case where the sensor SoC 3 has received the data transfer request in step S303, the sensor SOC 3 transfers the feature data stored in the memory 55C to the edge SoC. The edge SoC stores the feature data received from the sensor SoC 3 in the memory 90. Transfer of the feature data from the sensor SoC 3 to the memory 90 is executed in a state where the sensor SoC 3 is connected to the edge SoC via the selector 77.

In step S405, in a case of having received the completion notifications from all the sensor SoCs, the edge SoC transfers the operation to step S406, and in a case where there is a sensor SoC from which the edge SoC has not received the completion notification, the edge SoC returns the operation to step S401. For example, the processing from step S401 to step S405 may be executed by control by a control program executed by the arithmetic core 80 (FIG. 2), or may be executed by a controller (hardware) included in the edge SoC.

In step S406, the arithmetic core 80 executes the processing F2 as the DNN arithmetic processing and executes the recognition processing using the feature data stored in the memory 90, and obtains the recognition result. The arithmetic core 80 stores the obtained recognition result in the memory 90.

Next, in step S408, the arithmetic core 80 executes, as the processing A, an application (program) using the recognition result stored in the memory 90 as an input, executes processing of various services, or executes processing of controlling control devices such as actuators. The processing of various services or the processing of controlling control devices may be executed by a processor such as a CPU outside the edge SoC 60 via the communication interface 85.

Then, execution of the multimodal DNN inference processing in the operation cycle ends.

Figure 8:
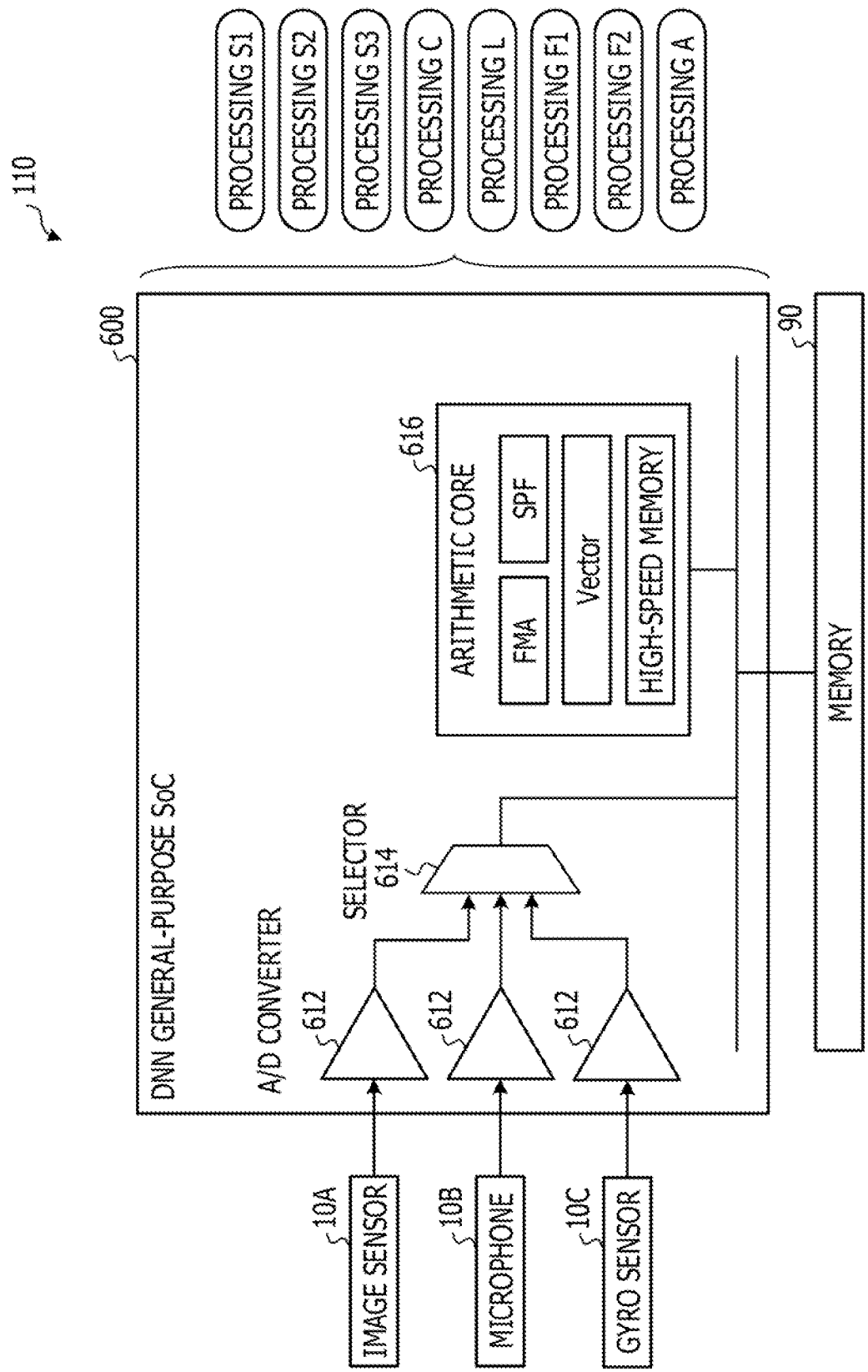
FIG. 8 is a diagram illustrating an example of another information processing apparatus.

FIG. 8 illustrates an example of another information processing apparatus. Elements similar to those of the information processing apparatus 101 illustrated in FIG. 2 are denoted by the same reference numerals, and detailed description is omitted. An information processing apparatus 110 illustrated in FIG. 8 includes the image sensor 10A, the microphone 10B the gyro sensor 10C, an SoC 600, and the memory 90. The information processing apparatus 110 executes the multimodal DNN inference processing, similarly to the information processing apparatus 101 illustrated in FIG. 2.

The SoC 600 is a general-purpose chip for DNN, and includes a plurality of A/D converters 612 for converting analog data from the various sensors 10A, 10B, and 10C into digital data, a selector 614, and an arithmetic core 616. The selector 614 connects any output of the A/D converters 612 to the memory 90 via the bus, and stores the digital data converted from the analog data measured by the sensors 10A, 10B, or 10C in the memory 90.

The arithmetic core 616 is a general-purpose core including an FMA, an SPF, a vector arithmetic unit (vector ALU), and a high-speed memory, and can realize functions of the convolution layer, the LSTM, and the fully connected layer. Therefore, all pieces of the processing S1, S2, S3, C, L, F1, F2, and A illustrated in FIG. 3 can be executed by the single SoC 600.

Meanwhile, for example, since the number of mounted vector arithmetic units is limited due to the limitation of the chip size, the SoC 600 has lower arithmetic performance as the convolution layer than the sensor SoC 20A in FIG. 4, Furthermore, since the numbers of mounted FMAs and SPFs are limited due to the limitation of the chip size, the SoC 600 has lower arithmetic performance as a processing layer of the LSTM than the sensor SoC 20B in FIG. 5. Similarly, since the numbers of SPFs and FMAs are limited due to the limitation of the chip size, the SoC 600 has lower arithmetic performance as the fully connected layer than the sensor SoC 20C and the edge SoC 60 in FIG. 6.

For example, while the SoC 600 can execute processing by various types of DNNs, the architecture for the feature data extraction processing and recognition processing for each sensor data is not optimized. Therefore, the performance of the multimodal DNN inference processing performed by the information processing apparatus 110 is lower than the performance of the multimodal DNN inference processing performed by the information processing apparatus 101 illustrated in FIG. 2. In a case of optimizing the architecture of the SoC 600 to increase the performance of specific inference processing, the processing performance is decreased with respect to other inference processing not suitable for the architecture. To suppress a decrease in the processing performance, the SoC 600 needs to be designed for each type of inference processing.

Figure 9:
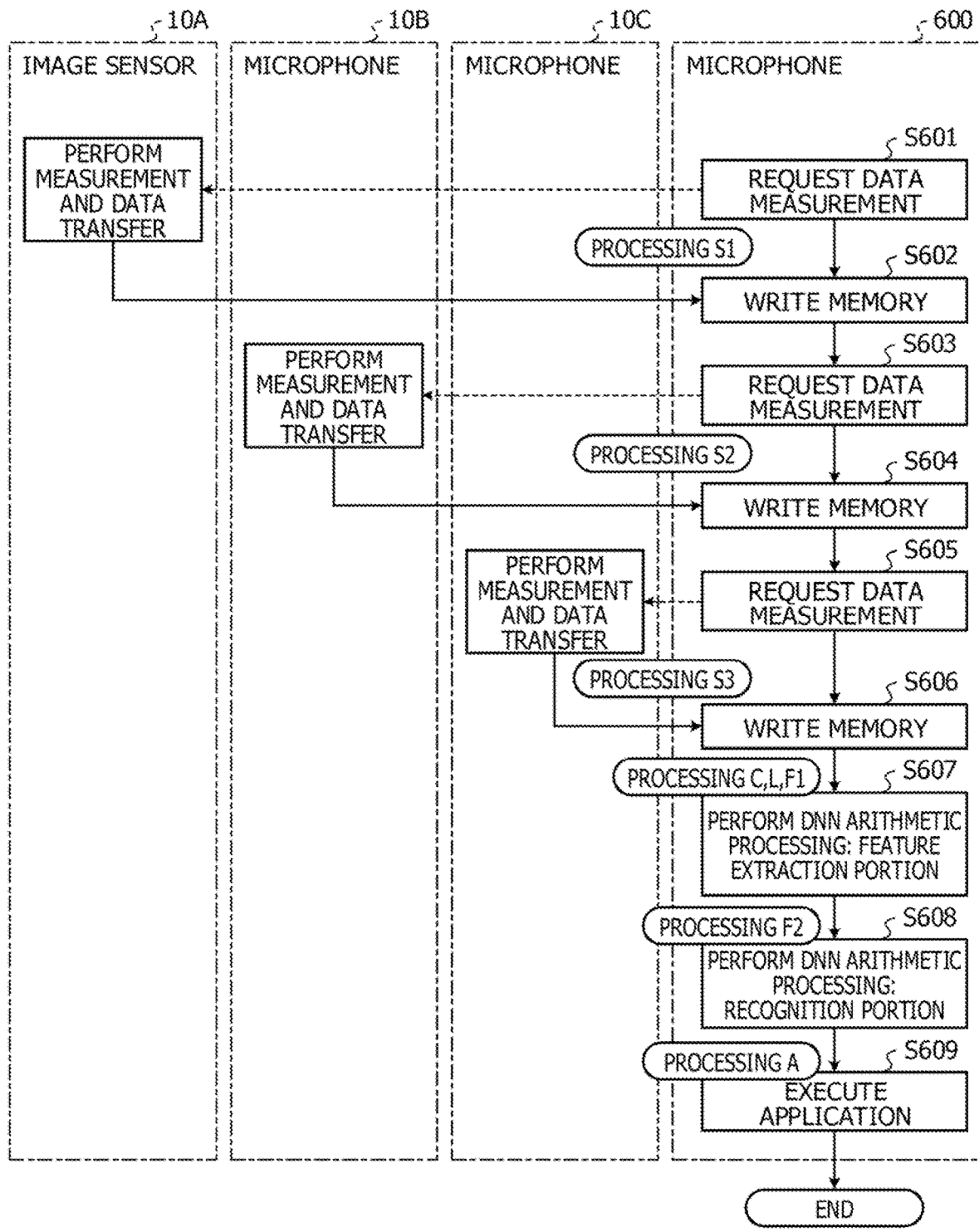
FIG. 9 is a diagram illustrating an example of an operation flow in a case where an information processing apparatus 110 in FIG. 8 executes inference processing by a multimodal DNN.

Moreover, in FIG. 8, for example, since the functions of the three sensor SoCs and edge SoCs in FIG. 2 are realized by one SoC, the chip size increases, the yield as a yield rate of chips decreases, and the chip cost increases. As a result, the cost of the information processing apparatus 110 increases as compared with the case of respectively executing the feature data extraction processing and the recognition processing for each sensor by different semiconductor chips, FIG. 9 illustrates an example of an operation flow in a case where the information processing apparatus 110 in FIG. 8 executes inference processing by a multimodal DNN.

Detailed description of operations similar to those in FIGS. 7A to 7C is omitted. The operation illustrated in FIG. 9 is started on the basis of the information processing apparatus 110 having received a request of a service by the multimodal DNN inference processing from the user, similarly to FIGS. 7A to 7C.

In step S601, the general-purpose SoC 600 issues a measurement request to the image sensor 10A. Next, in step S602, the SoC 600 executes the processing S1 of converting the image data received from the image sensor 10A into a digital value and writing the digital value into the memory 90, In step S603, the SoC 600 issues a measurement request to the microphone 108. Next, in step S604, the SoC 600 executes the processing S2 of converting the sound data received from the microphone 10B into a digital value and writing the digital value into the memory 90. In step S605, the SoC 600 issues a measurement request to the gyro sensor 10C. Next, in step S606, the SoC 600 executes the processing S3 of converting the motion data received from the gyro sensor 10C into a digital value and writing the digital value into the memory 90.

Next, in step S607, the arithmetic core 616 executes the processing C, the processing L, and the processing F1 as the DNN arithmetic processing, and extracts the feature data of each of the image data, the sound data, and the motion data. The content of the processing C, the processing L, and the processing F1 corresponds to the convolution layer, the LSTM, and the fully connected layer, respectively, similarly to steps S102, S202, and S302 in FIG. 7A.

Next, in step S608, the arithmetic core 616 executes, as the DNN arithmetic processing, the recognition processing F2 using the feature data stored in the memory 90 and obtains the recognition result. Next, in step S609, the arithmetic core 616 executes, as the processing A, an application using the recognition result as an input, executes the processing of various services, or controls control devices such as actuators. Then, execution of the multimodal DNN inference processing ends.

As described above, in the embodiment illustrated in FIGS. 2 to 7C, the feature data is extracted by the plurality of sensor SoCs 20 by combining arbitrary types of sensors 10, and the recognition processing can be executed by the edge SoC 60 using the extracted feature data, similarly to the embodiment illustrated in FIG. 1. For example, the information processing apparatus 101 can execute the inference processing by a multimodal DNN using the data respectively acquired by the image sensor 10A, the microphone 10B, and the gyro sensor 10C. For example, in the case of freely combining the sensors 10, a decrease in the efficiency of the neural network inference processing can be suppressed.

By connecting the plurality of sensor SoCs 20 and the edge SoC 60 by a common interface specification, the sensor SoCs 20 can be connected to arbitrary input ports of the selector 77. Since each sensor SoC 20 can be designed specifically for the feature data extraction processing for each sensor 10, the architecture of each sensor SoC 20 can be optimized and the chip size can be minimized. Furthermore, since the edge SoC 60 can be designed specifically for the recognition processing using the feature data, the architecture of the edge SoC 60 can be optimized and the chip size of the edge SoC 60 can be minimized.

Figure 10:
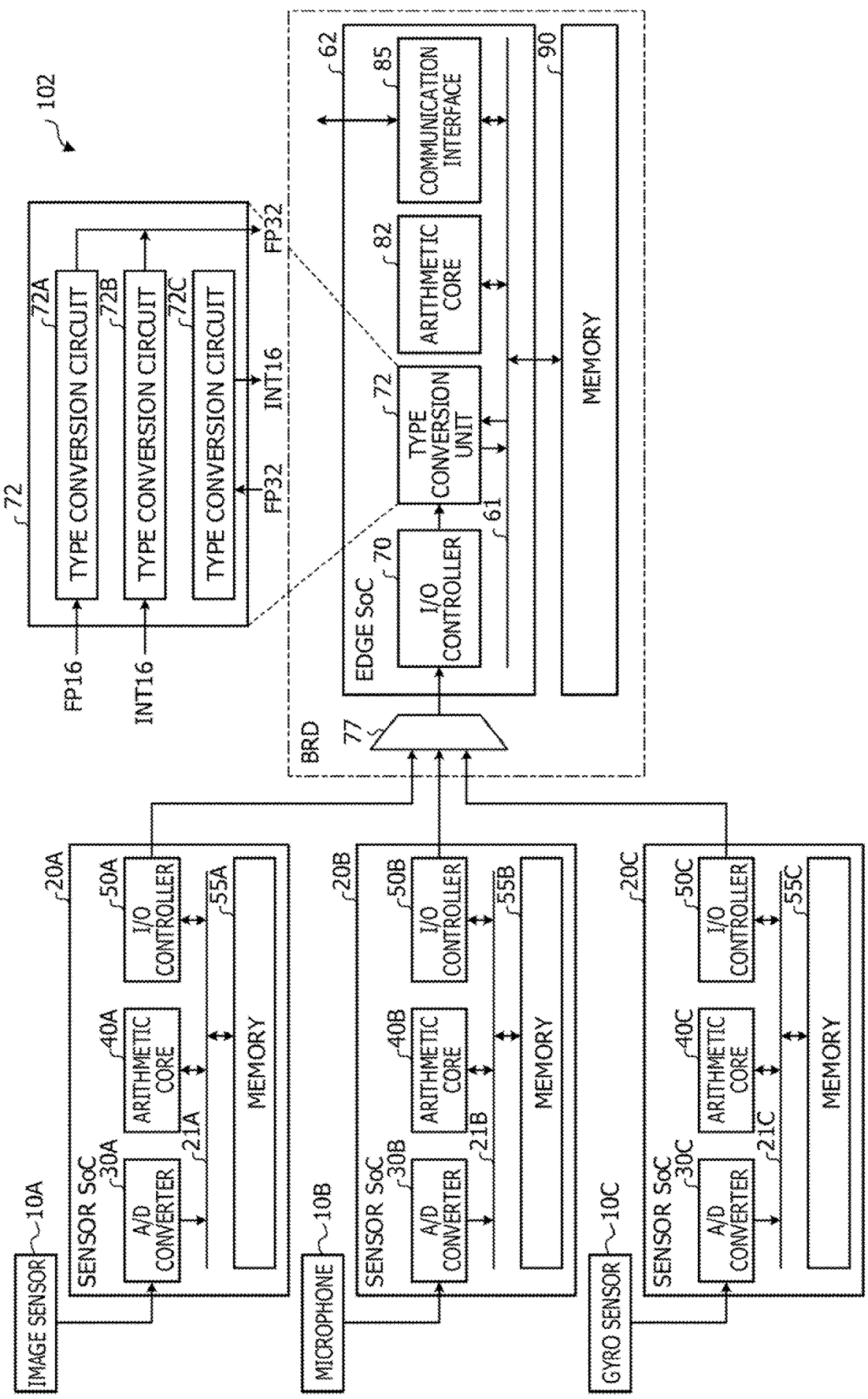
FIG. 10 is a diagram illustrating an example of an information processing apparatus according to another embodiment.

FIG. 10 illustrates an example of an information processing apparatus according to another embodiment. Elements similar to those in FIG. 2 are denoted by the same reference numerals, and detailed description is omitted. An information processing apparatus 102 illustrated in FIG. 10 is similar to the information processing apparatus 101 illustrated in FIG. 2 except that the information processing apparatus 102 includes an edge SoC 62 instead of the edge SoC 60 illustrated in FIG. 2. The information processing apparatus 102 executes multimodal DNN inference processing, similarly to the information processing apparatus 101 illustrated in FIG. 2.

The edge SoC 62 includes an arithmetic core 82 instead of the arithmetic core 80 illustrated in FIG. 2. For example, in the arithmetic core 82, architecture is optimized for normalization processing with a normalization layer and a calculation for a matrix vector product with a fully connected layer. Furthermore, in the edge SoC 62, a type conversion unit 72 connected to an output of the I/O controller 70 and the bus 61 is added to the edge SoC 60 illustrated in FIG. 2. An example of an operation of the arithmetic core 82 will be described in FIGS. 13A and 13B. The type conversion unit 72 includes type conversion circuits 72A, 72B, and 72C. The type conversion circuit 72A converts 16-bit (half precision) floating-point number data FP16 (hereinafter referred to as FP16) into 32-bit (single precision) floating-point number data FP32 (hereinafter referred to as FP32). The type conversion circuit 72B converts 16-bit fixed-point number data INT16 (hereinafter referred to as INT16) into FP32. The type conversion circuit 72C converts FP32 into INT16.

The edge SoC 62 is an example of the first post-processing arithmetic device and the arithmetic processing device, and the arithmetic core 82 is an example of the first post-processing arithmetic unit. The type conversion circuit 72A is an example of a first post-processing conversion unit, and the type conversion circuit 72C is an example of a second post-processing conversion unit.

The arithmetic core 40A of the sensor SoC 20A includes an arithmetic unit for FP16 instead of an arithmetic unit for FP32 or FP64 (64-bit floating-point number data), and extracts the feature data using FP16. Similarly, the arithmetic core 40B of the sensor SoC 20B includes an arithmetic unit for FP16 instead of an arithmetic unit for FP32 or FP64, and extracts the feature data using the FP16.

With the configuration, the circuit scale of the arithmetic cores 40A and 40B can be made smaller and the chip sizes of the sensor SoCs 20A and 2013 can be made smaller than the case of including the arithmetic units for FP32 or FP64. Furthermore, the processing time can be reduced, the memory area to be used can be reduced, and the power consumption can be reduced, as compared with the case of extracting the feature data using FP32 or FP64.

Note that each of the arithmetic cores 40A and 40B may include an arithmetic unit for FP32 or FP64, and may execute a plurality of FP16 calculations in parallel using a single instruction multiple data (SIMD) instruction. The arithmetic core 40C of the sensor SoC 20C includes an arithmetic unit for FP32, and extracts the feature data using FP32.

Figure 11:
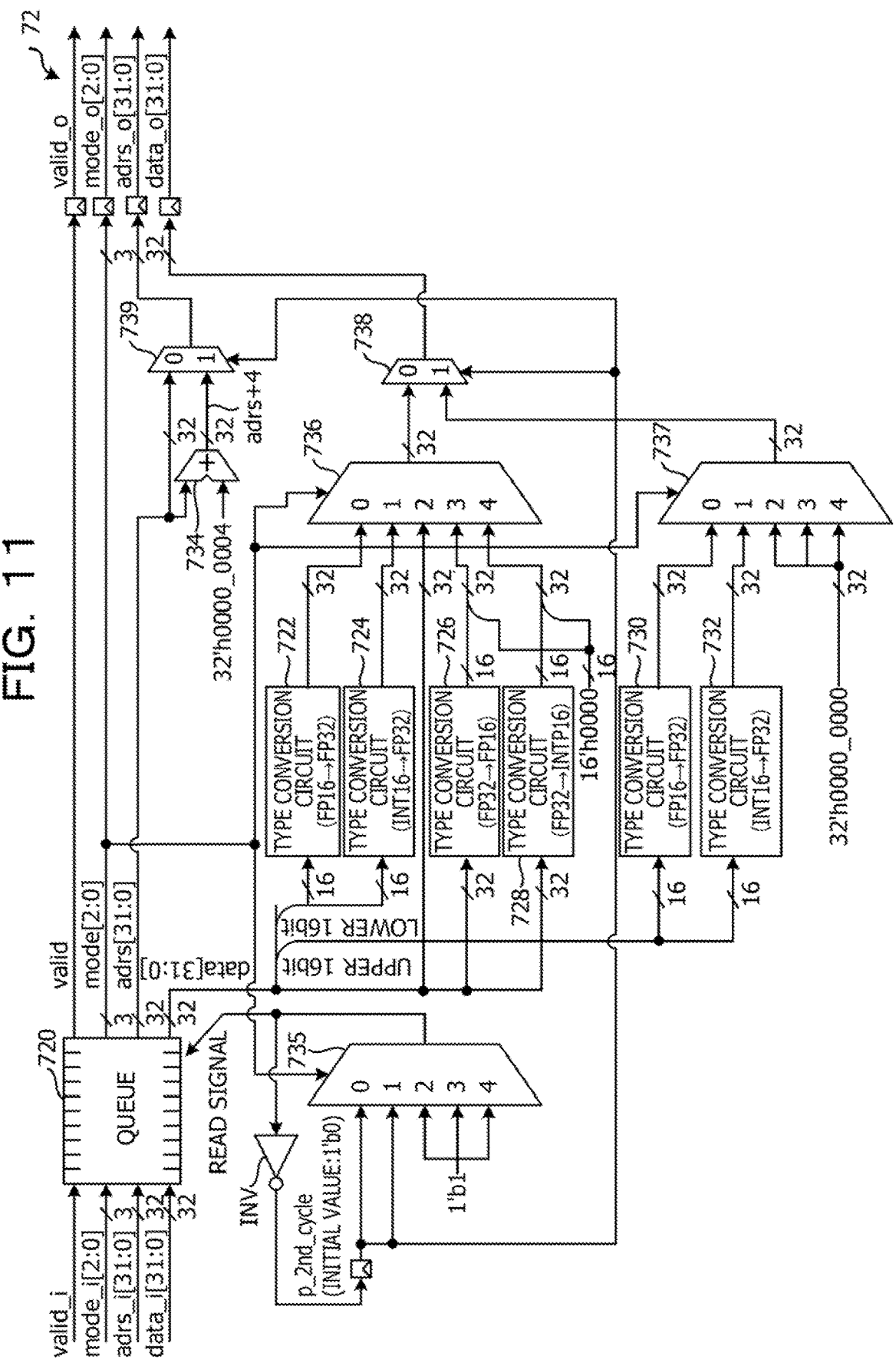
FIG. 11 is a diagram illustrating an example of a type conversion unit in FIG. 10.

FIG. 11 illustrates an example of the type conversion unit 72 in FIG. 10. The type conversion unit 72 includes a queue 720, type conversion circuits 722, 724, 726, 728, 730, and 732, an adder 734, selectors 735, 736, 737, 738, and 739, and an inverter INV. A rectangle including a triangle representing a clock input represents a latch. The type conversion unit 72 has a function to convert a data type of data data (feature data) sequentially extracted from a head of the queue 720 according to a mode signal mode and output the data type as data data_o.

The numerical values in the angle brackets attached after each signal name and the numerical value after "/" attached to the signal line represent the number of bits of the signal.

"1'b0" represents 1 bit="0" in binary representation, and "1'b1" represents 1 bit="1" in binary representation. "16'h0000" represents 16 bits (all zeros) in hexadecimal representation, and "32'h0000_0004" represents 32 bits (=4) in hexadecimal representation.

The queue 720 has a plurality of entries that holds a valid signal valid_i, a mode signal mode_i, an address signal adrs_i, and data data_i. The valid signal valid _i represents whether the mode signal modei, the address signal adrs_i, and the data data_i are valid. The mode signal mode_i represents a specification of type conversion, and is an example of first specification information and second specification information. The address signal adrs_i represents a transfer destination of the data data_o with a converted data type. The data data_i represents the feature data before the data type is converted. The queue 720 updates a read pointer (not illustrated) in a case where a read signal is in a valid state (="1").

FIG. 12 illustrates an example of a type conversion specification for the data data by the type conversion unit 72 in FIG. 11. The mode signal mode="0" represents conversion from two pieces of FP16 to two pieces of FP32. The two pieces of FP32 generated by conversion are output in two clock cycles. The mode signal mode_i="1" represents conversion from two pieces of INT16 to two pieces of FP32. The two pieces of FP32 generated by conversion are output in two clock cycles. The mode signal mode_i="2" represents that FP32 is output without being converted.

The mode signal mode_i="3" represents conversion from FP32 to FP16. Upper 16 bits of the data data_o from which the FP16 generated by conversion is output are filled with "0". The mode signal mode_i="4" represents conversion from FP32 to INT16. The upper 16 bits of the data data_o from which the INT16 generated by conversion is output are filled with "0". Hereinafter, the type conversion modes are referred to as mode 0, mode 1, mode 2, mode 3, and mode 4 corresponding to the values of the mode signal mode_i. For example, the mode 0 represents conversion from FP16 to FP32, and the mode 4 represents conversion from FP32 to INT16.

Returning to FIG. 11, each type conversion circuit 722, 724, 726, 728, 730, or 732 operates every clock cycle, and converts the data type of the data data on a data line data regardless of whether the valid signal valid is valid or invalid. The selector 735 outputs a value selected according to the mode indicated by the mode signal mode to the queue 720 as a read signal. The type conversion circuits 722 and 730 correspond to the type conversion circuit 72A in FIG. 10, and the type conversion circuits 724 and 732 correspond to the type conversion circuit 72B in FIG. 10. The type conversion circuit 728 corresponds to the type conversion circuit 72C in FIG. 10.

In the modes 0 and 1, the selector 735 outputs a cycle signal p_2nd_cycle with a logic inverted according to the clock cycle as a read signal. In the modes 0 and 1, the read signal is set to "0" in the first cycle (no update in the read pointer) and is set to "1" in the next cycle by the read signal with a logic inverted via the inverter INV (updating the read pointer), Therefore, in the mode 0 (or the mode 1), two pieces of FP16 (or two pieces of INT16) read from the queue 720 in the first cycle are converted into two pieces of FP32 in two clock cycles.

Meanwhile, in the modes 2, 3, and 4, the selector 735 fixes the read signal to "1" regardless of the clock cycle and updates the read pointer every clock cycle. Note that, in the modes 2, 3, and 4, since the data type of the data data is converted every dock cycle, the cycle signal p_2nd_cycle is initialized every clock cycle and maintained at "0".

The type conversion circuit 722 converts FP16 represented by lower 16 bits of the data data into FP32. The type conversion circuit 724 converts INT16 represented by the lower 16 bits of the data data into FP32. The type conversion circuit 726 converts the data data (FP32) into FP16 and outputs the data data to the lower 16 bits. The type conversion circuit 728 converts the data data (FP32) into INT16 and outputs the data data to the lower 16 bits. The type conversion circuit 730 converts FP16 represented by the upper 16 bits of the data data into FP32. The type conversion circuit 732 converts INT16 represented by the upper 16 bits of the data data into FP32.

The selector 736 selects any output or data data of the type conversion circuits 722, 724, 726, and 728 according to the mode indicated by the mode signal mode. The selector 737 selects either output of the type conversion circuits 730 and 732 or all 0 according to the mode indicated by the mode signal mode.

The selector 738 selects the output of the selector 736 when the cycle signal p_2nd_cycle is "0", and selects the output of the selector 737 when the cycle signal p_2nd_cycle is "1". For example, when the cycle signal p_2nd_cycle is "0", the FP32 converted from FP16 (or INT16) of the lower 16 bits, the original FP32, or the FP16 (or INT16) converted from FP32 is selected as the data data_o. When the cycle signal p_2nd_cycle is "1", FP32 converted from FP16 (or INT16) of the upper 16 bits or all 0 is selected as the data data_o.

The selector 739 outputs an address signal adrs output from the queue 720 as the address signal adrs_o when the cycle signal p_2nd_cycle is "0". The selector 739 outputs an address signal adrs+4 output from the adder 734 as the address signal adrs_o when the cycle signal p_2nd_cycle is "1". For example, when the cycle signal p_2nd_cycle is "1" and the FP32 converted from FP16 (or INT16) of the upper 16 bits is output as the data datao, the address signal adrs_o is updated by an area of 4 bytes. Thereby, storage of two pieces of FP32 converted from two pieces of FP16 or two pieces of INT16 in overlapping memory areas can be suppressed. Note that the valid signal valid_i is output as it is as the valid signal valid_o, and the mode signal mode_i is output as it is as the mode signal mode_o.

Figure 13A:
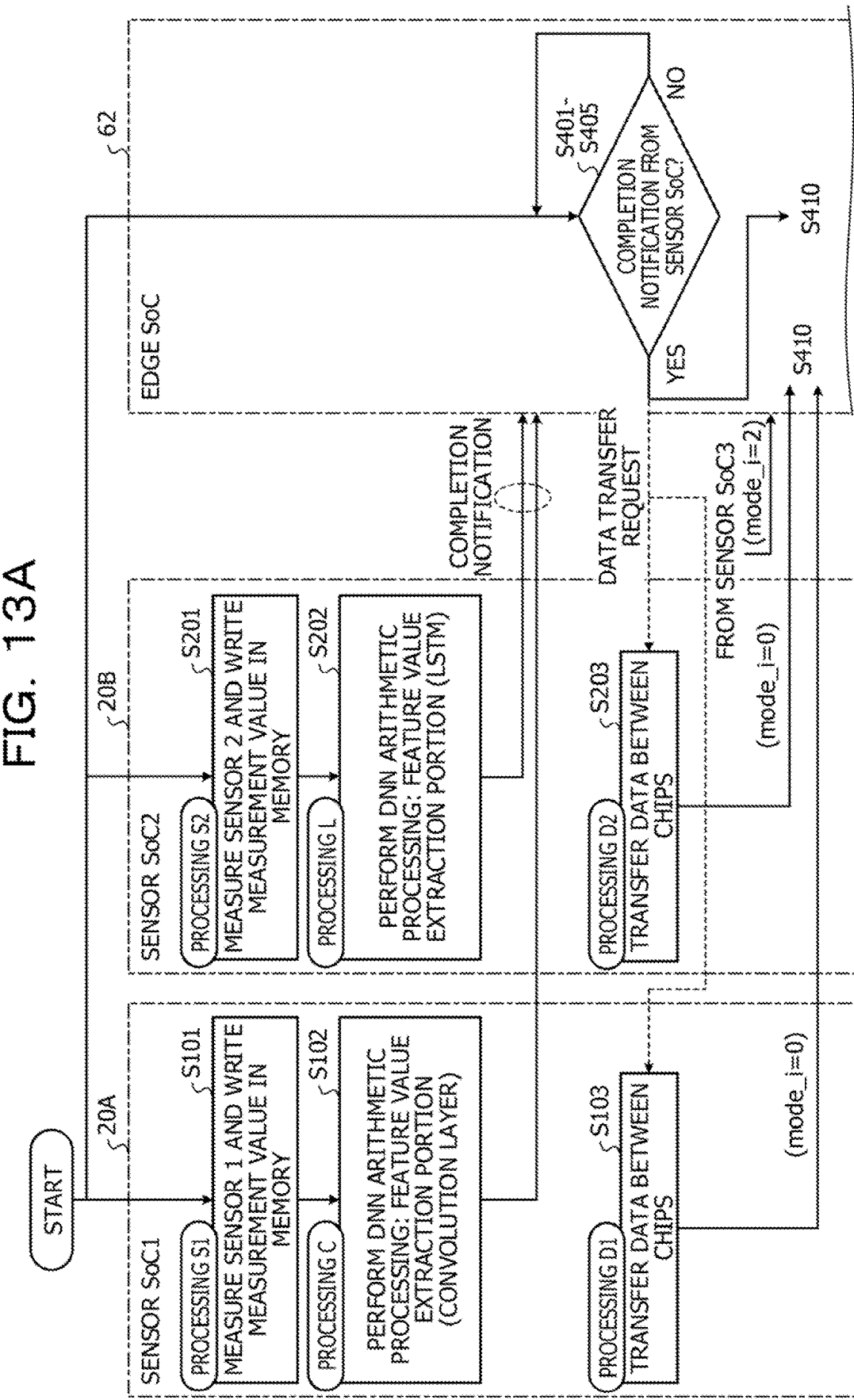
FIGS. 13A and 13B are a diagram illustrating an example of an operation flow in a case where the information processing apparatus in FIG. 10 executes inference processing by a multimodal DNN.
Figure 13B:
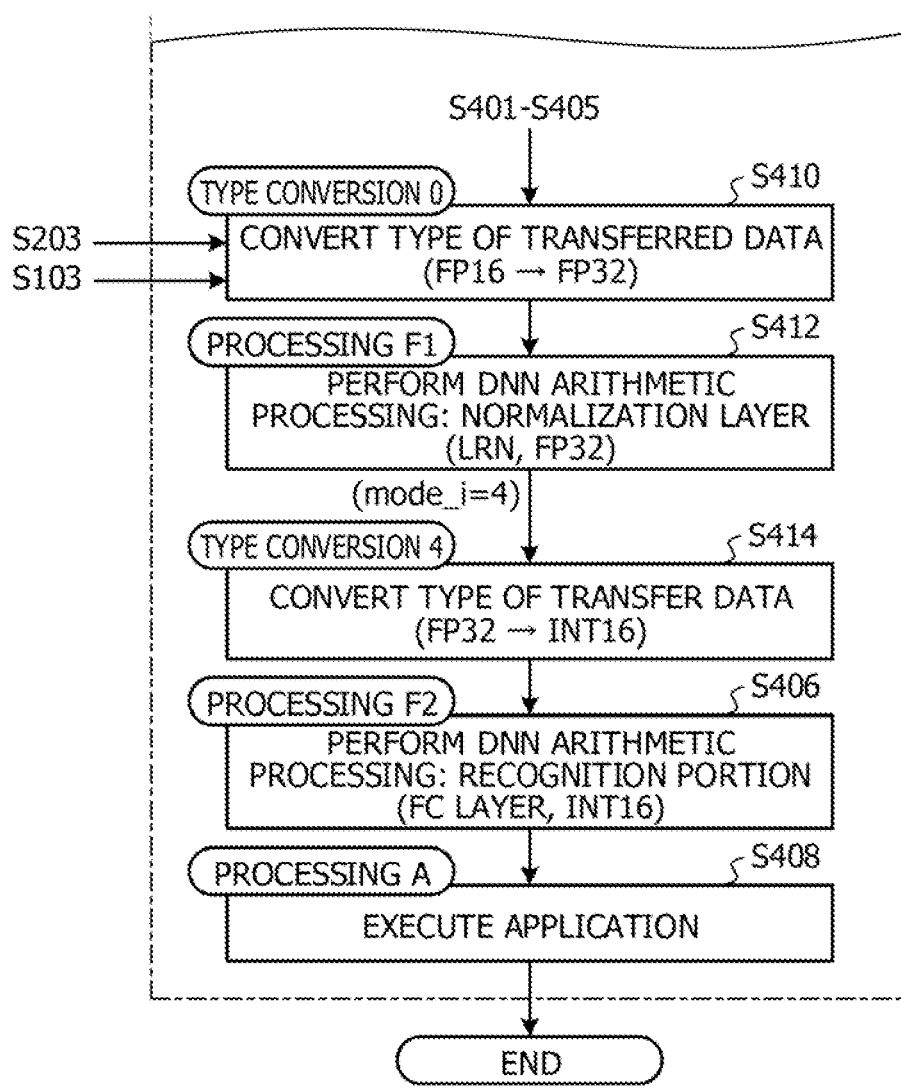

The 32-bit data data_o output from the type conversion unit 72 is written into the memory 90 illustrated in FIG. 10 and is then read out by the arithmetic core 82, and is used for the normalization processing or the recognition processing as described in FIGS. 13A and 13B.

FIGS. 13A and 13B illustrate an example of an operation flow in a case where the information processing apparatus 102 in FIG. 10 executes inference processing by a multimodal DNN. For example, FIGS. 13A and 13B illustrate an example of a method of controlling the information processing apparatus 102. Detailed description of operations similar to those in FIGS. 7A to 7C is omitted. Since the operation of the sensor SoC 3 (for example, the sensor SoC 20C) is the same as those in FIGS. 7A to 7C, description thereof will be omitted. Note that the information processing apparatus 102 may not have the sensor SoC 3. For example, the operation illustrated in FIGS. 13A and 13B are repeatedly executed until the inference processing is completed on the basis of the information processing apparatus 102 having received a request of a service by the multimodal DNN inference processing from the user.

In this embodiment, the sensor SoC 1 (for example, the sensor SoC 20A) executes the processing C with the convolution layer in step S102 using the data of FP16. The sensor SoC 2 (for example, the sensor SoC 208) executes the processing L with the LSTM in step S202 using the data of FP16. By executing the convolution processing and the LSTM processing using FP16, arithmetic efficiency and power efficiency can be improved as compared with the case of using FP32. For example, the feature data can be extracted in a shorter time and with smaller power than the case of using the FP32. The sensor SoC 3 executes the processing F2 with the fully connected layer using the data of INT16.

Note that the convolution processing and the LSTM processing may be executed using INT16 or INT8 (8-bit fixed-point number data). In this case, the arithmetic cores 40A and 40B of the sensors SoC 1 and SoC 2 specialized for inference can be reduced in chip size and power consumption by mounting an arithmetic core for INT16 or an arithmetic core for INT8. In the case of using INT8, the type conversion unit 72 is provided with a type conversion circuit that converts INT8 into INT32.

The arithmetic core 82 (FIG. 10) of the edge SoC waits for the completion notification from each sensor SoC and outputs the data transfer request to the sensor SoC that has issued the completion notification, similarly to steps S401 to S405 in FIGS. 7A to 7C. The sensor SoC 1 outputs the feature data (FP16) stored in the memory 55A together with the valid signal valid_i=1, the mode signal mode_i=0, and the address signal adrs_i toward the memory 90 on the basis of the data transfer request. The sensor SoC 2 outputs the feature data (FP16) stored in the memory 55B together with the valid signal valid_i=1, the mode signal mode_i=0, and the address signal adrs_i toward the memory 90 on the basis of the data transfer request. The sensor SoC 3 outputs the feature data (FP32) stored in the memory 55C together with the valid signal valid_i=1, the mode signal mode_i=2, and the address signal adrs_i toward the memory 90 on the basis of the data transfer request. The mode signal mode_i=0 represents conversion from FP16 to FP32, and the mode signal mode_i=2 represents that FP32 is output as it is without being converted.

In step S410, in a case where the type conversion unit 72 has received the feature data transferred from the sensors SoC 1 and SoC 2 to the memory 90 together with the mode signal mode_i and the like, the type conversion unit 72 executes the processing (type conversion 0) of converting the feature data of FP16 into FP32. The type conversion unit 72 outputs the feature data (data_o) converted into FP32 together with the valid signal valid_o=1 and the address signal adrs_o to the memory 90, and causes the memory 90 to store the feature data. Note that, in a case where the type conversion unit 72 has received the feature data transferred from the sensor SoC 3 to the memory 90 together with the mode signal mode_i=2, the type conversion unit 72 causes the memory 90 to store the feature data without converting the data type.

Next, in step S412, the arithmetic core 82 executes the normalization processing F1 with the normalization layer using the converted feature data of FP32 stored in the memory 90, and causes the memory 90 to store the normalized feature data. Furthermore, the arithmetic core 82 generates the mode signal mode_=4 for converting the normalized feature data (FP32) into INT16, and causes the memory 90 to store the mode signal with the normalized feature. For example, a local response normalization (LRN) layer or a batch normalization layer may be used as the normalization layer.

The normalization layer has an effect of improving a convergence speed of training processing of a DNN and an effect of improving recognition accuracy of the DNN. Meanwhile, the processing with the normalization layer includes calculations by division and exponential functions, so that in a case of using a data format with a small bit width such as FP16, the influence on a calculation error increases and there is a possibility of a decrease in the recognition accuracy of the DNN. Therefore, to suppress the deterioration of the recognition accuracy of the DNN, it is desirable to use FP32 or FP64 (64-bit floating-point number data) for the processing of the normalization layer.

Note that, in a case of executing another processing such as convolution processing by the sensor SoC in accordance with the bit width of data suitable for normalization in order to suppress the decrease in the recognition accuracy, the processing time becomes long and the power increases. In this embodiment, the decrease in the recognition accuracy can be suppressed by using FP32 only for normalization processing.

Next, in step S414, the type conversion unit 72 executes processing (type conversion 4) of converting the feature data of FP32 after the normalization processing stored in the memory 90 into INT16 on the basis of the mode signal mode_i=4 stored in the memory 99. For example, a conversion instruction (the mode signal mode_i, the address signal adrs_i, and the like) to the type conversion unit 72 is written into the memory 90 by the arithmetic core 82 that executes the normalization processing together with the data to be converted. By generating the conversion instruction such as the mode signal mocle_i by the arithmetic core 82, type conversion for the feature data after normalization can be executed using the type conversion unit 72 that converts the type of the feature data from the sensor SoC.

The feature data converted to INT16 is stored in the memory 90 according to the address signal adrs_o. Next, in step S406, the arithmetic core 82 executes the recognition processing F2 with the fully connected layer using the normalized feature data of INT16 stored in the memory 90, and causes the memory 90 to store an obtained recognition result, similarly to FIGS. 7B and 7C.

Next, in step S408, the arithmetic core 82 executes an application using the recognition result stored in the memory 90 as an input, executes processing of various services, or executes processing of controlling control devices such as actuators, similarly to FIGS. 7B and 7C. Then, execution of the multimodal INN inference processing in one cycle ends.

In a case where the edge SoC 62 does not have the type conversion unit 72, the data type conversion is executed by the arithmetic core 82. In this case, the arithmetic processing with the fully connected layer and the like is not able to be executed during execution of the type conversion, and the processing efficiency of the arithmetic core 82 decreases. Therefore, in this embodiment, by providing the dedicated type conversion unit 72 that executes data type conversion on a data transfer path between the I/O controller 70 and the arithmetic core 82, application of a load due to type conversion on the arithmetic core 82 is suppressed (concealment of type conversion overhead). Thereby, the arithmetic core 82 can concentrate on the recognition processing with the fully connected layer. Furthermore, since the type conversion unit 72 is arranged between the selector 77 and the memory 90, the type conversion unit 72 can convert the data type of the feature data before being transferred from the sensors SoC 1 and SoC 2 and stored in the memory 90. As a result, a transfer frequency to the memory 90 can be reduced.

As described above, by executing the feature data extraction processing with FP16 and executing the normalization layer processing with FP32, the processing time of the inference processing can be reduced while improving the arithmetic efficiency and the power efficiency, and the degradation of the recognition accuracy of a DNN can be suppressed. Moreover, by executing the recognition processing with the fully connected layer after converting the result of the normalization processing into INT16, the arithmetic efficiency and the power efficiency of the recognition processing can be improved.

Furthermore, by executing the feature data extraction processing and the recognition processing with the fully connected layer using the 16-bit data representation, the memory area used for the processing can be reduced. Note that, in the inference processing using a trained DNN, the influence of calculation error of an arithmetic result on the recognition accuracy of the DNN is small even in a case of using data representation with a small bit width such as FP16 or INT16.

By providing the dedicated type conversion unit 72, the data type conversion can be executed in parallel with the processing by the sensor SoC 20 and the processing by the edge SoC 60. Therefore, the type conversion overhead can be concealed. As a result, both the improvement of the DNN inference processing by optimized data representation and the improvement of the recognition accuracy of a DNN can be achieved.

As described above, in the embodiment illustrated in FIGS. 10 to 13B, similar effects to those in the embodiments illustrated in FIGS. 1 to 9 can be obtained. Moreover, in the embodiment illustrated in FIGS. 10 to 13B, the feature data extraction processing is executed with FP16, the processing with the normalization layer is executed with the FP32, and the recognition processing with the fully connected layer is executed with the INT16. Thereby, the total processing time of the inference processing can be reduced while improving the arithmetic efficiency and the power efficiency, and the deterioration of the recognition accuracy of a DNN can be suppressed. Furthermore, the memory area used for the feature data extraction processing and the recognition processing with the fully connected layer can be reduced.

By providing the dedicated type conversion unit 72, the data type conversion can be executed in parallel with the processing by the sensor SoC 20 and the processing by the edge SoC 60. Therefore, the type conversion overhead can be concealed. As a result, both the improvement of the DNN inference processing by optimized data representation and the improvement of the recognition accuracy of a DNN can be achieved. By generating the conversion instruction such as the mode signal mode_i by the arithmetic core 82, type conversion for the feature data after normalization can be executed using the type conversion unit 72 that converts the type of the feature data from the sensor SoC.

Figure 14:
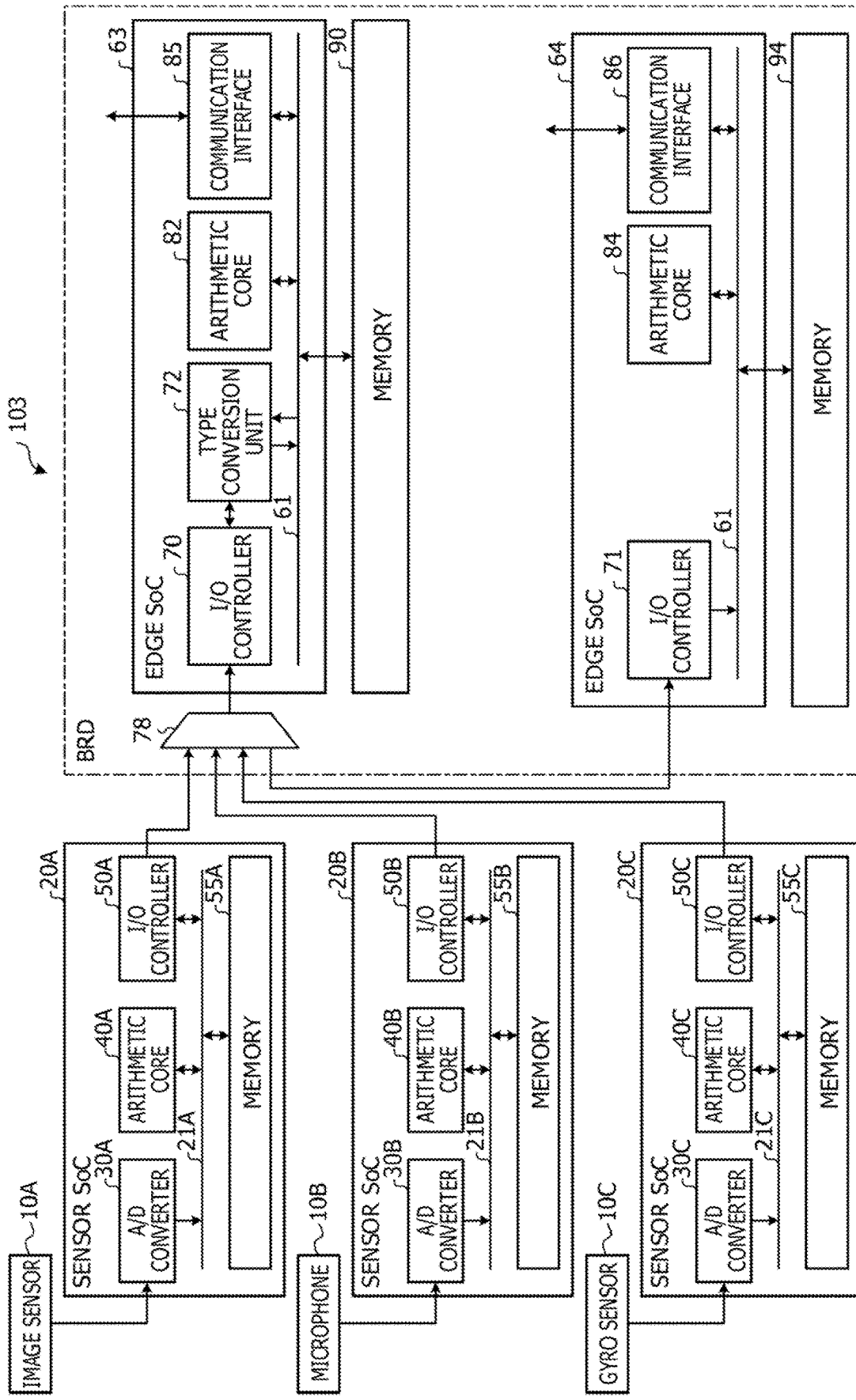
FIG. 14 is a diagram illustrating an example of an information processing apparatus according to another embodiment.

FIG. 14 illustrates an example of an information processing apparatus according to another embodiment. Detailed description of elements similar to those in FIGS. 2 and 10 is omitted. An information processing apparatus 103 illustrated in FIG. 14 is similar to the information processing apparatus 102 illustrated in FIG. 10 except that the information processing apparatus 103 includes a selector 78 instead of the selector 77 illustrated in FIG. 10 and including edge SoCs 63 and 64 instead of the edge SoC 62 illustrated in FIG. 10. The edge SoCs 63 and 64 are mounted on a motherboard BRD of the information processing apparatus 103 together with the selector 78 and memories 90 and 94. The information processing apparatus 103 executes multimodal DNN inference processing, similarly to the information processing apparatus 102 illustrated in FIG. 10.

The selector 78 has a function to connect an output of an I/O controller 70 to an input of the edge SoC 64 in addition to the function of the selector 77 illustrated in FIG. 10. The edge SoC 63 has a similar function to the edge SoC 62 illustrated in FIG. 10 except that the edge SoC 63 includes an arithmetic core 83 instead of the arithmetic core 82. The edge SoC 63 is an example of the first post-processing arithmetic device and the arithmetic processing device. The arithmetic core 83 has a similar function to the arithmetic core 82 illustrated in FIG. 10 except that architecture is optimized for a normalization layer for normalizing feature data of FP32. As described with reference to FIG. 10, a type conversion unit 72 has a function to convert FP16 into FP32, a function to convert INT16 into FP32, and a function to convert FP32 into INT16.

The edge SoC 64 includes an I/O controller 71, an arithmetic core 84, and a communication interface 86 connected to one another via a bus 69. The memory 94 is connected to the bus 69. Similarly to the memory 90, the memory 94 includes a main storage device. The I/O controller 71 has a function to cause the memory 94 to store normalized feature data transferred from the I/O controller 70. The arithmetic core 84 has a similar function to the arithmetic core 82 illustrated in FIG. 10 except that architecture is optimized for DNN recognition processing for the normalized feature data. The communication interface 86 has a similar function to the communication interface 85. The edge SoC 64 is an example of a second post-processing arithmetic device and the arithmetic processing device, and the I/O controller 71 is an example of a second input unit. The arithmetic core 84 is an example of a second post-processing arithmetic unit, and the memory 94 is an example of a second storage unit.

Figure 15A:
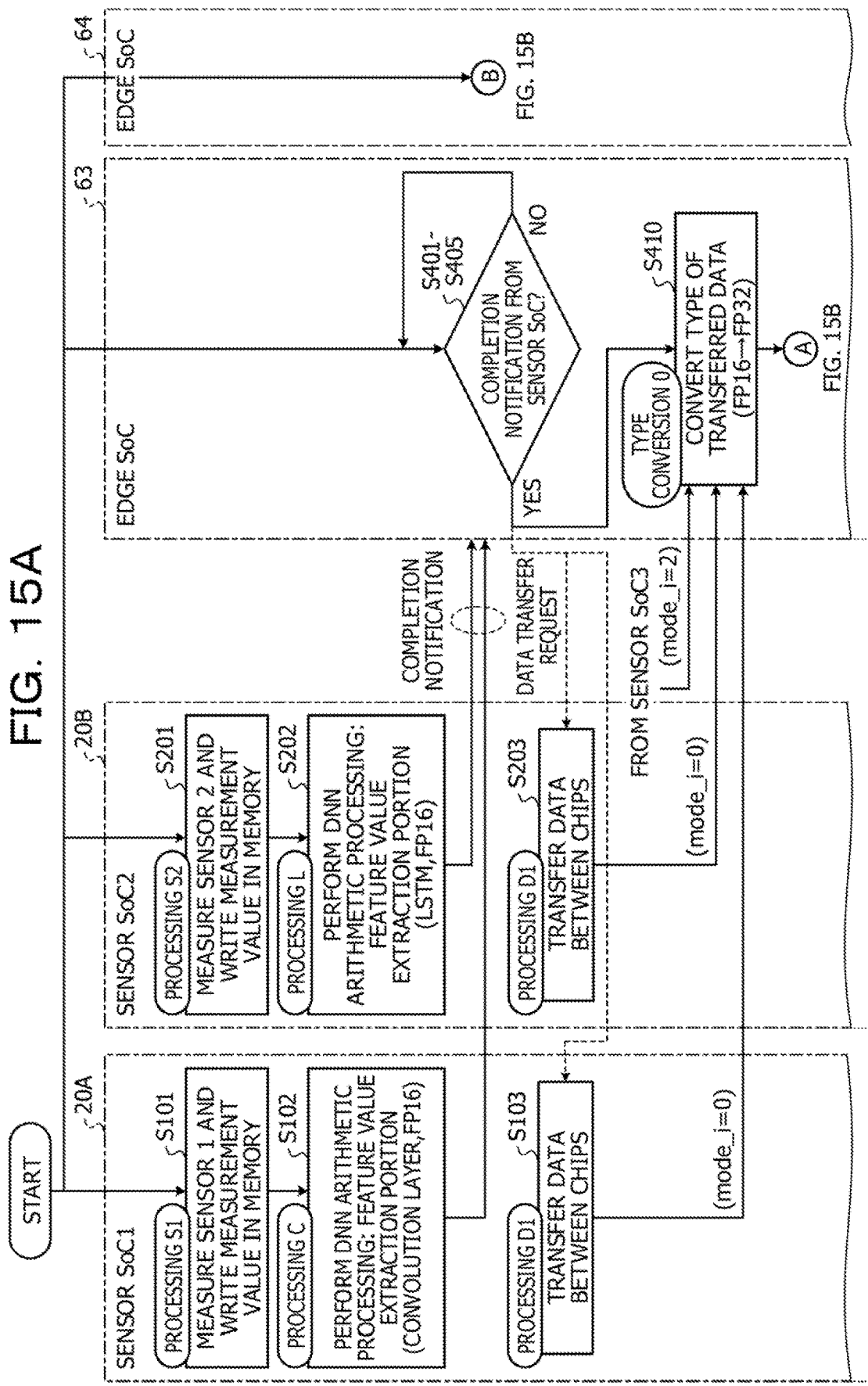
FIG. 15A is a diagram illustrating an example of an operation flow in a case where the information processing apparatus in FIG. 14 executes inference processing by a multimodal DNN.
Figure 15B:
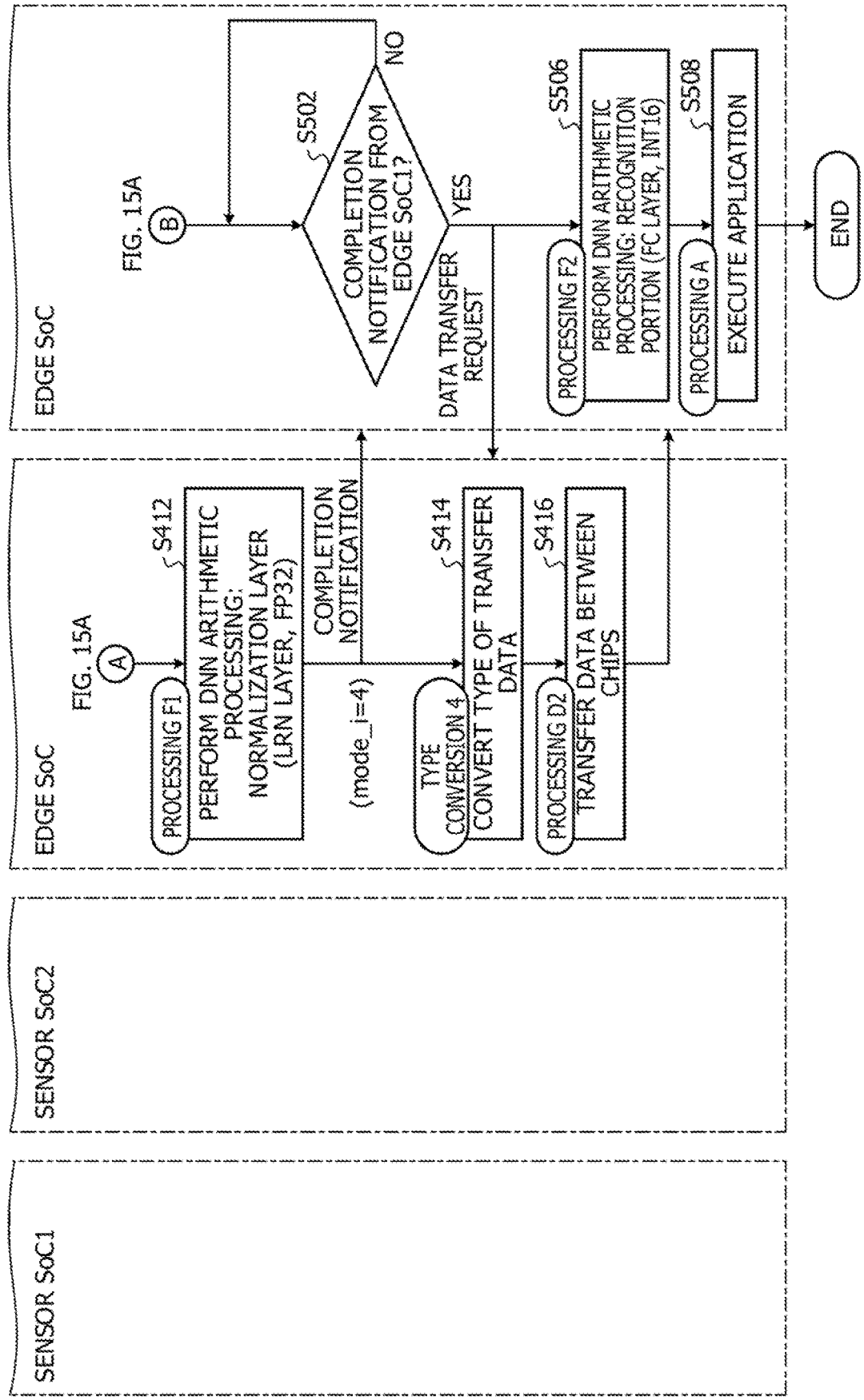
FIG. 15B is a diagram illustrating continuation of FIG. 15A.

FIGS. 15A and 15B are diagrams illustrating an example of an operation flow in a case where the information processing apparatus 103 in FIG. 14 executes inference processing by a multimodal DNN. For example, FIGS. 15A and 15B illustrate an example of a method of controlling the information processing apparatus 103. Detailed description of operations same as those in FIGS. 7A to 7C, 13A and 13B is omitted. Since an operation of a sensor SoC 3 (for example, a sensor SoC 20C) is the same as those in FIGS. 7A to 7C, description thereof will be omitted. Note that the information processing apparatus 103 may not have the sensor SoC 3. For example, the operations illustrated in FIGS. 15A and 15B are repeatedly executed until the inference processing is completed on the basis of the information processing apparatus 103 having received a request of a service by the multimodal DNN inference processing from the user. The operation of a sensor SoC 1 (for example, a sensor SoC 20A) and the operation of a sensor SoC 2 (for example, a sensor SoC 20B) are similar to those in FIGS. 13A and 13B.

In the operation of the edge SoC 63, steps S406 and S408 are deleted from the operation of the edge SoC 62 illustrated in FIGS. 13A and 13B, and the operation of step S416 is newly added. For example, in step S410, the type conversion unit 72 converts the feature data of FP16 transferred from the sensor SoCs 20A and 20B into the feature data of FP32, and stores the feature data in the memory 90, In step S412, the arithmetic core 83 executes the normalization processing with the normalization layer using the feature data of FP32 stored in the memory 90.

The arithmetic core 83 issues a completion notification to the arithmetic core 84 of the edge SoC 64 after completion of the normalization processing. The completion notification may be transmitted via the I/O controller 70, the selector 78, and the I/O controller 71, or may be transmitted via communication interfaces 85 and 86. In step S502, the arithmetic core 84 of the edge SOC 64 waits for the completion notification from the arithmetic core 83. In a case of having received the completion notification, the arithmetic core 84 issues a data transfer request to the edge SoC 63, and transfers the operation to step S506.

In a case of having received the data transfer request from the arithmetic core 84, the arithmetic core 83 of the edge SoC 63 generates an instruction (a mode signal mode_i, an address signal adrs_i, and the like) for converting a data type of the normalized feature data, and issues the instruction to the type conversion unit 72. Note that the instruction to the type conversion unit 72 may be executed by control by a control program executed by the arithmetic core 83, or may be executed by a controller (hardware) included in the edge SoC 63.

In step S414, the type conversion unit 72 reads the feature data of FP32 after the normalization processing stored in the memory 90, converts the feature data to feature data of INT16, and transfers the converted feature data to the I/O controller 70. In step S416, the I/O controller 70 transfers the normalized feature data (INT16) transferred from the type conversion unit 72 to the edge SoC 64. The normalized feature data transferred to the edge SOC 64 is stored in the memory 94.

After the normalized feature data is stored in the memory 94, the arithmetic core 84 sequentially executes steps S506 and S508. The processing in step S506 is the same as the processing in step S406 illustrated in FIGS. 13A and 13B, and the processing in step S508 is the same as the processing in step S408 illustrated in FIGS. 13A and 13B. Then, execution of the multimodal DNN inference processing in the operation cycle ends.

As described above, in the embodiment illustrated in FIGS. 14 to 15B, similar effects to those in the embodiments illustrated in FIGS. 1 to 13B can be obtained. Moreover, in the embodiment illustrated in FIGS. 14 and 158, the information processing apparatus 103 includes the arithmetic core 83 with optimized architecture for executing the normalization processing with the normalization layer and the arithmetic core 84 with optimized architecture for executing the recognition processing with a fully connected layer. With the configuration, the information processing apparatus 103 can improve the processing efficiency of the normalization processing and the recognition processing and can shorten the processing time, as compared with the information processing apparatus 102 illustrated in FIG. 10.

Figure 16:
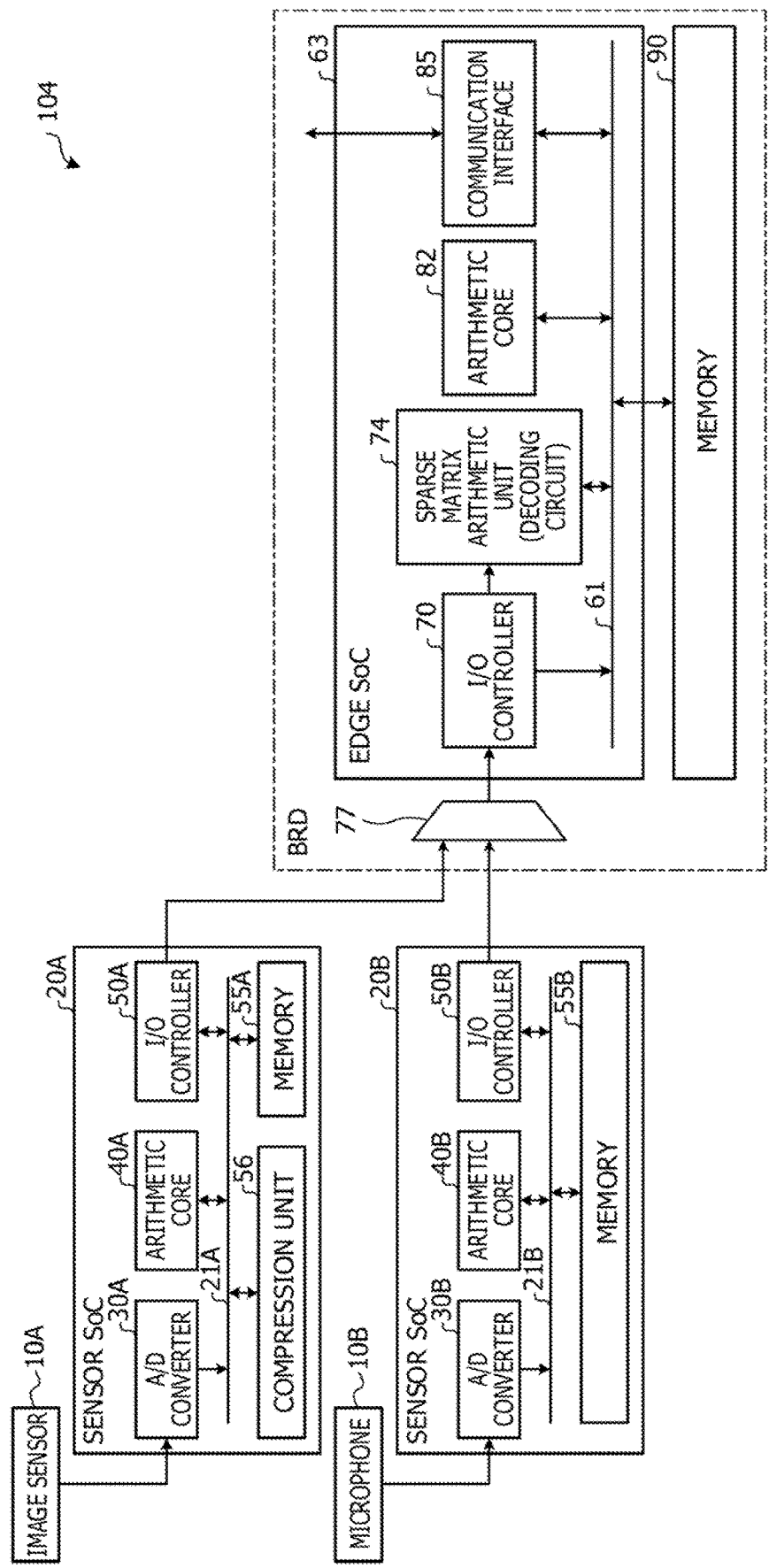
FIG. 16 is a diagram illustrating an example of an information processing apparatus according to another embodiment.

FIG. 16 illustrates an example of an information processing apparatus according to another embodiment. Elements similar to those in FIGS. 2 and 10 are denoted by the same reference numerals, and detailed description is omitted. In an information processing apparatus 104 illustrated in FIG. 16, a compression unit 56 connected to a bus 21A is added to the sensor SoC 20A illustrated in FIG. 10. The compression unit 56 is an example of a first compression unit. The compression unit 56 of the sensor SoC 20A has a function to compress an information amount of feature data of image data extracted by an arithmetic core 40A. An example of the compression unit 56 will be described with reference to FIGS. 18 to 24. The information processing apparatus 104 does not include the gyro sensor 10C and the sensor SoC 20C in FIG. 2.

Furthermore, an edge SoC 63 of the information processing apparatus 104 includes a sparse matrix arithmetic unit 74

(decoding circuit) connected to a bus 61 instead of the type conversion unit 72 illustrated in FIG. 10. The edge SoC 63 receives the feature data from sensor SoCs 20A and 20B via a selector 77. The sparse matrix arithmetic unit 74 of the edge SOC 63 has a function to decode compressed feature data transferred from the sensor SoC 20A to a memory 90. An example of the sparse matrix arithmetic unit 74 will be described with reference to FIGS. 25 to 28.

Other configurations of the information processing apparatus 104 are similar to those of the information processing apparatus 102 illustrated in FIG. 10. The information processing apparatus 104 executes multimodal DNN inference processing, similarly to the information processing apparatus 102 illustrated in FIG. 10, using image data measured by an image sensor 10A and sound data measured by a microphone 10B.

FIG. 17 illustrates an example of the number of pieces of feature data output every time the sensor SoCs 20A and 20B in FIG. 16 extract the feature data. For example, the extraction of the feature data by the sensor SoCs 20A and 20B is executed every time the image sensor 10A acquires the image data (for example, about 30 times per second). A period during which the feature data is extracted and recognition processing is executed is called the operation cycle, similarly to the description in FIGS. 7A to 7C. The sensor SoC 20A compresses 2048 pieces of feature data extracted by the arithmetic core 40A for each operation cycle to 1024 pieces of feature data using the compression unit 56, and outputs the compressed feature data toward the edge SoC 63. The sensor SoC 20B outputs 1024 pieces of feature data extracted by an arithmetic core 40B for each operation cycle toward the edge SoC 63. The total number of feature data extracted by the sensors SoC 20A and 20B is 3072, and the total number of feature data output from the sensor SoC 20A and 20B to the edge SoC 63 is 2048.

Figure 18:
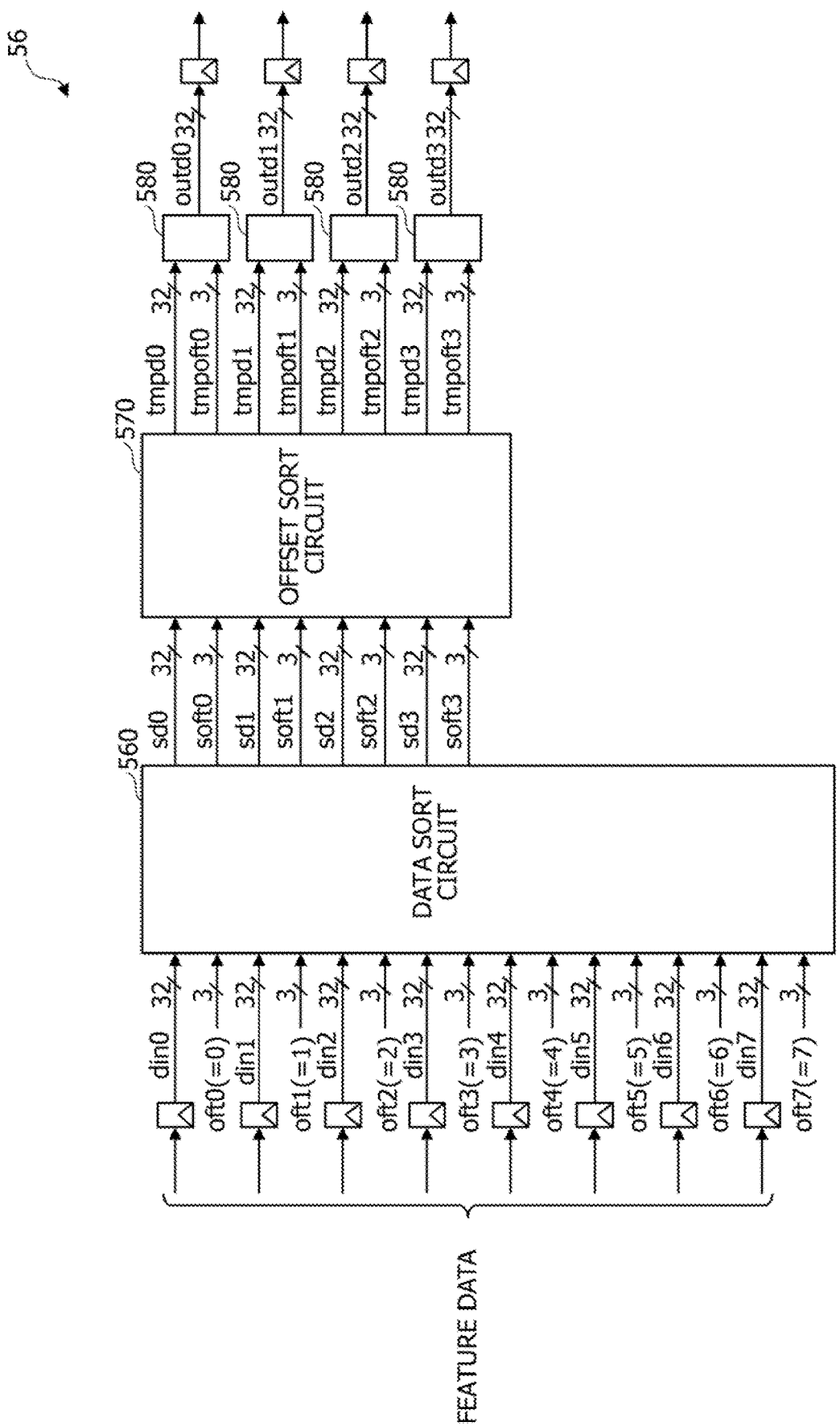
FIG. 18 is a diagram illustrating an example of a compression unit in FIG. 16.

FIG. 18 illustrates an example of the compression unit 56 in FIG. 16. A rectangle including a triangle representing a clock input represents a latch. The compression unit 56 includes a data sort circuit 560, an offset sort circuit 570, and a plurality of packing circuits 580.

The compression unit 56 compresses eight pieces of feature data (din0-din8) into four pieces of feature data (outd0-outd3) (compression rate=50%) each clock cycle. The feature data outd0-outd3 is an example of compressed feature data. Since the four pieces of feature data that are not output as the feature data outd0-outd3 are discarded, the compression unit 56 irreversibly compresses the data. FIG. 18 illustrates an example of selectively outputting four out of the eight pieces of data din for easy understanding. However, the number of input data din and the number of output data outd are not limited to the example illustrated in FIG. 18 as long as the number of data din > the number of data outd is satisfied. For example, the data type of the data din is FF32, but data din of another data type may be used.

The data sort circuit 560 receives data din (din0-din7) that are eight pieces of feature data extracted by the arithmetic core 40A, and offsets oft (oft0-oft7) indicating input positions of the data din to the data sort circuit 560 every clock cycle. The offset oft is added corresponding to the data din to determine an array order of the data din, and the data din and the offset oft having the same number are paired. Note that the offset oft may be added by the data sort circuit 560 for each data din corresponding to a terminal that receives the data din. The offset oft is an example of array information.

The data sort circuit 560 outputs four pieces of data including data din corresponding to the offset oft with a prespecified number and three pieces of data din having large absolute values of the seven pieces of data din corresponding to the other seven offsets oft as sort data sd (sd0-sd3). The sort data sd is output together with offsets soft (soft0-soft3) corresponding to the sort data sd.

Hereinafter, it is assumed that the offset oft0 is prespecified, and the data din0 corresponding to the offset oft0 is usually output as the sort data sd0. In this case, the data sort circuit 560 outputs the data din0 and the three pieces of data din having large absolute values of the seven pieces of data din1-din7 as the sort data sd (sd0-sd3) together with the offsets soft (soft0-soft3). The offset sort circuit 570 rearranges the four pieces of sort data sd in ascending order of the offsets soft, and outputs the data as sort data tmpd (tmpd0-tmpd3) and offsets tmpoft (tmpoft0-tmpoft3).

The packing circuits 580 embed values of the offsets tmpoft in the sort data tmpd output from the offset sort circuit 570, and outputs the data as data out (out0-out3). For example, the packing circuit 580 generates data outd in which lower 3 bits (3 bits on the smaller value side) of a mantissa part of a floating-point number tmpd are replaced with the offset tmpoft. In a case where the data din, sd, and tmpd of FP32 are expressed in the IEEE (The Institute of Electrical and Electronics Engineers) 754 format, lower 3 bits of a 23-bit mantissa part of the data tmpd are replaced with the offset tmpoft and is output as the data outd.

Figure 19:
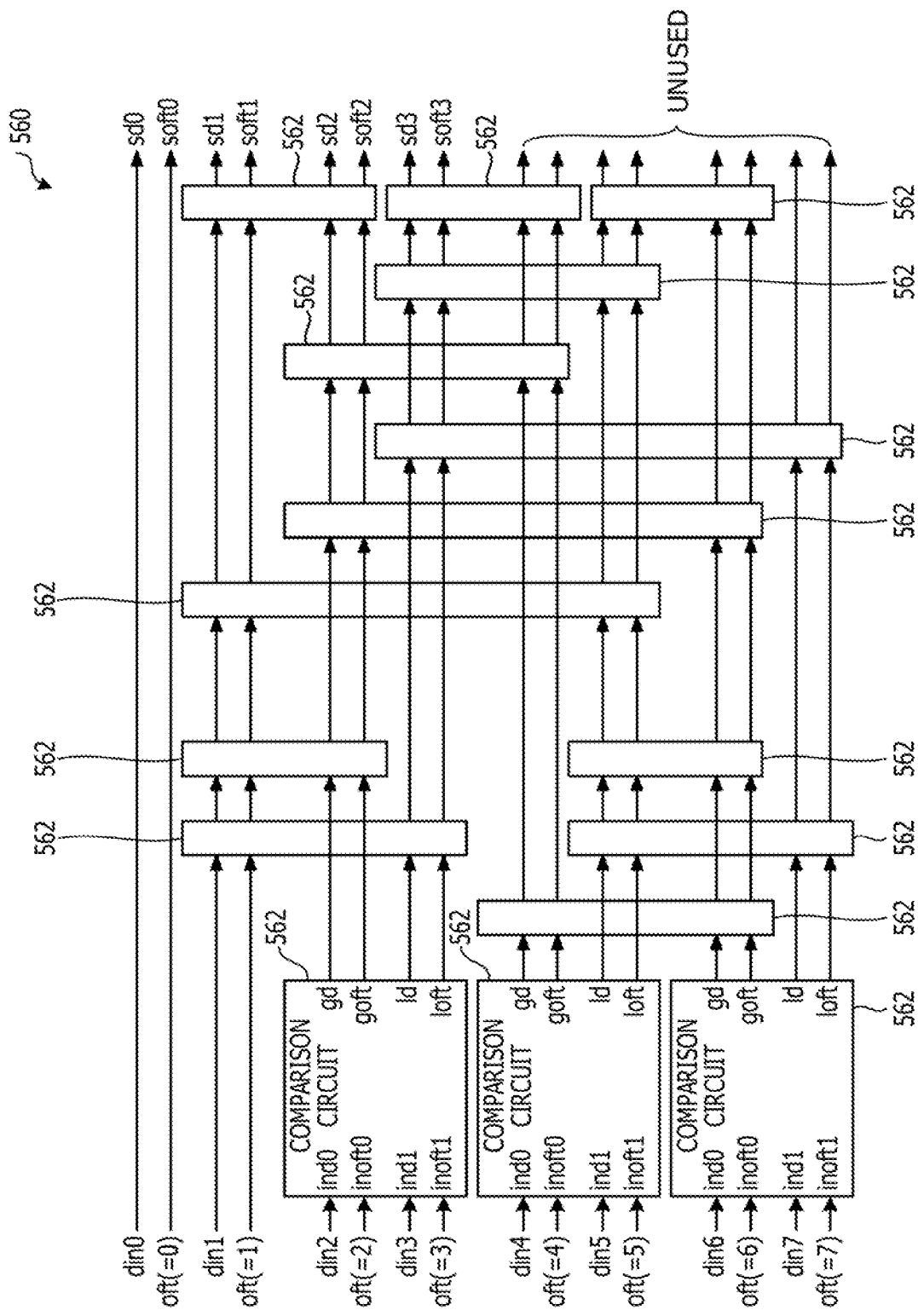
FIG. 19 is a diagram illustrating an example of a data sort circuit in FIG. 18.

FIG. 19 illustrates an example of the data sort circuit 560 in FIG. 18. The data sort circuit 560 includes a plurality of comparison circuits 562 that compare the magnitude of absolute values of two data. Each comparison circuit 562 receives data ind0 and ind1 and offsets inoft0 and inoft1 corresponding to the data ind0 and ind1, and compares the magnitude of absolute values of the data ind0 and ind1.

Each comparison circuit 562 outputs data having a larger absolute value and an offset corresponding to the data having the larger absolute value as data gd and offset goft on the basis of a comparison result of the data Ind° and ind1. Each comparison circuit 562 outputs data having a smaller absolute value and an offset corresponding to the data having the smaller absolute value as data Id and offset Ioft on the basis of the comparison result of the two data. In FIG. 19, the data gd and the offset goft are output from an upper side of each comparison circuit 562, and the data Id and the offset Ioft are output from a lower side of each comparison circuit 562.

Note that the data sort circuit 560 outputs the data din0 that is usually selected and the offset oft0 corresponding to the data din0 as the sort data sd0 and the offset soft0 without comparing data by the comparison circuit 562. As described above, the data sort circuit 560 outputs the sort data sd0 that is the data ding, and three sort data sd1-sd3 arranged in descending order of absolute values together with the offsets soft0-3. The absolute values of the sort data sd1-sd3 satisfy the order of sd1>sd2>sd3 (including the case where the absolute values are equal).

By usually selecting the data din0, the comparison circuit 562 for comparing the data din0 with other data din can be removed. Thereby, the circuit scale of the data sort circuit 560 can be reduced as compared with a case of comparing all the data din0-din7.

Note that, in a case of usually selecting the data din corresponding to the offset oft of an arbitrary number regardless of the magnitude of the absolute value, the compression unit 56 illustrated in FIG. 18 may include a replacement circuit (not illustrated) between a first latch and the data sort circuit 560. The replacement circuit supplies an arbitrarily specified offset oft and data din corresponding to the specified offset oft to the data sort circuit 560 as the offset oft0 and the data din0. For example, in a case where the offset oft2 is specified, the offset oft2 and the data dint are supplied to the data sort circuit 560 as the offset oft0 and the data din0. The offset oft0 and the data din0 received by the latch are supplied to the data sort circuit 560 as the offset oft1 and the data dint. The offset oft1 and the data dint received by the latch are supplied to the data sort circuit 560 as the offset oft2 and the data din2.

Figure 20:
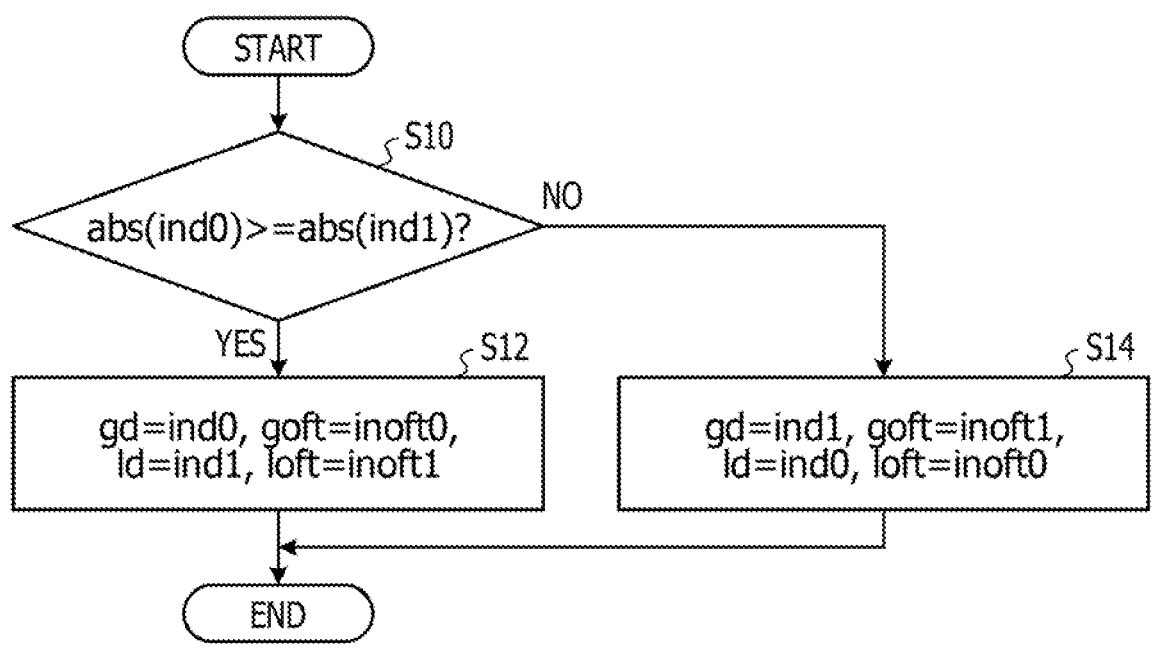
FIG. 20 is a diagram Illustrating an example of an operation of each comparison circuit in FIG. 19.

FIG. 20 illustrates an example of an operation of each comparison circuit 562 in FIG. 19. First, in step S10, the comparison circuit 562 compares absolute values (abs) of the input data ind0 and ind1. The comparison circuit 562 transfers the operation to step S12 in a case where the absolute value of the data ind0 is equal to or larger than the absolute value of the data ind1, and transfers the operation to step S14 in a case where the absolute value of the data ind0 is smaller than the absolute value of the data ind1.

In step S12, the comparison circuit 562 outputs the data ind0 as the data gd and outputs the offset inoft0 as the offset goft. Furthermore, the comparison circuit 562 outputs the data ind1 as the data Id and outputs the offset inoft1 as the offset loft, and terminates the comparison operation.

In step S14, the comparison circuit 562 outputs the data ind1 as the data gd and outputs the offset inoft1 as the offset goft. Furthermore, the comparison circuit 562 outputs the data ind0 as the data Id and outputs the offset inoft0 as the offset loft, and terminates the comparison operation.

Figure 21:
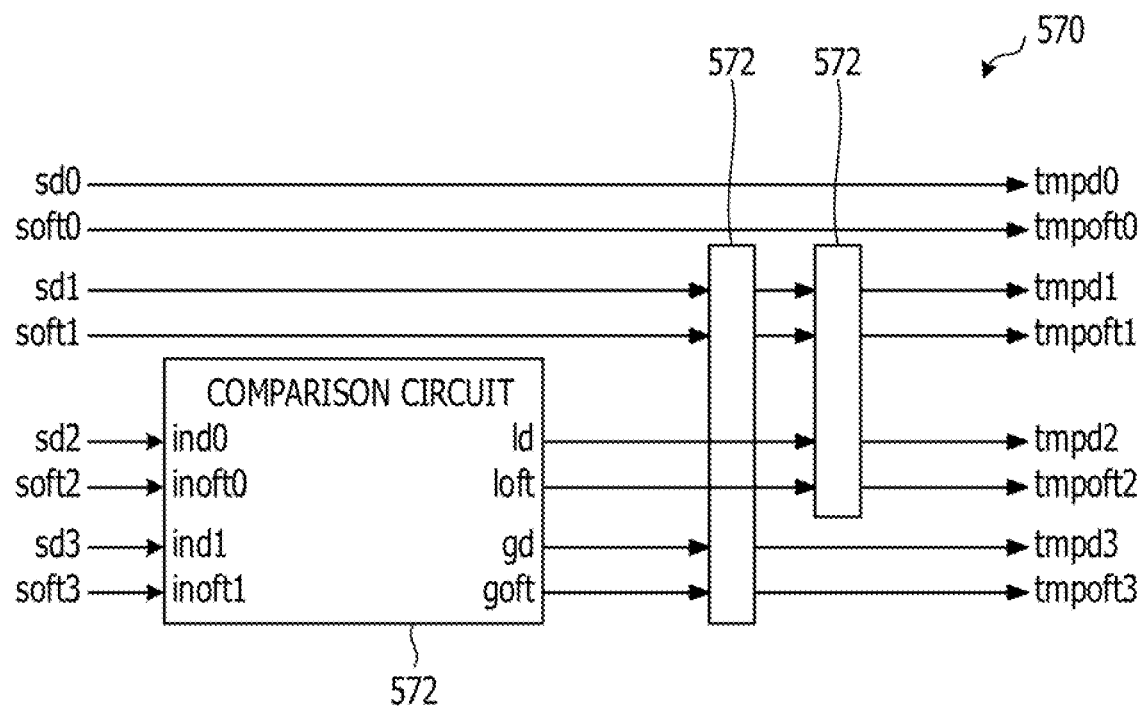
FIG. 21 is a diagram illustrating an example of an offset sort circuit in FIG. 18.

FIG. 21 illustrates an example of the offset sort circuit 570 in FIG. 18. The offset sort circuit 570 includes a plurality of comparison circuits 572 that compare the magnitude of two offsets. Each comparison circuit 572 receives the data ind0 and ind1 and the offsets inoft0 and inoft1 corresponding to the data ind0 and ind1, and compares the magnitude of values of the offsets inoft0 and inoft1.

Each comparison circuit 572 outputs an offset having a smaller value and data corresponding to the offset having the smaller value as the offset loft and the data Id on the basis of the comparison result of the offsets inoft0 and inoft1. Furthermore, each comparison circuit 572 outputs an offset having a larger value and data corresponding to the offset having the larger value as the offset goft and the data gd on the basis of the comparison result of the offsets inoft0 and inoft1. In FIG. 21, the offset loft and the data Id are output from an upper side of each comparison circuit 572, and the offset goft and the data gd are output from a lower side of each comparison circuit 572.

Note that the offset sort circuit 570 outputs the sort data sd0 corresponding to the data din0 specified to be usually selected and the offset soft0 as the sort data tmpd0 and the offset tmpoft0 without comparing data by the comparison circuit 572. Therefore, the offset sort circuit 570 arranges and outputs the sort data tmpd0 that is the sort data sd0 (=data din0) and the three sort data tmpd1-tmpd3 determined to have large absolute values in ascending order of the values of the offsets tmpoft. The values of the offsets tmpoft satisfy the order of tmpoft0<tmpoft1<tmpoft2<tmpoft3. By usually selecting the sort data sd0, the comparison circuit 572 for comparing the offset soft0 with other offset soft can be removed. Thereby, the circuit scale of the offset sort circuit 570 can be reduced as compared with a case of comparing all the offsets soft0-soft3.

Figure 22:
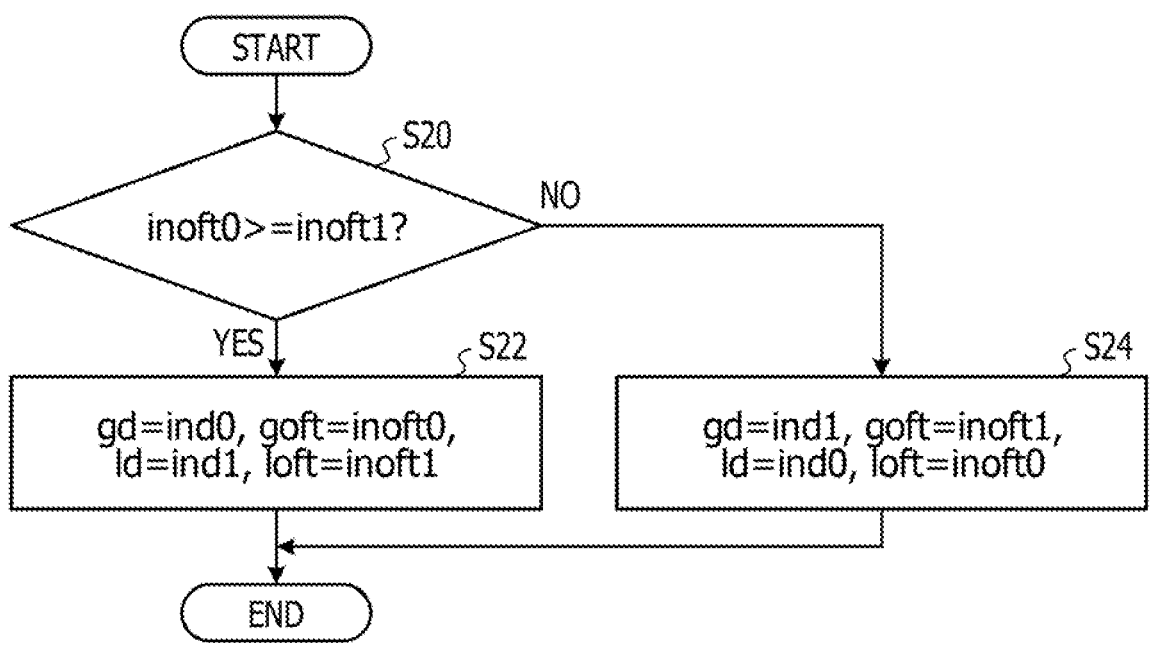
FIG. 22 is a diagram illustrating an example of an operation of each comparison circuit in FIG. 21.

FIG. 22 illustrates an example of an operation of each comparison circuit 572 in FIG. 21. First, in step S20, the comparison circuit 572 compares the magnitude of the input offsets inoft0 and inoft1. The comparison circuit 572 transfers the operation to step S22 in a case where the offset inoft0 is equal to or larger than the offset inoft1, and transfers the operation to step S24 in a case where the offset inoft0 is smaller than the offset inoft1.

In step S22, the comparison circuit 572 outputs the data ind0 as the data gd and outputs the offset inoft0 as the offset goft. The comparison circuit 572 outputs the data ind1 as the data Id and outputs the offset inoft1 as the offset loft, and terminates the comparison operation.

In step S24, the comparison circuit 572 outputs the data ind1 as the data gd and outputs the offset inoft1 as the offset goft. Furthermore, the comparison circuit 572 outputs the data ind0 as the data Id and outputs the offset inoft0 as the offset loft, and terminates the comparison operation.

FIG. 23 illustrates an example of a compression operation by the compression unit 56 in FIG. 18. FIG. 23 illustrates an example in which 14 elements (feature data) are compressed to eight for easy understanding. In an actual example, as described in FIG. 17, the number of feature data generated by the sensor SoC 20A for each operation cycle may be 2048. The feature data is divided into eight sub-arrays in accordance with the configuration of the compression unit 56, and offsets 0-7 are allocated to the sub-arrays in order from a head side of the feature data (din).

The feature data identified by an index x indicates all pieces of feature data extracted for each operation cycle and positions in the array. The compression unit 56 selects feature data of the head (offset=0) for each sub-array. Furthermore, the compression unit 56 selects three pieces of feature data having large absolute values from the remaining seven pieces of feature data in the sub-array. Then, the compression unit 56 rearranges the four pieces of feature data selected for each array in ascending order of offsets to obtain compressed feature data. Therefore, the compression rate is 50%. The compressed feature data is identified by an index xsprs. Thereafter, an offset is embedded in the feature data and is output as he data outd0-outd3 illustrated in FIG. 18 for each sub-array.

Figure 24:
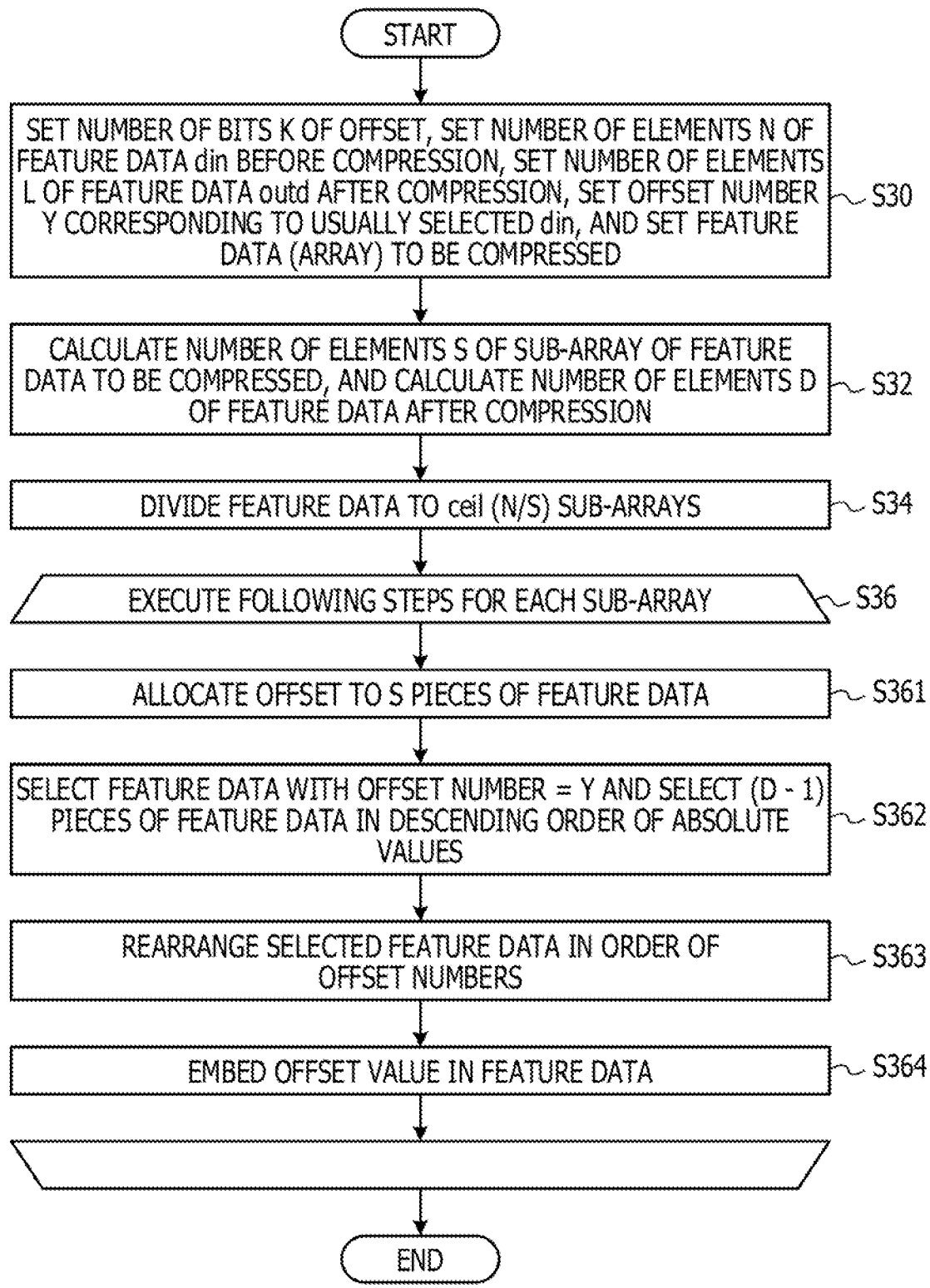
FIG. 24 is a diagram illustrating an example of an operation flow of the compression operation by the compression unit in FIG. 18.

FIG. 24 illustrates an example of an operation flow of the compression operation by the compression unit 56 in FIG. 18. Note that steps S30 and S32 illustrate condition settings of a case where the compression unit 56 is implemented using a field programmable gate array (FPGA) or the like. In a case where hardware (circuit element) of the compression unit 56 is already mounted on the sensor SoC 20A, operations in steps S30 and S32 are omitted, and the compression operation is started from step S34.

In step S30, the number of bits K of offset is set and the number of elements N of the feature data din before compression is set as conditions constituting the compression unit 56. Furthermore, as the conditions constituting the compression unit 56, the number of elements L of the compressed feature data outd is set, an offset number Y corresponding to the feature data that is usually selected is set, and feature data (array) to be compressed is set. In the example illustrated in FIG. 23, the number of bits K=3, the number of elements N=14, the number of elements L=8, and the offset number Y=0 are set. Furthermore, in the example of the sensor SoC 20A illustrated in FIG. 17, the number of bits K=3, the number of elements N=2048, the number of elements L=1024, and the offset number Y=0 are set.

Next, in step S32, as the conditions constituting the compression unit 56, the number of elements S (=8) of the sub-array of the feature data to be compressed is calculated by calculating $2^K$, and the number of elements D (=4) of the compressed feature data is calculated by the expression (4).

$$\text{ceil}(N/S) = \text{ceil}(L/D) \quad (4)$$

In the expression (4), "ceil" represents a rounded up integer.

Then, in step S34, the compression operation of the feature data is executed. In step S34, the compression unit 56 divides the feature data into cell (N/S) sub-arrays. Next, in step S36, the compression unit 56 executes steps S361 to S364 for each sub-array.

In step S361, the compression unit 56 allocates an offset to S pieces of feature data in the sub-array to be compressed. Next, in step S362, the compression unit 56 selects the feature data with the offset number =Y, and selects (D-1) pieces of feature data from the remaining (S-1) pieces of feature data in descending order of absolute values. Next, in step S363, the compression unit 56 rearranges the selected D pieces of feature data in the order of the offset numbers. Next, in step S364, the compression unit 56 embeds an offset value in each selected feature data. Then, by repeating steps S361 to S364, the feature data in all the sub-arrays to be compressed is compressed. The compressed feature data is identified by an index xsprs.

Figure 25:
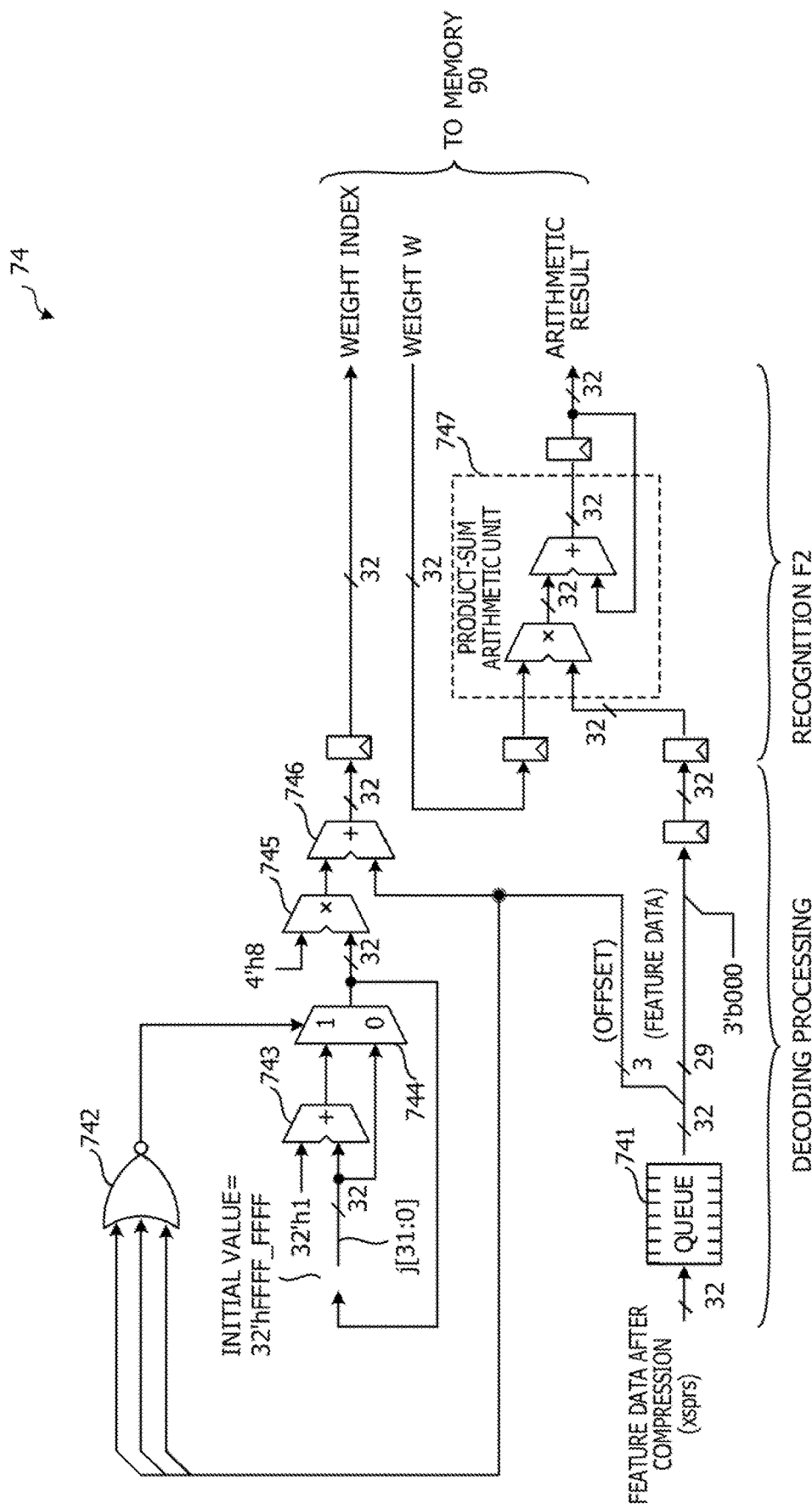
FIG. 25 is a diagram illustrating an example of a sparse matrix arithmetic unit in FIG. 16.

FIG. 25 illustrates an example of the sparse matrix arithmetic unit 74 in FIG. 16. The sparse matrix arithmetic unit 74 includes a queue 741, a NOR gate 742, an adder 743, a selector 744, a multiplier 745, an adder 746, a product-sum arithmetic unit 747, and a plurality of latches. The queue 741, the NOR gate 742, the adder 743, the selector 744, the multiplier 745, and the adder 746 function as a decoding circuit for executing decoding processing for the feature data. The product-sum arithmetic unit 747 executes recognition processing F2 described in FIG. 3 on the basis of the decoded feature data.

The queue 741 has a plurality of entries that holds the compressed feature data (xsprs) transferred from the sensor SoC 20A, and outputs the feature data in the order of being held in the queue 741. 32-bit feature data output from the queue 741 is separated into the offset embedded in lower 3 bits of a mantissa part and the feature data of 29-bit floating-point number lacking lower 3 bits of the mantissa part. The 3-bit offset is supplied to the NOR gate 742 and the adder 746. A binary number "000" represented by "3'b000" is added to the lower 3 bits of the mantissa part of the 29-bit feature data, and the 32-bit floating-point number FP32 is decoded. Note that, as described with reference to FIG. 23, the offset corresponding to the compressed feature data can take a discontinuous value.

The NOR gate 742 outputs logic 1 to the selector 744 in a case where the offset value is "0", and outputs logic 0 to the selector 744 in a case where the offset value is a value other than "0". The latch connected to an input of the adder 743 is initialized to all 1 every operation cycle. The adder 743 and the selector 744 function as a counter that is counted up each time the offset="0" is output from the queue 741, and an output of the NOR gate 742 functions as an increment signal that counts up the counter. The selector 744 outputs a sub-array number for identifying the sub-array. For example, a variable j output from the latch connected to the input of the adder 743 indicates the sub-array number. Note that the sub-array is used not only as the feature data but also as an array of weight data corresponding to the feature data.

The multiplier 745 multiplies a value output from selector 744 by "8" that is the number of elements in the sub-array, and outputs the result to adder 746. The adder 746 adds an offset value to the output value of the multiplier 745 to generate a weight index for identifying the weight stored in the memory 90, corresponding to the decoded feature data in the sub-array. For example, even in a case where the offset takes a discontinuous value, the weight index for identifying a weight W corresponding to the feature data is generated, whereby the decoding processing for each feature data can be completed. Note that the weight index may be used for identifying an area in which the weight W to be calculated is stored and may also be used for identifying the feature data to be calculated.

In a case where the weight index for identifying the weight W to be used for calculation can be specified, the sparse matrix arithmetic unit 74 issues a read request to the memory 90 and acquires the weight. W from the memory 90. The product-sum arithmetic unit 747 (fused multiply-add) multiplies the feature data and the weight W acquired from the memory 90. The product-sum arithmetic unit 747 sequentially integrates the product of the decoded feature data output from the queue 741 and the weight W read from the memory 90 according to the weight index in the operation cycle, and stores the product in the memory 90 as an arithmetic result of the processing F2.

Note that the latch that receives the output of the product-sum arithmetic unit 747 functions as an accumulator that stores the integration result, and is initialized to "0" before the start of the operation cycle. An integrated value stored by the accumulator becomes a value illustrated in the expression (5) at the time of completion of the operation cycle. However, in the expression (5), the "i" element corresponding to the feature data thinned out by the compression processing is excluded and calculation is performed.

[Math. 4]

$$\sum_{i=0}^{2047} w[i]x[i] \tag{5}$$

In the expression (5), w [i] represents the weight W identified by the weight index, and x [i] represents the feature data identified by a feature index.

FIG. 26 illustrates an example of a weight matrix stored by the memory 90 connected to the edge SoC 63 in FIG. 16. The weight matrix is an area for storing 2048 weights W to be used for each operation cycle, and has an area identified by the weight index. Since the weight index takes a discontinuous value, a part of the weight W in the weight matrix is read out.

FIG. 27 illustrates an example of a decoding operation by the sparse matrix arithmetic unit 74 in FIG. 25. FIG. 27 illustrates an example of decoding eight pieces of feature data using four pieces of feature data before decoding (for example, after compression) for each sub-array in a case where the compression rate is 50%. For example, in each operation cycle, 2048 pieces of feature data are decoded from 1024 pieces of feature data included in 256 sub-arrays.

The sparse matrix arithmetic unit 74 extracts an offset from the feature data before decoding, and decodes the feature data using the feature data from which the offset has been extracted. The sparse matrix arithmetic unit 74 stores the decoded feature data in an area in the memory 90 identified by the index x corresponding to the extracted offset value. In this embodiment, since the feature data corresponding to the offset=0 is usually included as the feature data after decoding, repetition of the sub-array of the feature data can be determined according to the offset=0.

In the memory 90, a constant Z is written in advance in the area where the decoded feature data is stored before the start of the operation cycle. Therefore, the area where the decoded feature data is stored holds either the decoded feature data or the constant Z after completion of the decoding processing. Although the value of the constant Z is arbitrary, since a criterion for selecting the feature data at the time of compressing the feature data is descending order of the absolute values, it is appropriate to set the constant Z as "0".

In the DNN inference processing, the decoded feature data is used for, for example, a fully connected layer (matrix vector product) expressed by the expression (1). The feature data replaced with the constant Z by the decoding processing and the weight W corresponding to the feature data need not be calculated. Therefore, by omitting calculation and memory access to the feature data and the weight W, an arithmetic amount executed by the edge SoC 63 can be reduced and the number of clock cycles used for the calculation can be reduced as compared with a case where compression is not performed.

Note that, in the present embodiment, the feature data replaced with the constant $Z=0$) is skipped by the processing F2, but this is equivalent to integration of a product of decoded valid feature data and the weight W, and the constant Z ($=0$) and the weight. W ($=0$). Therefore, in a case where there is no limitation on the arithmetic amount, the product of the constant Z ($=0$) and the weight W may be calculated.

Figure 28:
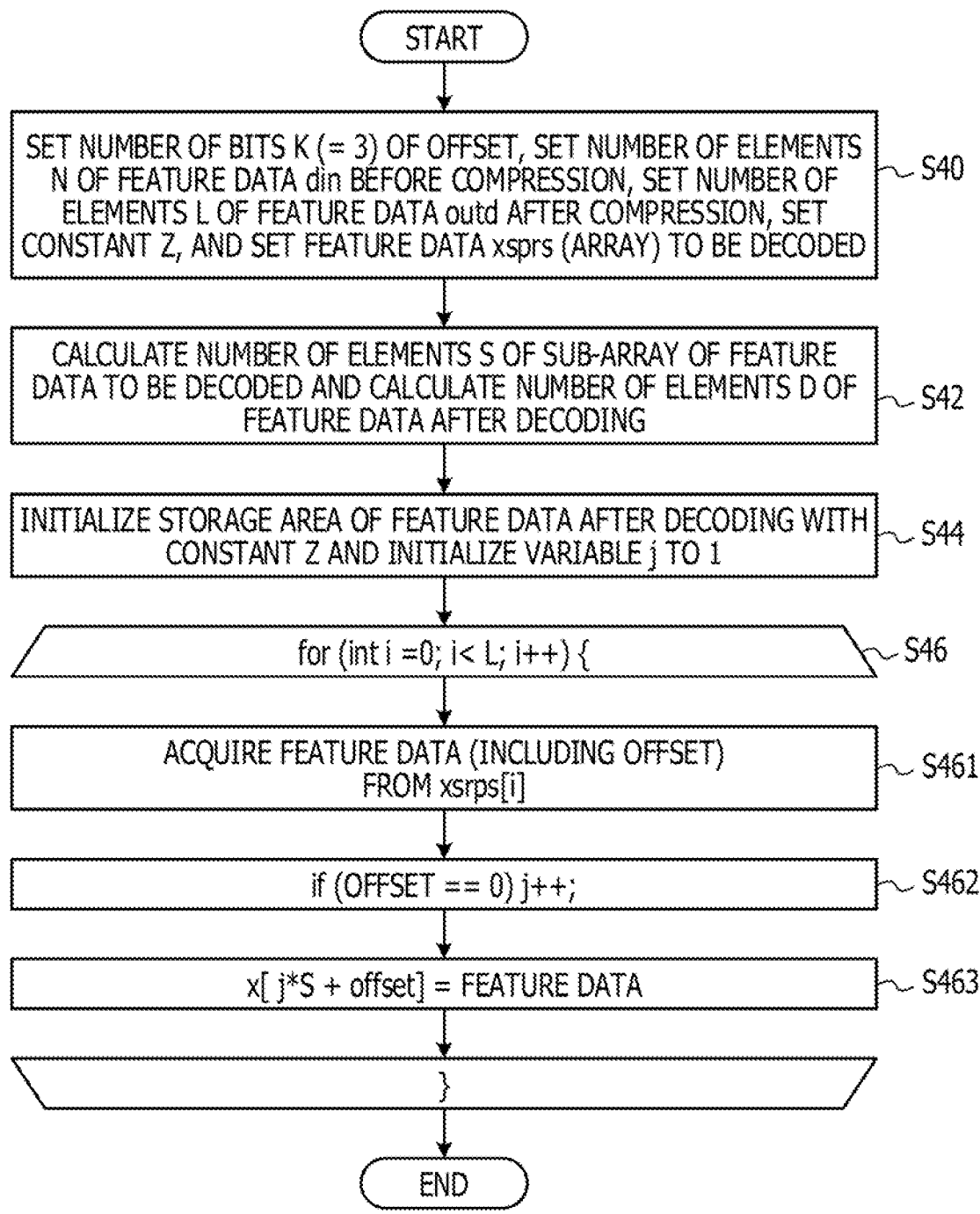
FIG. 28 is a diagram illustrating an example of an operation flow of a decoding operation by the sparse matrix arithmetic unit in FIG. 25.

FIG. 28 illustrates an example of an operation flow of a decoding operation by the sparse matrix arithmetic unit 74 in FIG. 25. Note that steps S40 and S42 illustrate condition settings of a case where the sparse matrix arithmetic unit 74 implements the output using an FPGA or the like. In a case where hardware (circuit element) of the sparse matrix arithmetic unit 74 is already mounted on the edge SoC 63, operations in steps S40 and S42 are omitted, and the compression operation is started from step S44.

In step S40, the number of bits K of offset is set and the number of elements N of the feature data din before compression is set as conditions constituting the sparse matrix arithmetic unit 74. Furthermore, as the conditions constituting the sparse matrix arithmetic unit 74, the number of elements L of the compressed feature data outd is set, the constant Z is set, and the feature data xsprs (array) to be decoded is set. In the decoding operation illustrated in FIG. 27, the number of bits $K=3$, the number of elements $N=14$, and the number of elements $L=8$ are set. Furthermore, in the case of the feature data illustrated in FIG. 17, the number of bits $K=3$, the number of elements $N=2048$, and the number of elements $L=1024$ are set.

Next, in step S42, as the conditions constituting the sparse matrix arithmetic unit 74, the number of elements S ($=8$) of the sub-array of the feature data to be compressed is calculated by calculating $2^K$, and the number of elements D ($=4$) of the feature data before decoding is calculated by the expression (6). $D=L/\text{ceil}(N/S) \ldots (6)$ Next, in step S44, the sparse matrix arithmetic unit 74 initializes the storage area for the decoded feature data with the constant Z. For example, the storage area is allocated in the memory 90 so that 2048 pieces of feature data can be stored. The sparse matrix arithmetic unit 74 initializes a variable j to be used in step S46 and subsequent steps to "−1".

Next, in step S46, the sparse matrix arithmetic unit 74 executes steps S461 to S463 for each operation cycle for decoding L pieces of feature data. In step S461, for example, the sparse matrix arithmetic unit 74 acquires the feature data corresponding to the index xsprs [i] from a plurality of pieces of feature data (including offsets) before decoding illustrated in FIG. 27. Next, in step S462, the sparse matrix arithmetic unit 74 increments the variable j in the case where the offset is "0". For example, the sparse matrix arithmetic unit 74 increments the variable j every time a boundary of sub-arrays is detected. In the sparse matrix arithmetic unit 74 illustrated in FIG. 25, the variable j is output from the selector 744.

Next, in step S463, the sparse matrix arithmetic unit 74 calculates the variable j, the number of elements S of the sub-array, and the offset to calculate the index x for identifying the feature data after decoding. In the sparse matrix arithmetic unit 74 illustrated in FIG. 25, the index x is equal to the weight index calculated by the multiplier 745 and the adder 746. Then, the sparse matrix arithmetic unit 74 allocates the index x to the decoded feature data. The allocated index x corresponds to the index x before compression in FIG. 23. Then, by repeating steps S461 to S463, the feature data in all the sub-arrays is decoded.

In this embodiment, the feature data with a relatively small absolute value and thinned out during compression is replaced with the constant Z (for example, "0") after decoding, and calculation using the feature data replaced with the constant Z is skipped. For example, since the arithmetic processing executed in the processing F2 (fully connected layer) using the decoded feature data is the matrix vector product represented by the expression (1), the influence on the result of the processing F2 is small even if the feature data with a small absolute value is regarded as Not only the processing with the fully connected layer but also the processing with the convolution layer and the ISTM processing, the influence on the processing result is small even if the calculation is executed regarding the feature data with a small absolute value as "0". Therefore, the arithmetic amount to be executed by the edge SOC 63 can be reduced while suppressing the influence on the final recognition result of a DNN. Furthermore, the data amount transferred from the sensor SoC 20A to the edge SoC 63 can be reduced, and the use amount of the memory 90 can be reduced.

Figure 29:
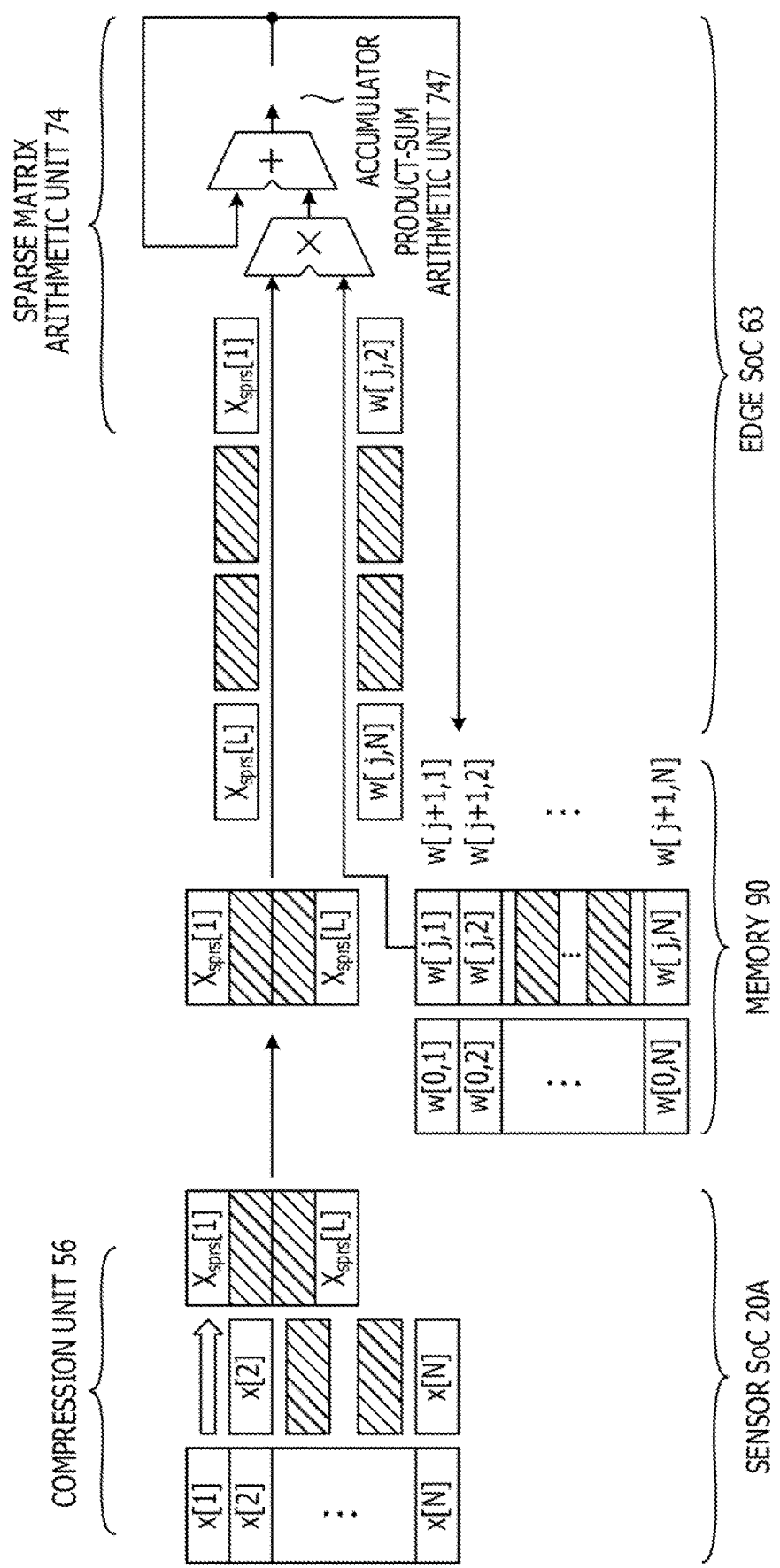
FIG. 29 is a diagram illustrating an outline of compression and decoding of feature data by the information processing apparatus in FIG. 16.

FIG. 29 illustrates an outline of compression and decoding of feature data by the information processing apparatus 104 in FIG. 16. In FIG. 29, rectangles illustrated by diagonal lines represent feature data thinned out by compression and not used for calculation, or the weight W not used for calculation. Therefore, the feature data illustrated by the diagonal lines do not actually exist. Note that, in an embodiment illustrated in FIG. 30, which is to be described below, an outline of an operation in a case of calculating, by an edge SoC 63, feature data extracted by a sensor SOC 20A, and calculating, by the edge SoC 63, feature data extracted by a sensor SoC 20B, is similar to FIG. 29, Furthermore, in FIG. 34 to be described below, an outline of an operation in a case of calculating, by the edge SOC 63, the feature data extracted by the sensor SoC 20A, is similar to FIG. 29.

The compression unit 56 of the sensor SoC 20A compresses feature data by selecting a predetermined number of feature data having a large absolute value from N pieces of feature data x[1]-x[N] and stores the compressed feature data in the memory 90 connected to the edge SOC 63 as feature data xsprs [1] and [L]. Although not illustrated, the feature data xsprs [1] and [L] include an offset.

The sparse matrix arithmetic unit 74 extracts the offsets from the compressed feature data xsprs [1] and [L] stored in the memory 90, and decodes the feature data xsprs [1] and [L]. The sparse matrix arithmetic unit 74 reads out weights W [j, 2] and [j, N] corresponding to the decoded feature data xsprs [1] and [L] from the memory 90 on the basis of the extracted offsets. The product-sum arithmetic unit 747 of the sparse matrix arithmetic unit 74 executes a product-sum operation of the feature data xsprs [1] and [L] and the weights W [j, 2] and [j, N], and writes back the execution result to the memory 90.

As described above, in the embodiment illustrated in FIGS. 16 to 28, similar effects to those in the embodiment illustrated in FIGS. 1 to 9 can be obtained. Moreover, in the embodiments illustrated in FIG. 16 to FIG. 29, the data transfer amount can be reduced between the sensor SoC 20A and the edge SoC 63 by compressing the feature data by the compression unit 56 and transferring the compressed feature data to the edge SoC 61 Therefore, the DNN inference processing can be executed using the measurement values of a larger number of sensors 10.

Furthermore, since the feature data discarded by compression is smaller than others in the absolute value, the DNN inference processing can be executed while making the influence on the result of the processing F2 small. Therefore, the arithmetic amount to be executed by the edge SoC 63 can be reduced while suppressing the influence on the final recognition result of a DNN, and the number of dock cycles used for calculation can be reduced. Furthermore, the use amount of the memory 90 can be reduced by reducing the number of feature data.

In the feature data compression processing, by usually selecting the feature data with the certain offset from the plurality of pieces of feature data, the boundary of the sub-arrays can be detected using the offset, and the feature data can be decoded on the basis of the detected boundary. As a result, the circuit for detecting the boundary of the sub-arrays in the sparse matrix arithmetic unit 74 can be simplified and the circuit scale of the sparse matrix arithmetic unit 74 can be reduced as compared with a case of not having an offset that is usually selected.

Furthermore, by usually selecting the feature data with the certain offset, the circuit scales of the data sort circuit 560 and the offset sort circuit 570 can be reduced. For example, by usually selecting the data din0, the comparison circuit 562 for comparing the data din0 with other data din can be removed. For example, the circuit scale of the data sort circuit 560 can be reduced as compared with a case of comparing all the data din0-din7. By usually selecting the sort data sd0, the comparison circuit 572 for comparing the offset soft0 with other offset soft can be removed. For example, the circuit scale of the offset sort circuit 570 can be reduced as compared with a case of comparing all the offsets soft0-soft3.

Figure 30:
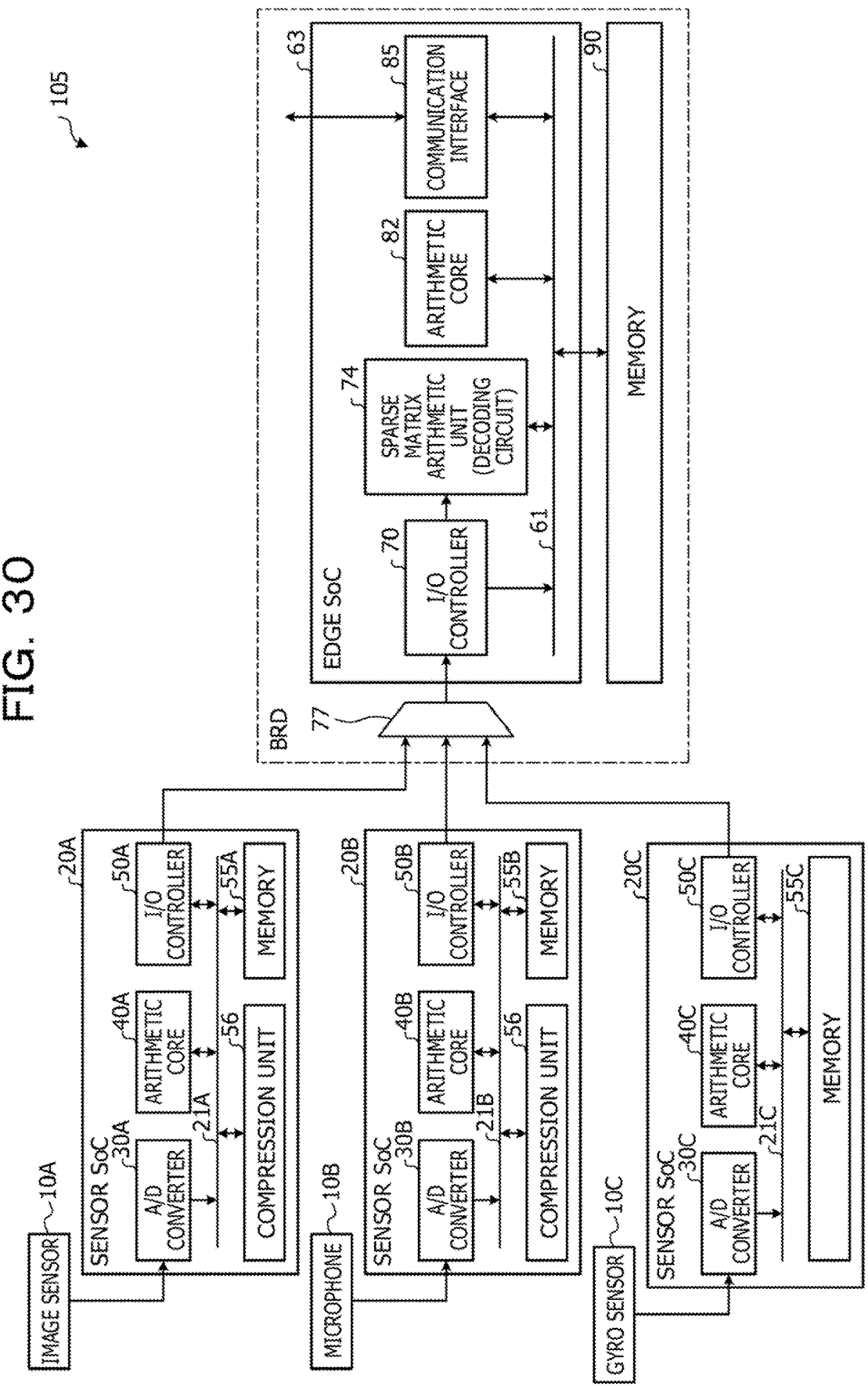
FIG. 30 is a diagram illustrating an example of an information processing apparatus according to another embodiment.

FIG. 30 illustrates an example of an information processing apparatus according to another embodiment. Elements similar to those in FIGS. 10 and 16 are denoted by the same reference numerals, and detailed description is omitted. An information processing apparatus 105 illustrated in FIG. 30 includes a compression unit 57 instead of the compression unit 56 illustrated in FIG. 16. Furthermore, in the information processing apparatus 105, the compression unit 57 connected to a bus 21B is added to a sensor SoC 20B, and a gyro sensor 10C and a sensor SoC 20C illustrated in FIG. 10 are included. The compression unit 57 can select a compression rate of either 50% or 25%. For example, the compression rate of the compression unit 57 of a sensor SoC 20A is set to 25%, and the compression rate of the compression unit 57 of the sensor SoC 208 is set to 50%.

The compression unit 57 of the sensor SoC 208 has a function to compress an information amount of feature data of sound data extracted by an arithmetic core 408, Note that the sensor SoC 208 may include the compression unit 56 illustrated in FIG. 16 instead of the compression unit 57. Other configurations of the information processing apparatus 105 are similar to those of the information processing apparatus 104 illustrated in FIG. 16. The information processing apparatus 105 executes multimodal DNN inference processing, similarly to the information processing apparatus 104 illustrated in FIG. 16.

FIG. 31 illustrates an example of the size of feature data output for each operation cycle in which the sensor SoC in FIG. 30 extracts the feature data. The sensor SoC 20A compresses 2048 pieces of feature data extracted by an arithmetic core 40A for each operation cycle to 512 pieces of feature data using the compression unit 57, and outputs the compressed feature data to the edge SoC 63 (the compression rate=25%). The sensor SoC 208 compresses 1024 pieces of feature data extracted by the arithmetic core 408 for each operation cycle to 512 pieces of feature data using the compression unit 57, and outputs the compressed feature data to the edge SoC 63 (the compression rate=50%).

A sensor SoC 20C outputs 1024 pieces of feature data extracted by an arithmetic core 40C for each operation cycle toward the edge SoC 63. The total number of feature data extracted by the sensor SoCs 20A, 20B, and 20C is 3584. Meanwhile, the total number of feature data output from the sensor SoCs 20A, 208, and 20C to the edge. SoC 63 is 2048 as in FIG. 17. For example, the transfer rate of the feature data transferred to the edge SoC 63 in FIG. 29 can be made equal to the transfer rate of the feature data transferred to the edge SoC 63 in FIG. 16.

In this embodiment, by increasing the compression rate of the sensor SoC 20A and adding the compression function to the sensor SOC 208, change in the transfer rate of the feature data to the edge SoC 63 can be suppressed even in a case where the sensor SoC 20C is added. For example, an increase in the data transfer amount to the edge SoC 63 can be suppressed, and an increase in the arithmetic amount in the edge SoC 63 can be suppressed even in a case where the number of sensor SoCs increases and the size of the feature data to be used for inference increases. As a result, a decrease in the execution efficiency of the multimodal DNN inference processing can be suppressed.

Furthermore, by making the compression rate of the sensor SoC 20 variable, the transfer rate of the feature data to the edge SoC 63 can be made constant regardless of the number of sensor SoCs 20 connected to the edge SoC 63. As a result, feature data having an optimum size conforming to architecture of an arithmetic core 82 of the edge SoC 63 can be transferred, and the execution efficiency of the inference processing can be optimized and the execution time of the inference processing can be made constant.

Figure 32:
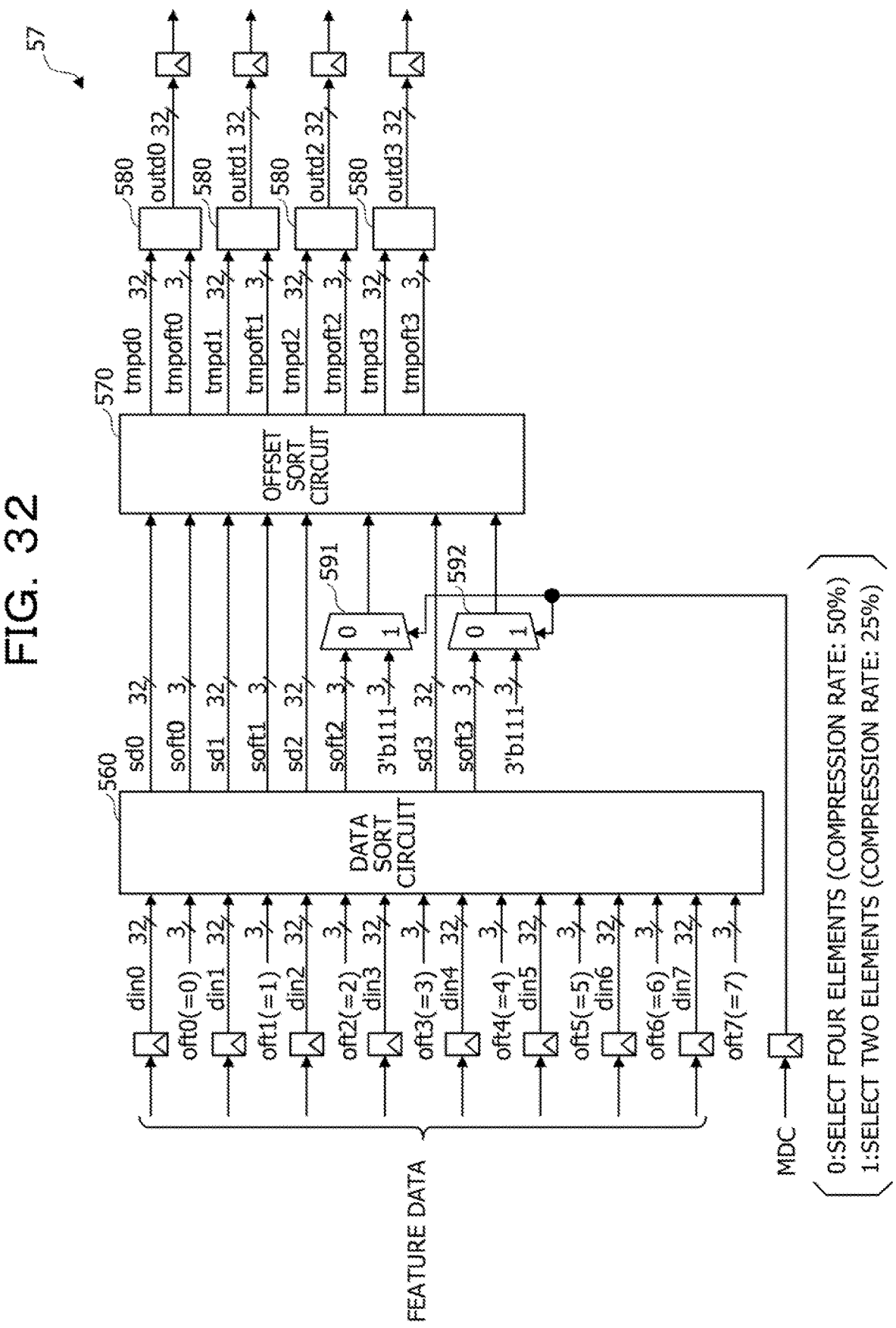
FIG. 32 is a diagram illustrating an example of a compression unit in FIG. 30.

FIG. 32 illustrates an example of the compression unit 57 in FIG. 30. An element similar to the compression unit 56 in FIG. 18 is denoted by the same reference numeral, and detailed description is omitted. The compression unit 57 includes selectors 591 and 592 between a data sort circuit 560 and an offset sort circuit 570. The selector 591 supplies an offset soft2 to the offset sort circuit 570 in a case where a mode signal MDC is logic 0, and supplies a binary number "111" represented by "3'b111" to the offset sort circuit 570 in a case where the mode signal MDC is logic 1. The selector 592 supplies an offset soft3 to the offset sort circuit 570 in the case where the mode signal MDC is the logic 0, and supplies the binary number "111" represented by "3'b111" to the offset sort circuit 570 in the case where the mode signal MDC is the logic 1.

The mode signal MDC is set to the logic 0 in a case of selecting four out of eight pieces of feature data, and is set to the logic 1 in a case of selecting two out of the eight pieces of feature data. For example, the mode signal MDC is set to the logic 0 in a case where a compression rate is 50%, and is set to the logic 1 in a case where the compression rate is 25%. The compression unit 57 of the sensor SoC 20A receives the mode signal MDC "1" and operates at the compression rate=25%. The compression unit 57 of the sensor SoC 20B receives the mode signal MDC="0" and operates at the compression rate=50%. Note that the compression unit 57 may be mounted instead of the compression unit 56 of the sensor SoC 20A illustrated in FIG. 16 and operate by the mode signal MDC "0" (compression rate=50%).

The offset sort circuit 570 receives the offsets soft2 and soft3 of "3'b111" in the case where the mode signal MDC is the logic 1. In this case, the offset sort circuit 570 outputs sort data sd0 and sd1 as sort data tmpd0 and tmpd1 in this order, and outputs offsets soft° and soft1 as offsets tmpoft0 and tmpoft1 in this order. Furthermore, the offset sort circuit 570 outputs sort data sd2 and sd3 as sort data tmpd2 and tmpd3, and outputs offsets soft2 and soft2 as offsets tmpoft2 and tmpoft3. Feature data outd0 and outd1 are examples of the compressed feature data. Thereby, the compression rate of a compression unit 58 can be set to 25%.

Figure 33:
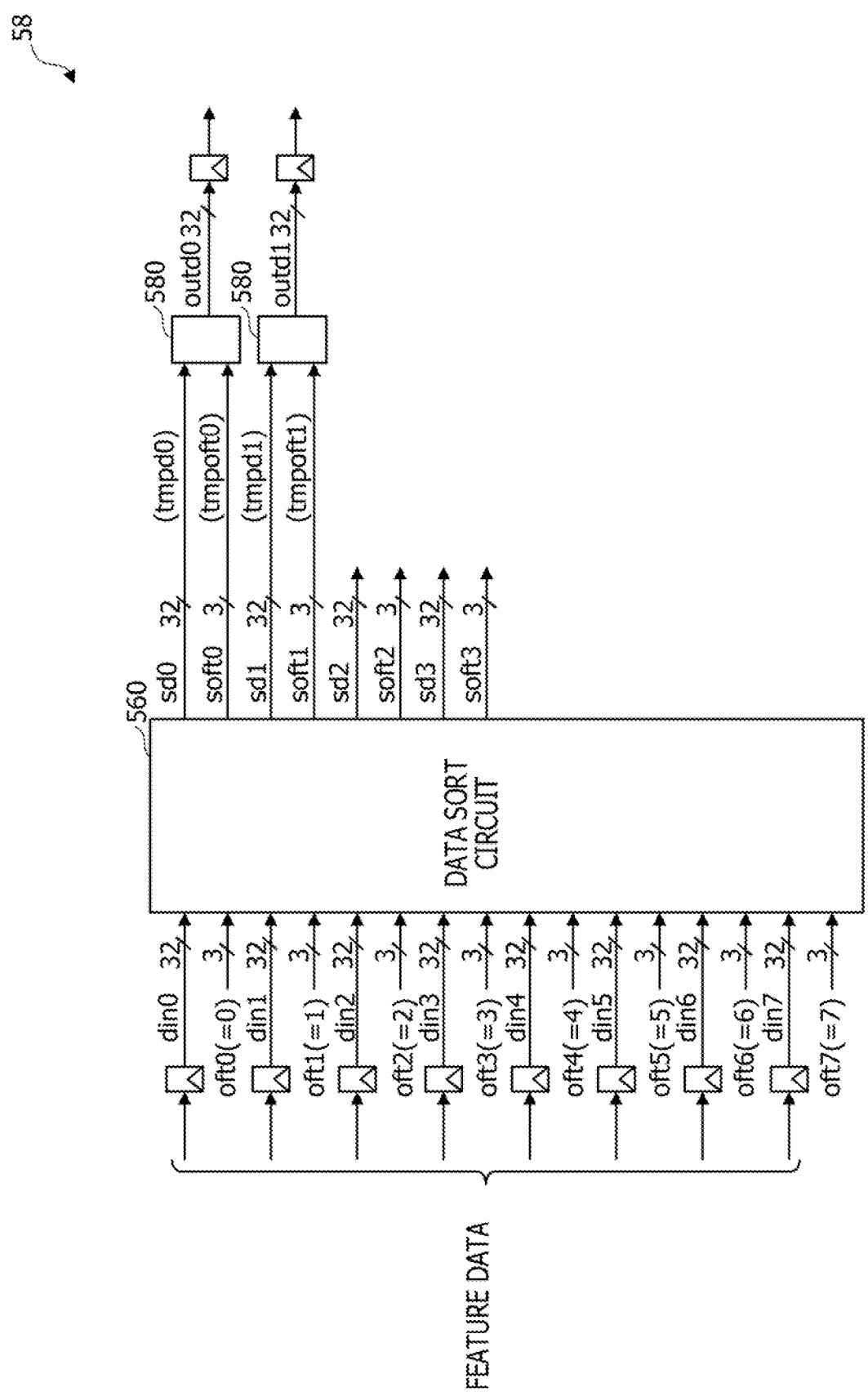
FIG. 33 is a diagram illustrating an example of a compression unit in which a compression rate is fixed to 25%.

FIG. 33 illustrates an example of the compression unit 58 in which the compression rate is fixed to 25%. An element similar to the compression unit 56 in FIG. 18 is denoted by the same reference numeral, and detailed description is omitted. In a case where the compression unit 57 illustrated in FIG. 32 does not exist and the compression unit 58 is mounted on the sensor SoC 20A, the compression unit 56 illustrated in FIG. 18 is mounted on the sensor SoC 20B.

The compression unit 58 illustrated in FIG. 33 does not include the offset sort circuit 570 and a packing circuit 580 corresponding to data outd2 and outd3. The compression unit 58 usually outputs the sort data sd0 and sd1 to the packing circuit 580 as the sort data tmpd0 and tmpd1 in this order. Furthermore, the compression unit 58 outputs the offsets soft0 and soft1 to the packing circuit 580 as the offsets tmpoft0 and tmpoft1 in this order. Thereby, the compression rate of the compression unit 58 can be set to 25%.

Note that the compression unit 56 illustrated in FIG. 16, the compression unit 57 illustrated in FIG. 30, and the compression unit 58 illustrated in FIG. 33 may be mounted using reconfigurable elements such as a field programmable gate array (FPGA), In this case, the sensor SOC on which the compression unit is mounted includes an FPGA. Any one or a plurality of the compression units 56, 57, and 58 can be implemented by reconfiguring the logic each time parameters and the like to be used in the compression unit are reset. Thereby, the compression rate, the number of feature data to be extracted for each operation cycle, and the like can be changed using the common sensor SoC 20.

As described above, in the embodiment illustrated in FIGS. 30 to 33, similar effects to those in the embodiments illustrated in FIGS. 1 to 9 and FIGS. 16 to 28 can be obtained. Moreover, in the embodiment illustrated in FIGS. 30 to 33, the data transfer amount to the edge SoC 63 can be made constant and an increase in the arithmetic amount in the edge SoC 63 can be suppressed even in a case where the number of sensor SoCs increases and the size of the feature data to be used for inference increases. As a result, a decrease in the execution efficiency of the multimodal DNN inference processing can be suppressed. Furthermore, feature data having an optimum size conforming to the architecture of the arithmetic core 82 of the edge SoC 63 can be transferred, and the execution efficiency of the inference processing can be optimized and the execution time of the inference processing can be made constant.

Figure 34:
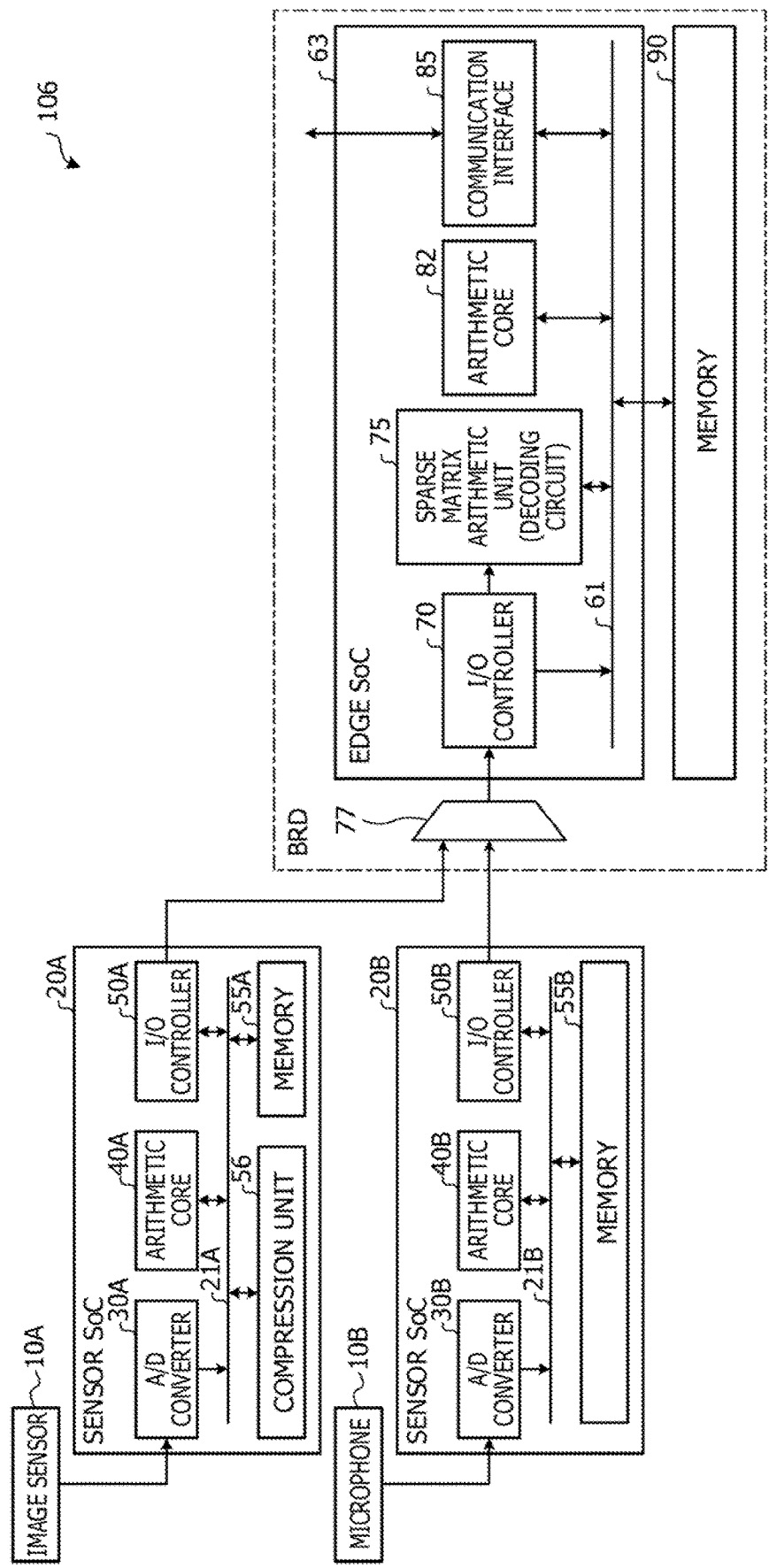
FIG. 34 is a diagram illustrating an example of an information processing apparatus according to another embodiment.

FIG. 34 illustrates an example of an information processing apparatus according to another embodiment. Elements similar to those in FIG. 16 are denoted by the same reference numerals, and detailed description is omitted. An information processing apparatus 106 illustrated in FIG. 34 includes a compression unit 59 instead of the compression unit 56 of the sensor SoC 20A illustrated in FIG. 16 and includes a sparse matrix arithmetic unit 75 instead of the sparse matrix arithmetic unit 74 of the edge SoC 63. Other configurations of the information processing apparatus 106 are similar to those of the information processing apparatus 104 illustrated in FIG. 16. The information processing apparatus 106 executes multimodal DNN inference processing, similarly to the information processing apparatus 104 illustrated in FIG. 16.

The compression unit 59 is different from the compression unit 56 illustrated in FIG. 16 in comparing absolute values of all pieces of feature data input for each sub-array and selecting a predetermined number of feature data in descending order of absolute values. For example, the compression unit 59 has no offset that is usually selected by specifying an offset number Y (="0"). Therefore, the sparse matrix arithmetic unit 75 includes a circuit that detects a boundary of sub-arrays without using a certain offset.

A sensor SoC 20A compresses extracted feature data (FP32) by the compression unit 59 and transfers the feature data to an edge SoC 63, A sensor SoC 20B transfers extracted feature data (FP32) toward the edge SoC 63 without compressing the feature data. Sizes of the feature data of the sensor SoCs 20A and 20B are similar to those in FIG. 17.

Figure 35:
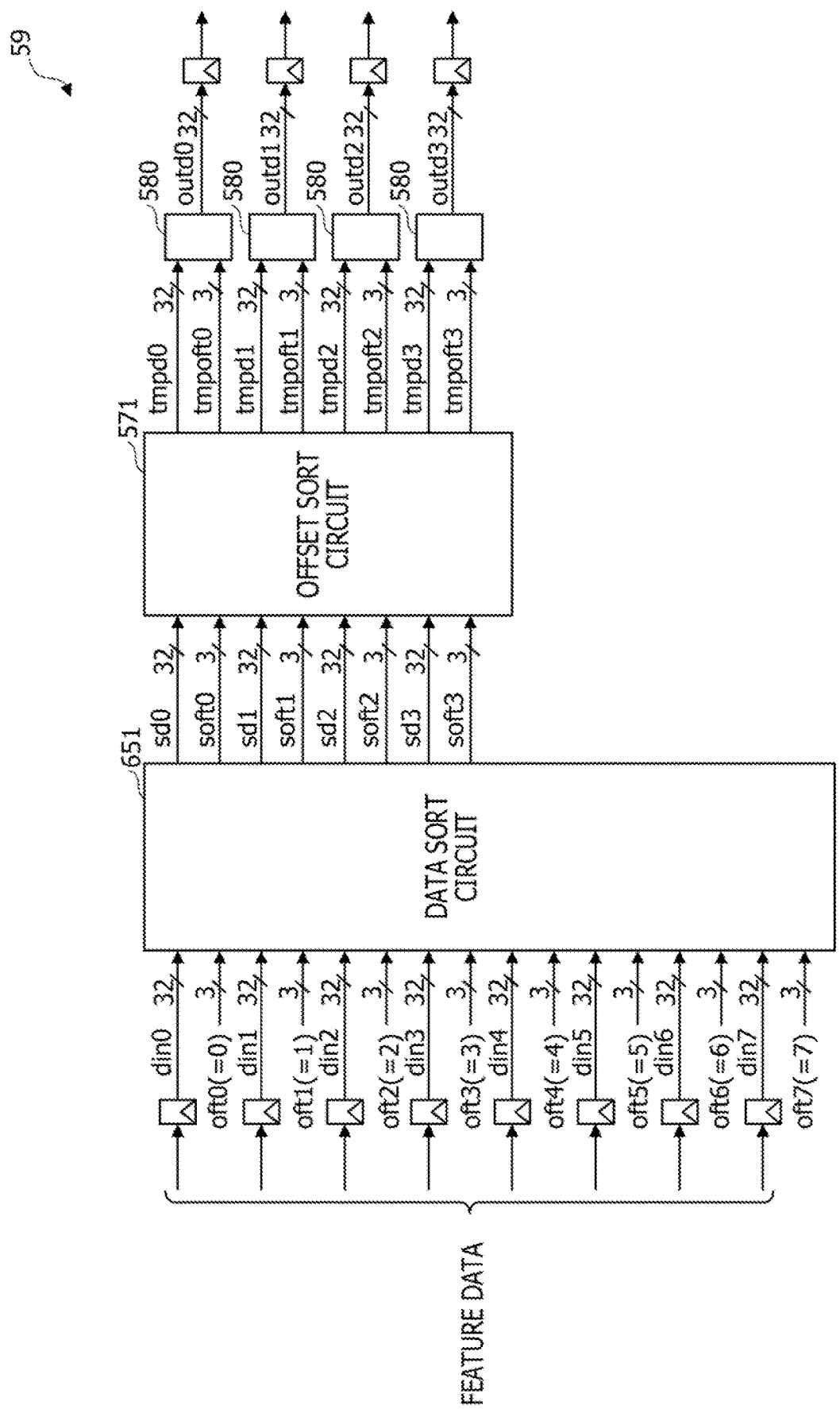
FIG. 35 is a diagram illustrating an example of a compression unit in FIG. 34.

FIG. 35 illustrates an example of the compression unit 59 in FIG. 34. The compression unit 59 includes a data sort circuit 561 instead of the data sort circuit 560 of the compression unit 56 in FIG. 18, and includes an offset sort circuit 571 instead of the offset sort circuit 570 of the compression unit 56 in FIG. 18.

Figure 36:
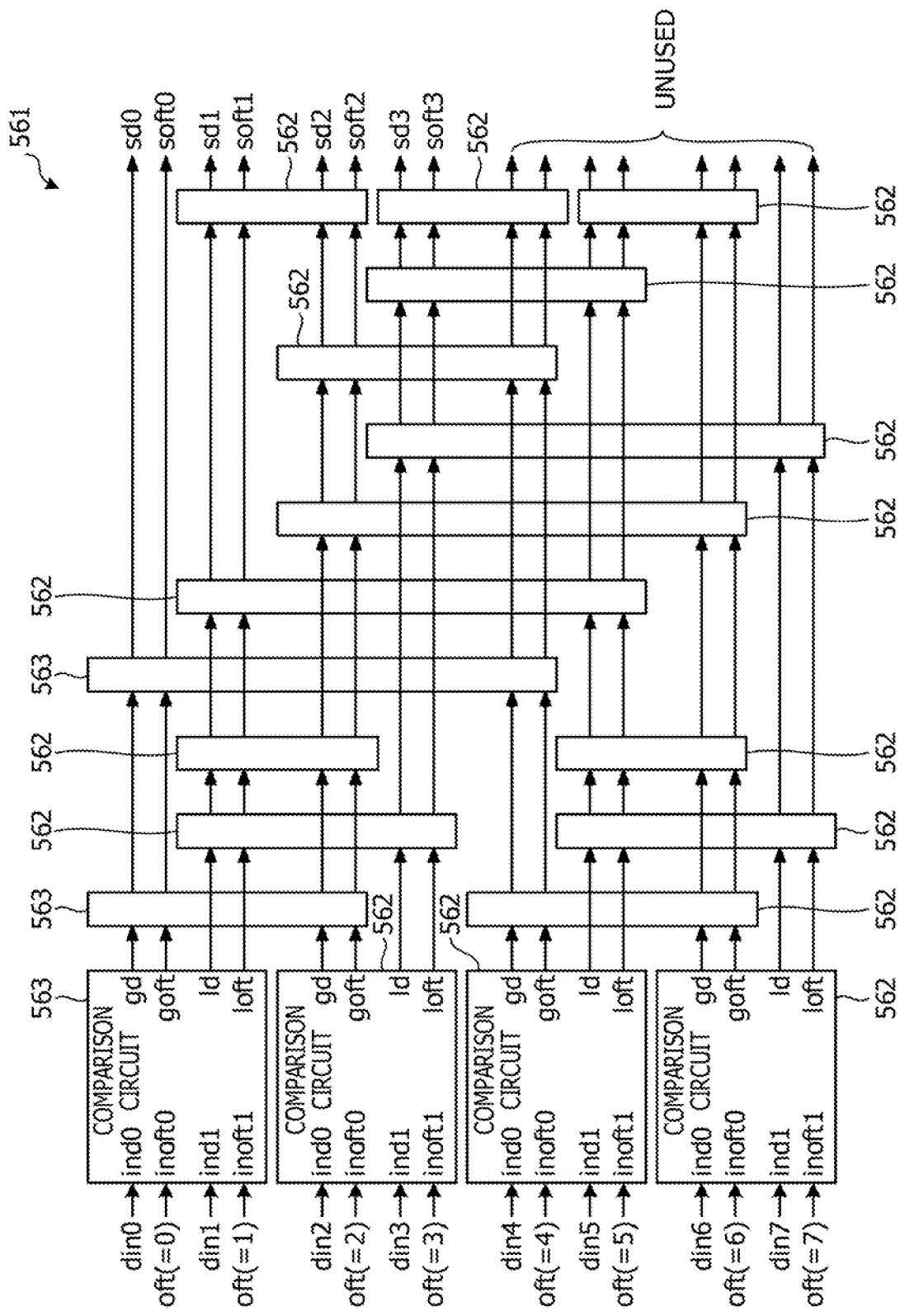
FIG. 36 is a diagram illustrating an example of a data sort circuit in FIG. 35.

FIG. 36 illustrates an example of the data sort circuit 561 in FIG. 35. Detailed description of a configuration similar to the data sort circuit 560 illustrated in FIG. 19 is omitted. In the data sort circuit 561, three comparison circuits 563 are added to a data sort circuit 560 illustrated in FIG. 19. The configuration of the comparison circuit 563 is the same as the configuration of the comparison circuit 562, and the operation of the comparison circuit 563 is the same as the operation of the comparison circuit 562 illustrated in FIG. 20.

The data sort circuit 561 compares magnitude of two absolute values at a time, of all of feature data (din0-din7) to be input, and outputs four pieces of feature data having large absolute values as sort data sd0-sd3 together with offsets soft0-soft3. Since the absolute values of all pieces of the feature data (din0-din7) are compared, the circuit scale of the data sort circuit 561 is larger than the circuit scale of the data sort circuit 560 illustrated in FIG. 19.

Figure 37:
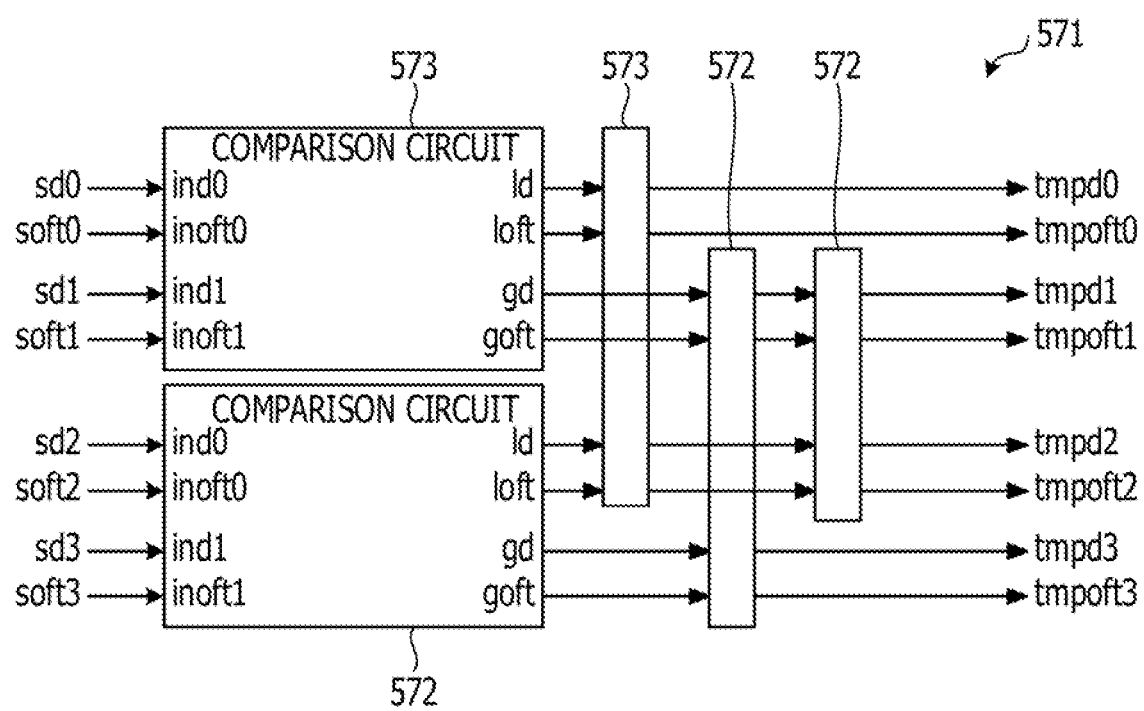
FIG. 37 is a diagram illustrating an example of an offset sort circuit in FIG. 35.

FIG. 37 illustrates an example of the offset sort circuit 571 in FIG. 35. Detailed description of a configuration similar to the offset sort circuit 570 illustrated in FIG. 21 is omitted. In the offset sort circuit 571, two comparison circuits 573 are added to the offset sort circuit 571 illustrated in FIG. 21. The configuration of comparison circuit 573 is the same as the configuration of comparison circuit 572, and the operation of comparison circuit 573 is the same as the operation of comparison circuit 572 illustrated in FIG. 22.

The offset sort circuit 571 compares the magnitude of two values at a time, of all the input offsets soft0-soft3, and outputs sort data tmpd0-tmpd3 in ascending order of the values of offsets tmpoft. Since the values of all the offsets soft0-soft3 are compared, the circuit scale of the offset sort circuit 571 is larger than the circuit scale of the offset sort circuit 570 illustrated in FIG. 21.

FIG. 38 illustrates an example of a compression operation by the compression unit 59 in FIG. 35. Detailed description of an operation similar to that in FIG. 23 is omitted. FIG. 38 illustrates an example in which 14 elements (feature data) are compressed to eight, similarly to FIG. 23.

The compression unit 59 selects four pieces of feature data having large absolute values from the eight pieces of feature data in the sub-array. Then, the compression unit 59 rearranges the four pieces of feature data selected for each array in ascending order of offsets to obtain compressed feature data. Therefore, in the first sub-array, the feature data of a selected index x [0] that is selected in FIG. 23 is not selected, and the feature data of an index x [3] that is not selected in FIG. 23 is selected. In the second sub-array, since the absolute value of the feature data of an index x [8] is larger than the other pieces of feature data, the same operation as that illustrated in FIG. 23 is executed.

FIG. 39 illustrates an example of an operation flow of the compression operation by the compression unit 59 in FIG. 35. Detailed description of an operation similar to that in FIG. 24 is omitted. The operation flow of the compression unit 59 is similar to the operation flow in FIG. 24 except that step S30A is executed instead of step S30 in FIG. 24 and step S362A is executed instead of step S362 in FIG. 24.

Step S30A is similar to step S30 illustrated in FIG. 24 except that the offset number Y corresponding to the feature data, which is usually selected, is not set. In step S362A, the compression unit 59 selects D pieces of feature data from S pieces of feature data in descending order of the absolute values.

Figure 40A:
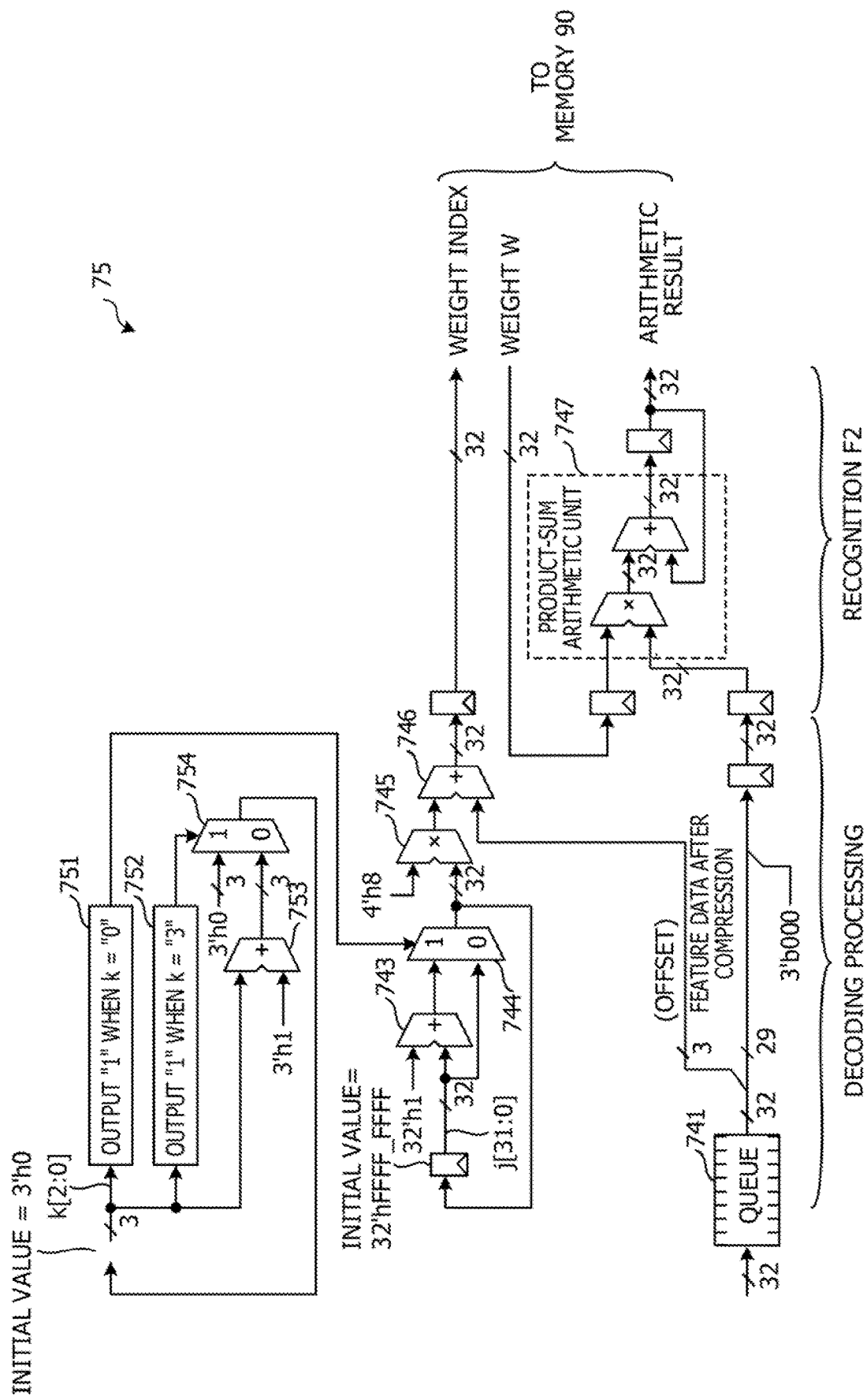
FIG. 40A is a diagram illustrating an example of a sparse matrix arithmetic unit in FIG. 34.

FIG. 40A illustrates an example of the sparse matrix arithmetic unit 75 in FIG. 34. Elements similar to those in FIG. 25 are denoted by the same reference numerals, and detailed description is omitted. The sparse matrix arithmetic unit 75 includes comparison circuits 751 and 752, an adder 753, and a selector 754 instead of the NOR gate 742 of the sparse matrix arithmetic unit 74 illustrated in FIG. 25. Other configurations of the sparse matrix arithmetic unit 75 are similar to those of the sparse matrix arithmetic unit 74 illustrated in FIG. 25.

A latch connected to inputs of the comparison circuits 751 and 752 outputs a 3-bit variable k, and the variable k is initialized to "0" every four clock cycles. The comparison circuit 751 outputs logic 1 in a case where the variable k is "0", and outputs logic 0 in a case where the variable k is a value other than "0". The comparison circuit 752 outputs the logic 1 when the variable k is "3", and outputs the logic 0 when the variable k is a value other than "3".

The comparison circuit 752, the adder 753, and the selector 754 operate as a counter that increments the variable k when the variable k is a value other than "3" and resets the variable k to "0" when the variable k is "3". Thereby, a variable j can be incremented for each boundary of compressed sub-arrays including four elements without using an offset "0".

Figure 40B:
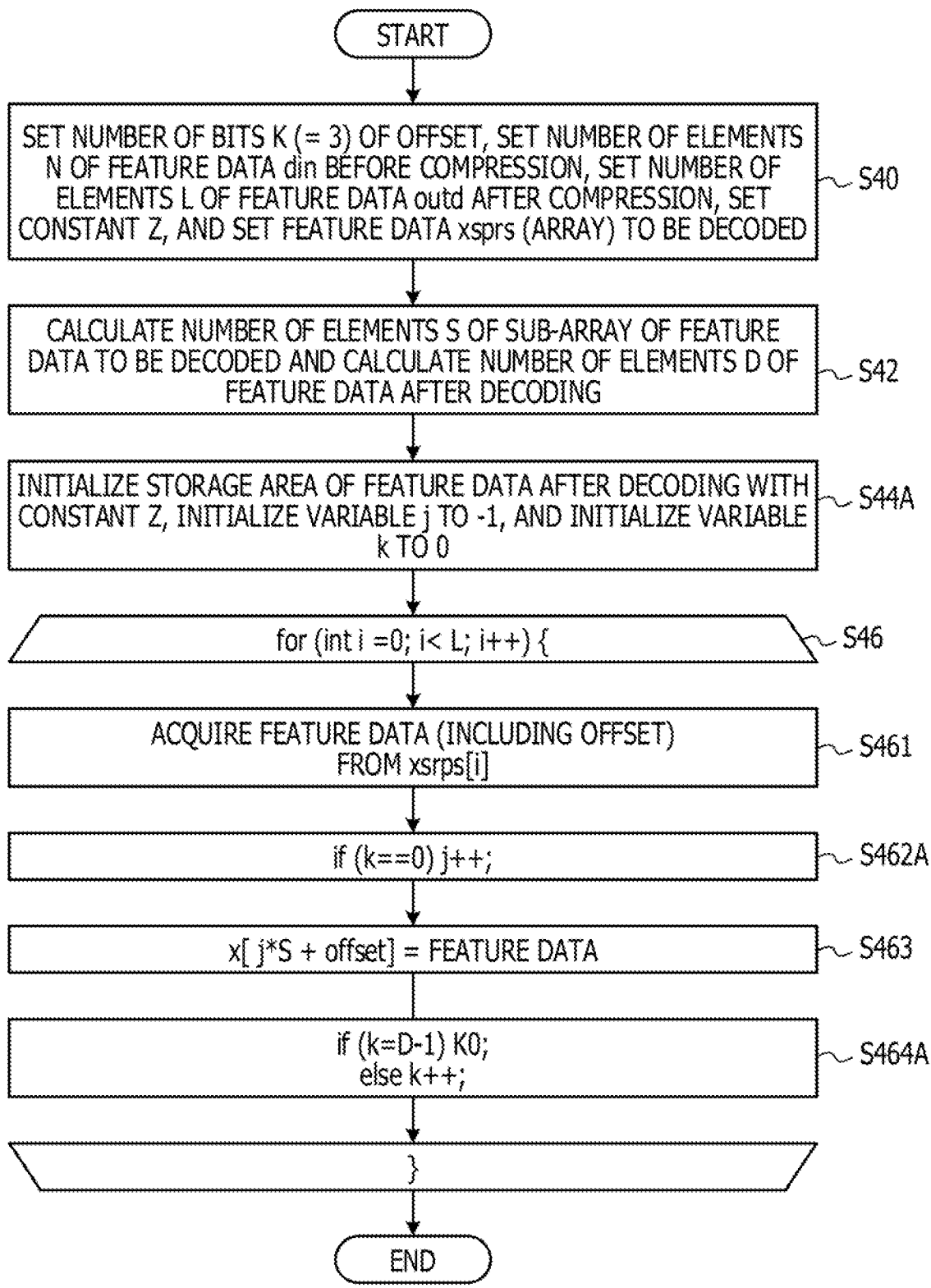
FIG. 40B is a diagram illustrating an example of an operation flow of a decoding operation by the sparse matrix arithmetic unit in FIG. 40A.

FIG. 40B illustrates an example of an operation flow of a decoding operation by the sparse matrix arithmetic unit 75 in FIG. 40A. Detailed description of an operation similar to that in FIG. 28 is omitted. The operation flow of the sparse matrix arithmetic unit 75 is similar to the operation flow in FIG. 28 except that step S44A is executed instead of step S44 in FIG. 28, step S462A is executed instead of step S462 in FIG. 28, and step S464A is added after step S463 in FIG. 28. For example, in step S46, the sparse matrix arithmetic unit 75 executes steps S461, S462A, S463, and S464A for each operation cycle for decoding L pieces of feature data.

In step S44A, an operation to initialize the variable k to "0" is added to step S44 in FIG. 28. In step S462A, the sparse matrix arithmetic unit 75 increments the variable j in the case where the variable k is "0". For example, the sparse matrix arithmetic unit 75 increments the variable j every time the boundary of sub-arrays is detected. In step S464A, the sparse matrix arithmetic unit 75 resets the variable k to "0" in a case where the variable k is "D-1", and increments the variable k in a case where the variable k is a value other than "D-1". Then, by repeating steps S461 to S464A, the feature data in all the sub-arrays is decoded.

As described above, in the embodiment illustrated in FIGS. 34 to 40B, similar effects to those in the embodiments illustrated in FIGS. 1 to 9 and FIGS. 16 to 33 can be obtained. Moreover, in the embodiment illustrated in FIGS. 34 to 39, the four pieces of feature data having large absolute values, of the eight pieces of feature data for each sub element extracted in the sensor SoC 20, can be usually selected. Therefore, the accuracy of recognition processing F2 can be improved as compared with a case where the feature data with the offset number Y is usually selected.

Figure 41:
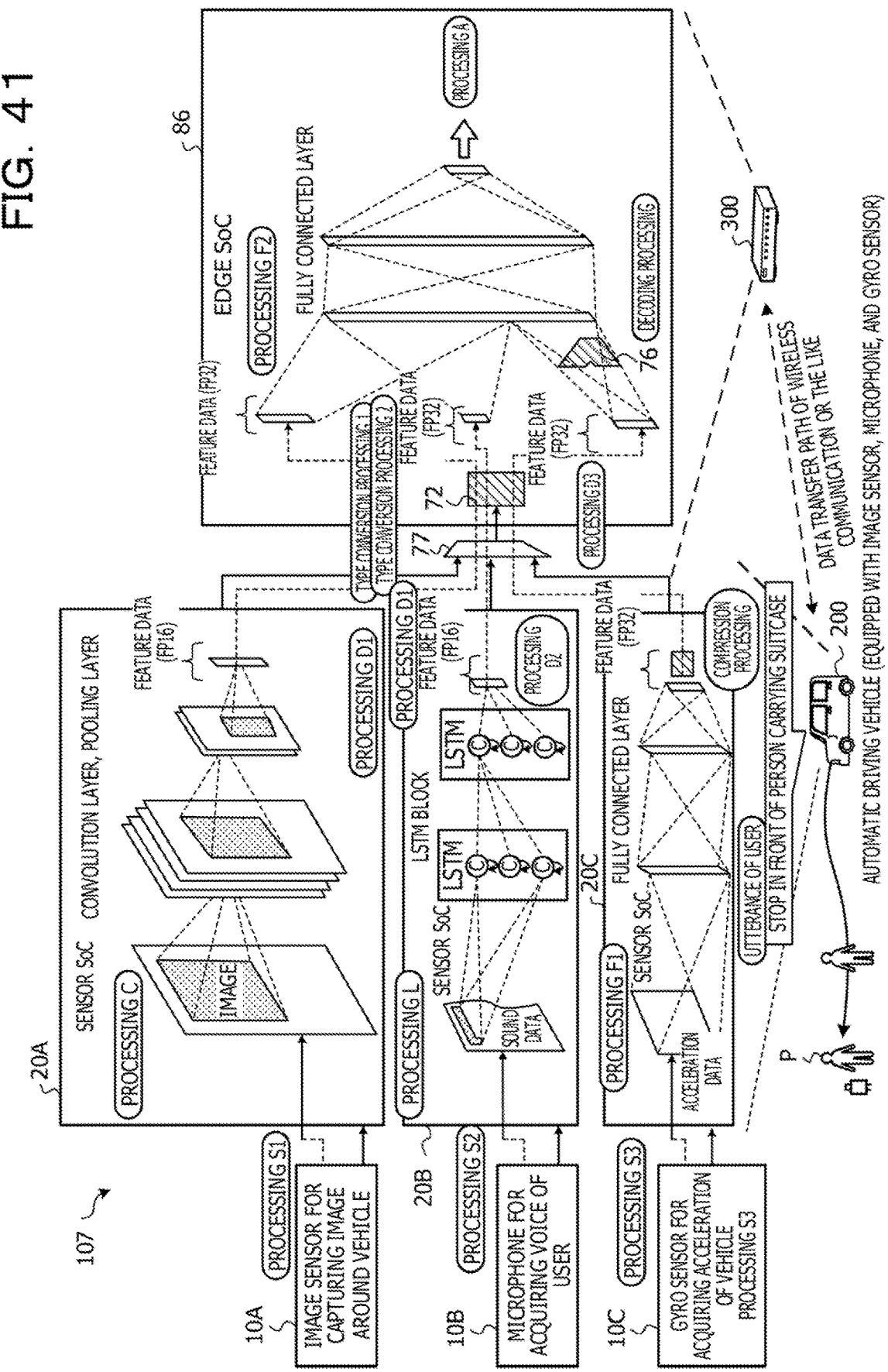
FIG. 41 is a diagram illustrating an example of an information processing apparatus according to another embodiment.

FIG. 41 illustrates an example of an information processing apparatus according to another embodiment. Elements and functions similar to those in the above-described embodiment are denoted by the same reference numerals, and detailed description is omitted. An information processing apparatus 107 illustrated in FIG. 41 includes an image sensor 10A, a microphone 10B, a gyro sensor 10C, and sensor SoCs 20A, 20B, and 20C, which are mounted on a vehicle 200 capable of automatically driving, and an edge SoC 66 that is mounted on a server 300. For example, the server 300 is installed in a data center. Note that the server 300 may function as a cloud computer. The information processing apparatus 107 functions as a multimodal DNN inference system. The vehicle 200 is a passenger car, a truck, a bus, or the like traveling on a road but is not limited thereto as long as the vehicle 200 travels in an environment where automatic driving is possible.

The vehicle 200 and the server 300 are connected via a data transfer path such as wireless communication. For example, the sensor SoCs 20A, 20B, and 20C are wirelessly connected to the edge SoC 66 through a communication interface mounted on the vehicle. The image sensor 10A is installed in a front of the vehicle 200, and the microphone 10B is installed near a driver's seat.

The sensor SoC 20A converts an image around the vehicle 200 captured by the image sensor 10A into processable image data (processing S1). The sensor SoC 20A extracts feature data of the converted image data (processing C), and transfers the extracted feature data to the edge SoC 66 via a selector 77 (processing D1).

The sensor SoC 20B converts a voice of a user such as a driver acquired by the microphone 10B into processable sound data (processing S2). The sensor SoC 20B extracts feature data of the converted sound data (processing L), and transfers the extracted feature data to the edge SoC 66 via the selector 77 (processing D1).

The sensor SoC 20C converts a vehicle acceleration acquired by the gyro sensor 10C into processable acceleration data (processing S3), and extracts feature data of the converted acceleration data (processing F1). Furthermore, the sensor SOC 20C includes a compression unit 56 that compresses the feature data, compresses the extracted feature data (compression processing), and transfers the compressed feature data to the edge SoC 66 via the selector 77 (processing D3).

The configuration of the sensor SOC 20A is similar to that in FIG. 4, and the configuration of the sensor SoC 208 is similar to that in FIG. 5. The configuration of the sensor SoC 20C is similar to that of the sensor SoC 20C in FIG. 6 except that the compression unit 56 is connected to a bus 21C. Furthermore, processing by the sensor SoCs 20A, 20B, and 20C, and the edge SoC 66 is similar to the processing by the multimodal DNN inference system illustrated in FIG. 3 except that a data type of data to be handled is different, and type conversion processing, compression processing, and decoding processing are included.

The edge SoC 66 includes a type conversion unit 72, a decoding circuit 76, and an arithmetic core 83 (not illustrated) that executes recognition processing F2 and processing A (application). The type conversion unit 72 converts feature data (FP16) transferred from the sensor SoCs 20A and 20B into FP32. The decoding circuit 76 decodes the compressed feature data (FP32) transferred from the sensor SoC 20C. For example, the decoding circuit 76 includes a queue 741, a NOR gate 742, an adder 743, a selector 744, a multiplier 745, and an adder 746 illustrated in FIG. 25. Note that the edge SoC 66 may include a sparse matrix arithmetic unit 74 illustrated in FIG. 25 in addition to the arithmetic core 83, and execute decoding processing for the feature data extracted from the acceleration data and compressed, and part of the processing F2, by the sparse matrix arithmetic unit 74.

The information processing apparatus 107 in FIG. 41 executes an operation corresponding to an instruction on the basis of a voice instruction by the user riding on the vehicle 200. Hereinafter, as an example, a case in which the user instructs "stop in front of a person carrying a suitcase" will be described.

The information processing apparatus 107 that has received the instruction with voice executes processing (object detection) of detecting a person P matching the content instructed by the user with voice from among the image data captured by the image sensor 10A. By using not only the image data but also the sound data, an object to be detected (person P) can be instructed with voice. Furthermore, the information processing apparatus 107 can execute the detection processing while correcting blur of the image data caused by shaking of the vehicle 200, or the like, by using the acceleration data acquired by the gyro sensor 10C.

The edge SoC 66 executes the recognition processing F2 on the basis of the feature data extracted from the image data and the acceleration data, thereby detecting, from the image data, the person P instructed by the user with voice and specifying the position of the person P. Then, the edge SoC 66 executes the processing A on the basis of an execution result of the recognition processing F2, and instructs information indicating a position at which the vehicle 200 is to be stopped to the vehicle 200 on the basis of the specified position of the person P. The instruction to the vehicle 200 may be only position information for stopping the vehicle, or may include an instruction to a control unit that controls an accelerator, a brake, a steering, and the like of the vehicle 200. The vehicle 200 that has received the instruction from the server 300 executes, for example, control to pull over the vehicle 200 to a side of a roadway and stop the vehicle 200 at the position where the person P is present instructed by the user with voice according to the instruction.

Note that, it is assumed that the vehicle 200 travels in an airport or the like and the vehicle 200 is intended to stop in front of a person P wearing a check blue jacket among a plurality of people carrying suitcases. In this case, for example, the user can stop the vehicle 200 at the place where the person P is present by instructing "stop in front of the person wearing a check blue jacket and carrying a suitcase". For example, in the multimodal DNN inference system of this embodiment, the user can stop the vehicle 200 in front of the person P having the instructed characteristic by instructing an arbitrary characteristic using the microphone 10B. Furthermore, the vehicle 200 can be stopped at a building or an arbitrary place by specifying a characteristic of the shape or a color of the building, a characteristic of a signboard, or the like.

Figure 42A:
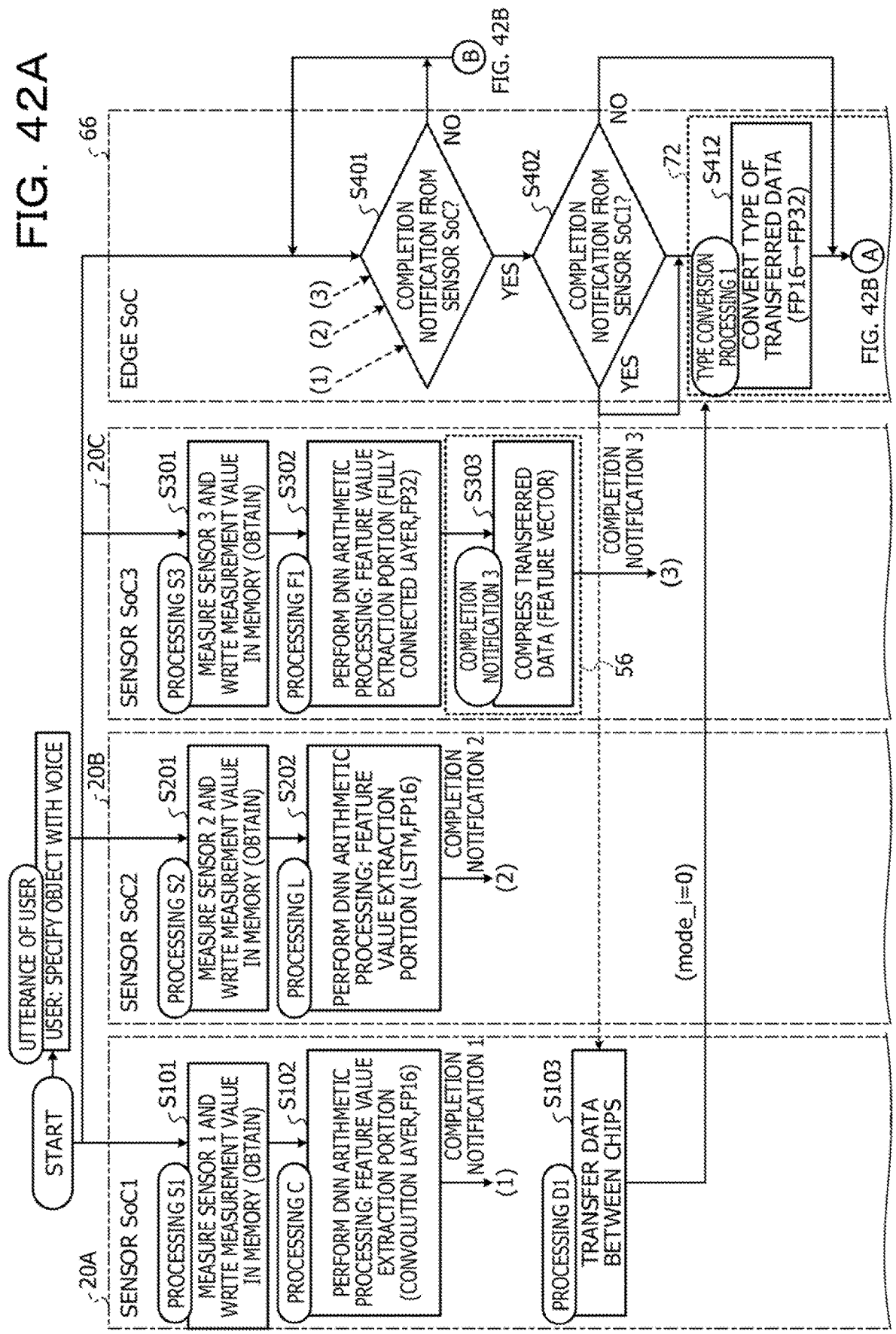
FIG. 42A is a diagram illustrating an example of an operation flow in a case where the information processing apparatus in FIG. 41 executes inference processing by a multimodal DNN.
Figure 42B:
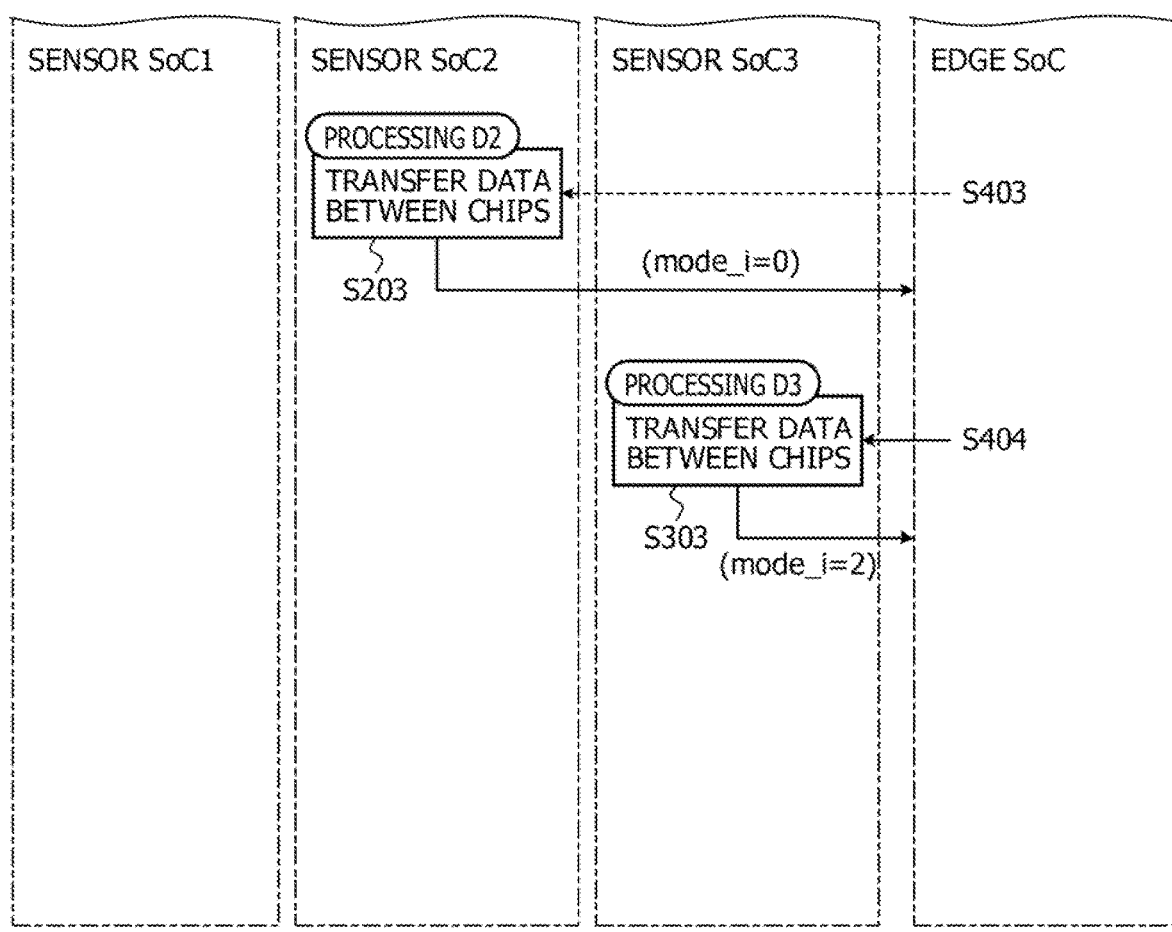
FIGS. 42B and 42C are a diagram illustrating continuation of FIG. 42A.
Figure 42C:
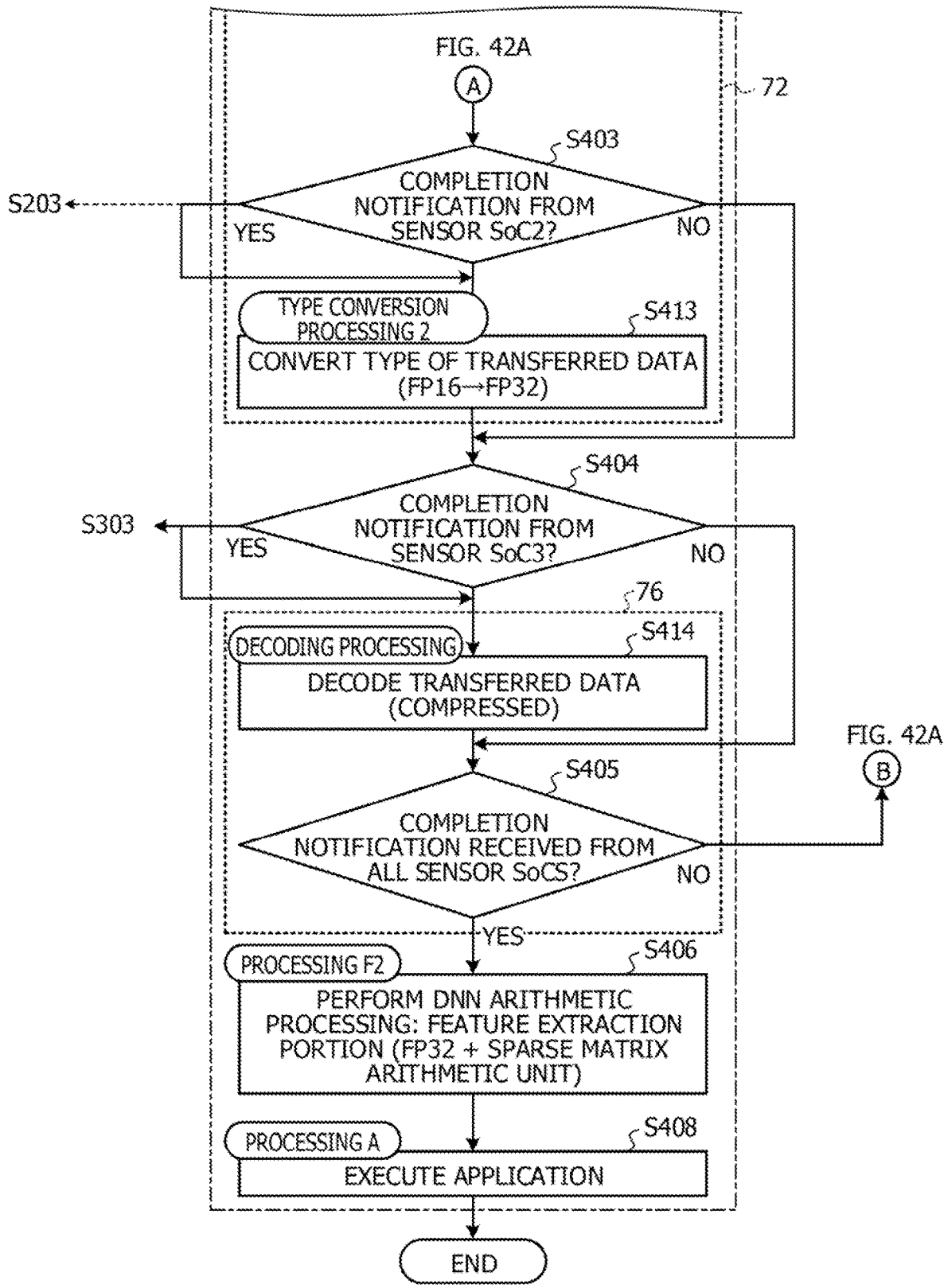

FIGS. 42A to 42C are diagrams illustrating an example of an operation flow in a case where the information processing apparatus 107 in FIG. 41 executes inference processing by a multimodal DNN. For example, FIGS. 42A to 42C illustrate an example of a method of controlling the information processing apparatus 107. Detailed description of operations similar to those in FIGS. 7A to 7C, 13A and 13B is omitted. The multimodal DNN inference processing is started when the user instructs the characteristic and operations of an object (for example, the person P illustrated in FIG. 41) by voice. The operations illustrated in FIGS. 42A to 42C are repeatedly executed until inference processing is completed (for example, until the vehicle 200 stops at the position where the person P is present) after receiving the instruction from the user.

The operations of the sensor SoCs 20A and 20B are similar to the operations of the sensor SoCs 20A and 20B illustrated in FIGS. 7A to 7C, and 13. The operation of the sensor SoC 20C is similar to the operation of the sensor SoC 20C illustrated in FIGS. 7A to 7C except that compression processing by the compression unit 56 is executed in step S303 after the feature data is extracted in step S302.

In step S412, the edge SoC 66 executes the operation of converting the feature data (FP16) of the image received from the sensor SoC 20A into FP32 by the type conversion unit 72. Furthermore, in step S413, the edge SoC 66 executes the operation of converting the feature data (FP16) of the sound received from the sensor SoC 20B into FP32, Furthermore, in step S414, the edge SoC 66 executes the operation of decoding the feature data (compressed data) of the acceleration received from the sensor SoC 20C by the decoding circuit 76, Other operations of the edge SoC 66 are similar to those of the edge SoC 60 in FIGS. 7A to 7C. Then, in the processing F2, the edge SoC 66 executes the recognition processing using the feature data as an input, and detects the person P instructed by the user with voice as a result of the recognition processing. In the processing A, the edge SoC 66 performs control to pull over the vehicle 200 to a side of a roadway and then stop the vehicle 200 at the place of the person P instructed by the user with voice on the basis of the result of the processing F2.

Note that one or both of the sensor SoCs 20A and 208 may include a compression unit that compresses the feature data. In this case, the decoding circuit 76 decodes not only the feature data compressed by the sensor SoC 20C but also the feature data compressed by the sensor SoC 20A or the sensor SoC 20B. Furthermore, the type conversion unit 72 of the edge SoC 66 may convert the type of the feature data transferred from the sensor SoC 20C.

As described above, in the embodiment illustrated in FIGS. 42A to 42C, similar effects to those in the embodiments illustrated in FIGS. 1 to 40B can be obtained. Furthermore, in the embodiment illustrated in FIGS. 41 to 42C, the multimodal DNN inference system is able to be realized by mounting the sensor SoCs 20A, 20B, and 20C in the vehicle 200 and wirelessly communicating with the server 300. Since the number of components mounted on the vehicle 200 can be reduced, the cost of the vehicle 200 can be reduced. For example, in a case where a higher-definition image sensor is developed, a multimodal DNN inference system with improved recognition accuracy can be constructed by replacing only the sensor SoC 20A. Furthermore, in a case of changing the specification of the edge SoC 66, upgrade of the version of the server 300 in the data center is sufficient and change of the vehicle 200 is not needed. In a case where processing capability of the edge SoC 66 is sufficient, processing for a plurality of vehicles 200 can be executed in parallel.

Figure 43:
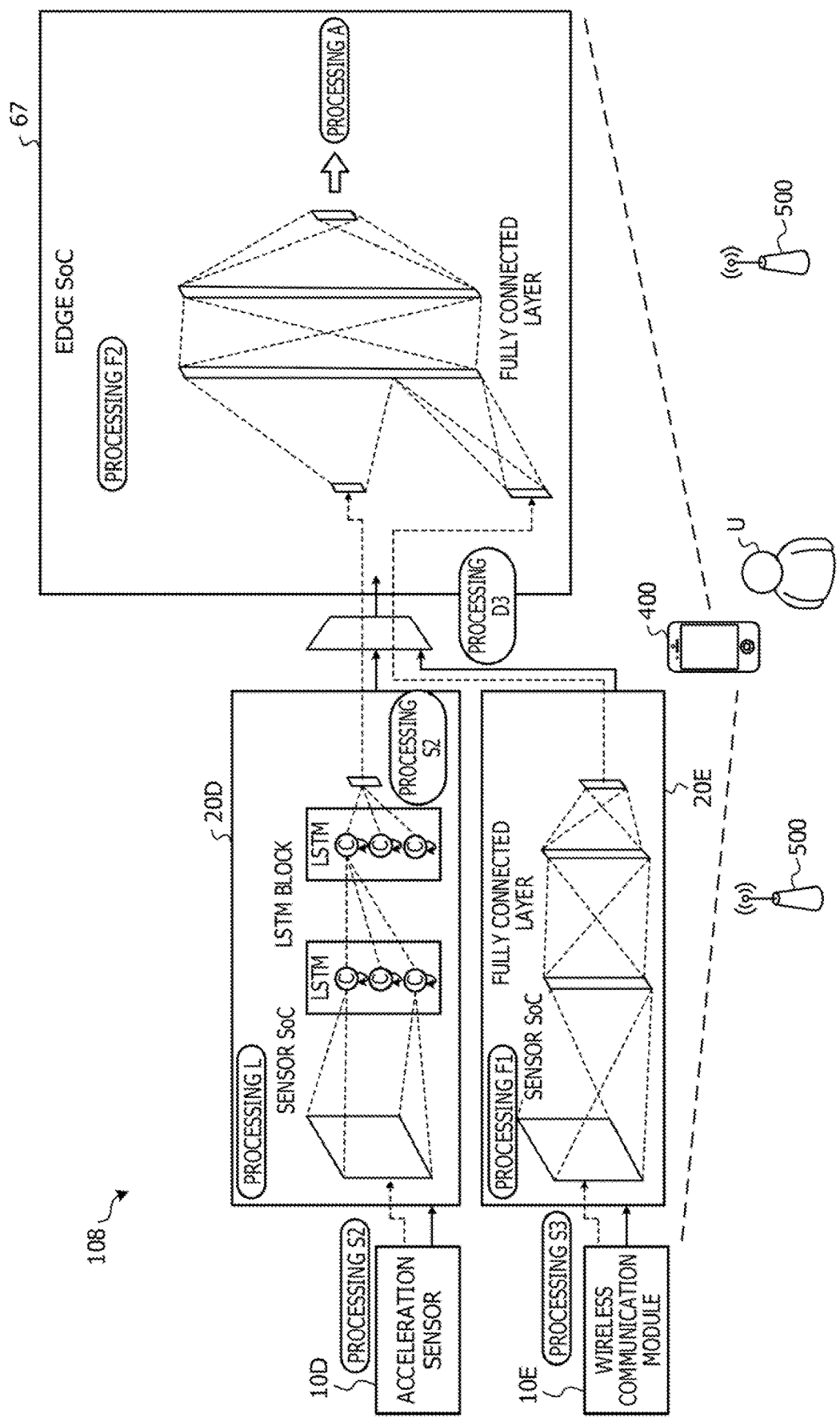
FIG. 43 is a diagram illustrating an example of an information processing apparatus according to another embodiment.

FIG. 43 illustrates an example of an information processing apparatus according to another embodiment. Elements and functions similar to those in the above-described embodiment are denoted by the same reference numerals, and detailed description is omitted. An information processing apparatus 108 illustrated in FIG. 43 includes sensor SoCs 20D and 20E and an edge SoC 67 incorporated in a mobile terminal 400 such as a smartphone, and functions as a multimodal DNN inference system. The mobile terminal 400 includes an acceleration sensor 10D and a wireless communication module 10E such as a wireless local area network (LAN). The acceleration sensor 10D measures acceleration applied to the mobile terminal 400. Measured acceleration data is converted into data processable by the sensor SoC 20D (processing S2). The wireless communication module 10E communicates with a plurality of wireless access points 500 installed indoors such as a store, and measures strength of wireless signals (hereinafter referred to as signal strength) of the wireless access points 500. Measured strength data is converted into data processable by the sensor SoC 20E (processing S3).

The sensor SoC 20D has an LSTM block that executes processing L1 with LSTM for the acceleration data obtained through measurement by the acceleration sensor 10D, and extracts feature data from the acceleration data. The sensor SoC 20D executes processing D2 for transferring the extracted feature data to the edge SoC 67.

The sensor SoC 20E extracts the feature data from the strength data by executing processing F1 with a fully connected layer for the strength data indicating the signal strength of the plurality of wireless access points obtained from the wireless communication module 10E. The sensor SoC 20E executes processing D3 for transferring the extracted feature data to the edge SoC 67.

The edge SoC 67 executes recognition processing F2 based on the extracted feature data transferred from the sensor SoCs 20D and 20E and processing A (application) based on an recognition result, in the recognition processing F2, the position of the mobile terminal 400 is estimated from the feature data based on the operation of the acceleration sensor 10D and the feature data based on the operation of the wireless communication module 10E. in the processing A, the edge SoC 67 presents information regarding a product existing around a user to the mobile terminal 400 on the basis of the estimated position of the mobile terminal 400 in the store.

Recently, the mobile terminal 400 such as a smartphone has a built-in global positioning system (GPS) receiver, and can detect the position of the mobile terminal 400 by acquiring GPS radio waves. However, the position may not be able to be detected indoors where GPS radio waves do not reach. In this embodiment, the position of the mobile terminal 400 can be estimated on the basis of the acceleration data and the wireless signal strength even indoors where GPS radio waves do not reach. Thereby, various services such as recommending purchases of products can be provided on the basis of position information indicating the position of the user in the store.

By using both the acceleration data and the signal strength, the position information can be estimated with higher accuracy than a case of using only one of the acceleration data and the signal strength. Furthermore, the position information can be estimated with high accuracy without adding equipment other than the mobile terminal 400 and the access points 500.

Note that one or both of the sensor SoCs 20D and 20E may include a compression unit that compresses the feature data. In this case, the edge SoC 67 includes a decoding circuit that decodes the compressed feature data. The configurations, functions, and operations of the compression unit and the decoding circuit are similar to the configurations, functions, and operations illustrated in FIGS. 18 to 28, 32, 33, and 35 to 40A. Furthermore, the edge SoC 67 may include a type conversion unit for converting a data type of the feature data transferred from one or both of the sensor SoCs 20D and 20E. The configuration and function of the type conversion unit are similar to the configuration and function illustrated in FIGS. 11 and 12. As described above, in the embodiment illustrated in FIG. 43, similar effects to those in the embodiments illustrated in FIGs. 1 to 40B can be obtained.

Figure 44:
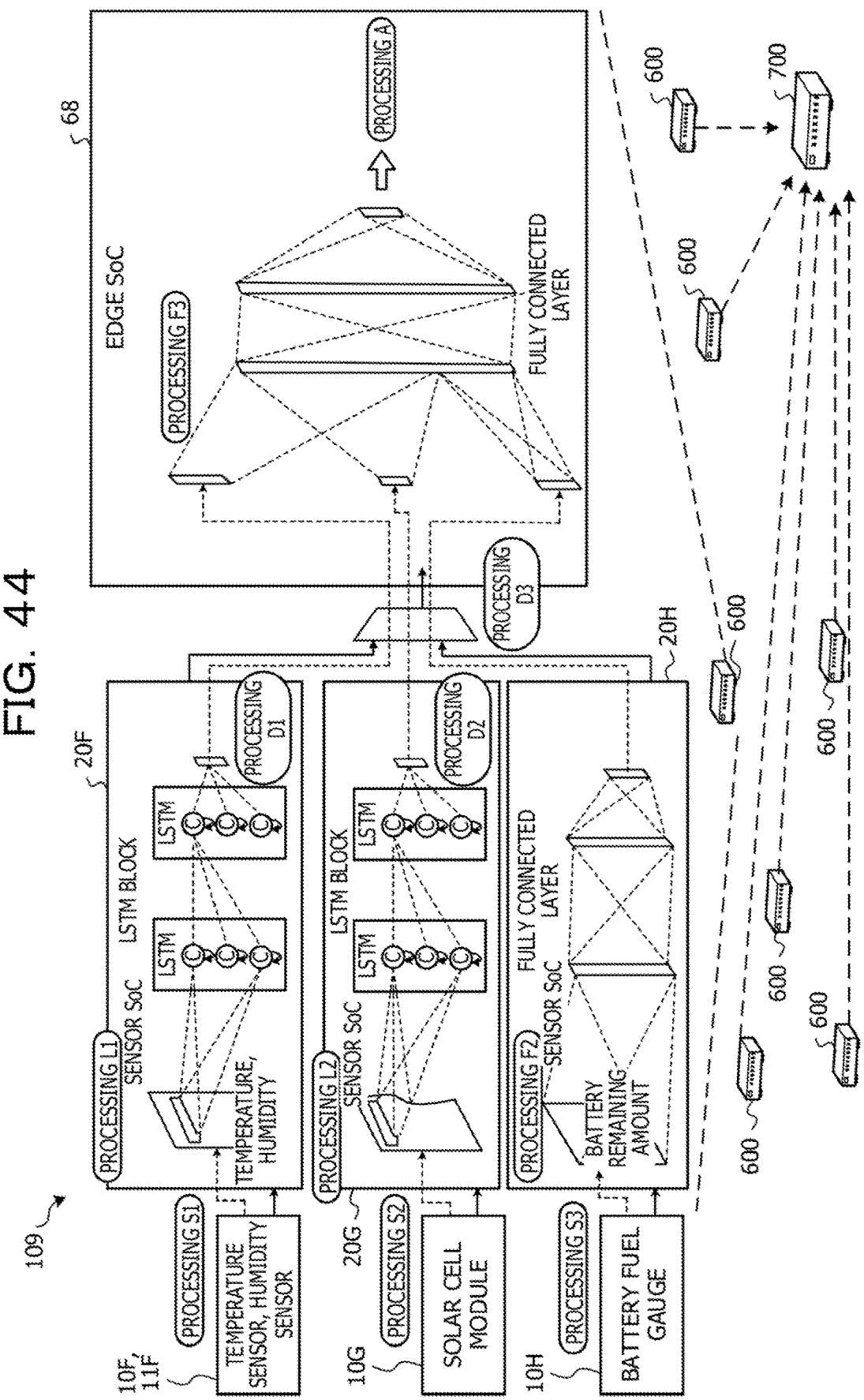
FIG. 44 is a diagram illustrating an example of an information processing apparatus according to another embodiment.

FIG. 44 illustrates an example of an information processing apparatus according to another embodiment. Elements and functions similar to those in the above-described embodiment are denoted by the same reference numerals, and detailed description is omitted. An information processing apparatus 109 illustrated in FIG. 44 is realized by a plurality of wireless terminals 600 installed in a field, an orchard, a greenhouse, and the like, Each wireless terminal 600 includes sensor SoCs 20F, 20G, and 20H and an edge SoC 68, and functions as a multimodal DNN inference system.

Each wireless terminal 600 is operated by a battery built in the wireless terminal 600, and includes a plurality of sensors such as a temperature sensor 10F, a humidity sensor 11F, a solar cell module 10G, and a battery fuel gauge 10H. Each wireless terminal 600 performs wireless communication with a host terminal 700 installed indoors, and transfers information indicating the measured temperature and humidity to the host terminal 700.

The host terminal 700 displays the transferred temperature and humidity on a display device, monitors the temperature and humidity, and outputs an alarm or the like in a case where the temperature and humidity are abnormal. By digitizing and displaying environmental information such as the temperature and humidity at a plurality of locations on the display device, crop growth management and the like can be facilitated. Furthermore, in a case where the wireless terminal 600 is installed in a greenhouse, the host terminal 700 executes opening/closing of a greenhouse window, operation of the ventilation fan, control of an air conditioner, and the like on the basis of the transferred temperature and humidity information. Thus, the information processing apparatus 109 can realize so-called smart agriculture.

The temperature sensor 10F measures the temperature around the wireless terminal 600, and the humidity sensor 11F measures the humidity around the wireless terminal 600. The measured temperature and humidity are converted into data processable by the sensor SoC 20F (processing S1). The solar cell module 10G receives sunlight to generate power, supplies the generated power to a battery, and generates voltage information indicating a current output voltage. The voltage information is converted into data processable by the sensor SoC 20G (processing S2). The battery fuel gauge 10H measures a remaining amount of battery power. The measured remaining amount of battery power is converted into data processable by the sensor SoC 20H (processing S3).

The sensor SoC 20F has an LSTM block that executes processing L1 with LSTM for temperature data obtained through measurement by the temperature sensor 10F and humidity data obtained through measurement by the humidity sensor 11F, and extracts the feature data from the temperature data and the humidity data. The sensor SoC 20F executes processing D1 for transferring the extracted feature data to the edge SoC 68.

The sensor SoC 20G has an LSTM block that executes processing L2 with LSTM for output voltage data output by the solar cell module 10G, and extracts feature data from the output voltage data. The sensor SoC 20G executes processing D2 for transferring the extracted feature data to the edge SoC 68.

The sensor SoC 20H extracts feature data from a remaining amount data output by the battery fuel gauge 10H by executing processing F2 with a fully connected layer for the remaining amount data. The sensor SoC 20H executes processing D3 for transferring the extracted feature data to the edge SoC 68.

The edge SOC 68 executes recognition processing F3 based on the feature data transferred from the sensor SoCs 20F, 20G, and 20H and processing A (application) based on an recognition result. In the recognition processing F3, the edge SoC 68 determines importance of the measured temperature and humidity on the basis of the feature data of the temperature and humidity from the sensor SoC 20F. For example, in a case where one or both of the temperature and humidity changes by a predetermined amount or more from a previously measured value, the importance is determined to be high. Furthermore, in the recognition processing F3, the edge SoC 68 estimates a duration time of the battery on the basis of the feature data of the output voltage from the solar cell module 10G and the feature data of the remaining amount data from the battery fuel gauge 10H.

In the processing A, the edge SoC 68 makes a sensing interval and a communication interval with the host terminal 700 shorter as the importance of the temperature and humidity is higher, and makes the sensing interval and the communication interval with the host terminal 700 longer as the importance of the temperature and humidity is lower. Furthermore, the edge SoC 68 makes the sensing interval and the communication interval with the host terminal 700 shorter as an estimated value of the duration time of the battery is longer, and makes the sensing interval and the communication interval with the host terminal 700 longer as the estimated value of the duration time of the battery is shorter. In practice, the sensing interval and the communication interval with the host terminal 700 are adjusted on the basis of a combination of the importance of the temperature and humidity and the estimated value of the duration time of the battery.

Recently, realization of a wireless sensor network is expected with the decrease in the price of sensor elements and integrated circuits (ICs) having wireless functions. The wireless sensor network is a technology that allows a large number of wireless terminals including sensors to be arranged in a distributed manner over a wide range and enables sensing in the wide range, and is regarded as one of the core technologies of Internet of Things (IoT). The wireless sensor network can save installation effort and easily expand the sensing range as compared with a sensor network connecting terminals including sensors by wired means.

However, since a wireless terminal with a sensor operates with electric power supplied from a battery and a solar cell, the operation time is shorter than a terminal to which electric power is constantly supplied via a power line. In this embodiment, the operating time of the wireless terminal 600 can be extended by changing the frequency of sensing and the frequency of wireless communication according to the importance of the temperature and humidity and the remaining amount of the battery. As a result, the operation effort of the wireless sensor network can be saved and the operation cost can be reduced.

Note that one or a plurality of the sensor SoCs 20F, 20G, and 20H may include a compression unit that compresses the feature data. In this case, the edge SoC 68 includes a decoding circuit that decodes the compressed feature data. The configurations, functions, and operations of the compression unit and the decoding circuit are similar to the configurations, functions, and operations illustrated in FIGS. 18 to 28, 32, 33, and 35 to 40A. Furthermore, the edge SoC 58 may include a type conversion unit that converts a data type of the feature data transferred from one or a plurality of the sensor SoCs 20F, 20G, and 20H. The configuration and function of the type conversion unit are similar to the configuration and function illustrated in FIGS. 11 and 12. As described above, in the embodiment illustrated in FIG. 44, similar effects to those in the embodiments illustrated in FIGS. 1 to 40B can be obtained.

Note that the sensor SoCs described in the above-described embodiments can be mounted on a single board computer, a PCI card, or a mobile terminal such as a smartphone or a game machine. Furthermore, the edge SoCs described in the above-described embodiments can be mounted on a single board computer, a desktop personal computer, a server installed in a data center, or the like. Furthermore, the communication between the sensor SoC and the edge SoC can be wired communication or wireless communication. Examples of the wired communication include PCIe, IEEE802.3, InfiniBand, and the like, and examples of the wireless communication include mobile communication standards such as IEEE802.11, Bluetooth (registered trademark), Zigbee (registered trademark), 3G, 4G, and the like.

Examples of the sensors connected to the sensor SOC include vibration sensors, barometric sensors, pressure sensors, illuminance sensors, geomagnetic sensors, laser range finders (range sensors), and the like, in addition to the sensors used in the above-described embodiments.

There are following configuration examples as the information processing apparatus (for example, the multimodal DNN inference system) including the sensor SoCs and the edge SoC.

(1) A single board computer equipped with a sensor SoC and a server equipped with an edge SoC installed in a data center are connected using a mobile communication standard.

(2) A PCI card equipped with a sensor SoC is attached to a PCI slot of a desktop personal computer. The edge SoC in this example is realized by a CPU of the desktop personal computer.

(3) A single board computer equipped with a sensor SoC and a single board computer equipped with an edge SoC are connected using a universal serial bus (USB). (4) A sensor SoC and an edge SoC are mounted on a board such as a single board computer. The sensor SoC and the edge SoC are connected by a PCI Express bus wired on the board.

From the above detailed description, characteristics and advantages of the embodiments will become apparent. This is intended to cover the features and advantages of the embodiments described above without departing from the spirit and the scope of the claims. Furthermore, any person having ordinary knowledge in the technical field can be easily come up with various improvements and modifications. Therefore, there is no intention to limit the scope of the inventive embodiments to those described above, and the scope of the inventive embodiments can rely on appropriate improvements and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
  a first preprocessing arithmetic device configured to execute preprocessing for first analog data from a first sensor; and
  a first post-processing arithmetic device connected to the first preprocessing arithmetic device and configured to execute post-processing for first preprocessed data output by the first preprocessing arithmetic device,
  the first preprocessing arithmetic device includes a first processor configured to:
  receive the first analog data from the first sensor and convert the first analog data into digital data;
  output feature data on the basis of a result of execution of feature extraction processing for the digital data; and
  output the feature data, and
  the first post-processing arithmetic device includes a second processor configured to:
  input the feature data;
  store the feature data in a first memory; and
  store, in the first memory, recognition result data based on a result of execution of recognition processing for the feature data,
  the first post-processing arithmetic device is further coupled to a second preprocessing arithmetic device and a third preprocessing arithmetic device,
  the first preprocessing arithmetic device, the second preprocessing arithmetic device and the third preprocessing arithmetic device operate in parallel with one another, and
  the first post-processing arithmetic device executes the recognition processing based on a reception of completion notifications from all of the first preprocessing arithmetic device, the second preprocessing arithmetic device and the third preprocessing arithmetic device,
  the second preprocessing arithmetic device includes a third processor and is configured to execute preprocessing for second analog data from a second sensor which is a sound sensor, the third processor is configured to:
  receive analog sound data from the sound sensor and converts the analog sound data into digital sound data; and
  output sound feature data based on a result of execution of the feature extraction processing for the digital sound data, and
  the second processor is configured to:
  input the sound feature data;
  store the sound feature data in the first memory; and
  store sound recognition result data in the first memory based on a result of execution of the recognition processing for the sound feature data.

2. The information processing apparatus according to claim 1, wherein,
  the first sensor is an image sensor,
  the first processor is configured to:
  receive analog image data from the image sensor;
  convert the analog image data into digital image data; and
  output image feature data based on a result of execution of the feature extraction processing for the digital image data; and
  the second processor is configured to:
  input the image feature data;
  store the image feature data in the first memory; and
  store image recognition result data in the first memory based on a result of execution of the recognition processing for the image feature data.

3. The information processing apparatus according to claim 1, wherein,
  the third preprocessing arithmetic device includes a fourth processor and is configured to execute preprocessing for third analog data from a third sensor which a motion sensor, the fourth processor is configured to:
  receive analog motion data from the motion sensor and converts the analog motion data into digital motion data; and
  output motion feature data based on a result of execution of the feature extraction processing for the digital motion data, and
  the second processor is configured to:
  input the motion feature data; store the motion feature data in the first memory; and
  store motion recognition result data in the first memory based on a result of execution of the recognition processing for the motion feature data.

4. The information processing apparatus according to claim 2, wherein the second preprocessing arithmetic device is configured to process sound data and the third preprocessing arithmetic device is configured to process analog motion data, the second preprocessing arithmetic device includes a third processor configured to:
  receive analog sound data from a sound sensor;
  convert the analog sound data into digital sound data; and
  output sound feature data based on a result of execution of the feature extraction processing for the digital sound data,
  the third preprocessing arithmetic device includes a fourth processor configured to:
  receive analog motion data from a motion sensor;
  convert the analog motion data into digital motion data; and
  output motion feature data based on a result of execution of the feature extraction processing for the digital motion data, and the second processor is configured to:
input the image feature data, the sound feature data, and the motion feature data; stores the image feature data, the sound feature data, and the motion feature data in the first memory; and
store the image recognition result data, sound recognition result data, and motion recognition result data in the first memory based on respective results of execution of the recognition processing for the image feature data, the sound feature data, and the motion feature data.

5. The information processing apparatus according to claim 1, wherein the second processor is configured to:
convert first data-type feature data into second data-type feature data;
convert the second data-type feature data into third data-type feature data;
convert the first data-type feature data from the first input unit into the second data-type feature data;
store the second data-type feature data in the first memory;
store second data-type normalized feature data in the first memory based on a result of execution of normalization processing for the second data-type feature data stored in the first memory;
convert the second data-type normalized feature data stored in the first memory into third data-type normalized feature data;
store the third data-type normalized feature data in the first memory; and
store the recognition result data in the first memory based on a result of execution of the recognition processing for the third data-type normalized feature data stored in the first memory.

6. The information processing apparatus according to claim 1, further comprising:
a second post-processing arithmetic device connected to the first post-processing arithmetic device, wherein the second processor is configured to:
convert first data-type feature data into second data-type feature data;
convert the second data-type feature data into third data-type feature data;
convert the first data-type feature data from the first input unit into the second data-type feature data;
store the second data-type feature data in the second memory, store second data-type normalized feature data in the second memory based on a result of execution of normalization processing for the second data-type feature data stored in the first memory;
convert the second data-type normalized feature data stored in the second memory into third data-type normalized feature data; and
output the third data-type normalized feature data, and
the second post-processing arithmetic device includes a fifth processor is configured to:
input the third data-type normalized feature data;
store the third data-type normalized feature data; and
store the recognition result data in a second memory based on a result of execution of the recognition processing for the third data-type normalized feature data.

7. The information processing apparatus according to claim 5, wherein the first processor is configured to:
output first specification information indicating a conversion specification of a data type of feature data together with the feature data to the first post-processing arithmetic device;
convert the data type of the feature data based on the first specification information,
the second processor is configured to: generate second specification information indicating a conversion specification of a data type of normalized feature data together with the normalized feature data, and
wherein the fifth process is configured to: convert the data type of the feature data based on the second specification information.

8. The information processing apparatus according to claim 1, wherein the first processor is configured to:
compress the feature data into compressed feature data; execute decoding processing and the recognition processing for the compressed feature data;
compress the feature data into the compressed feature data; and
store the recognition result data in the first memory based on a result of execution of the recognition processing for decoded feature data obtained by decoding the compressed feature data stored in the first memory by the second processor.

9. The information processing apparatus according to claim 8, wherein the first processor is configured to:
select a predetermined number of feature data having a larger absolute value than other feature data from a plurality of pieces of feature data, as the compressed feature data;
output the compressed feature data together with array information indicating an array order of the feature data before compression to the first post-processing arithmetic device;
store a variable to be calculated with the feature data corresponding to the array order of the feature data; and
read the variable to be calculated with the feature data included in the compressed feature data from the first memory and executes the recognition processing on the basis of the array information.

10. The information processing apparatus according to claim 9, wherein each feature data included in the compressed feature data is floating-point number data, and the first processor is configured to replace lower bits of a mantissa part of each feature data included in the compressed feature data with the array information.

11. The information processing apparatus according to claim 9, wherein the first processor is configured to:
select feature data at a predetermined position from an array of a predetermined number of feature data, the predetermined number being a unit of compression; and
determine repetition of an array of feature data based on array information corresponding to the feature data at the predetermined position.

12. A method of controlling an information processing apparatus comprising:
by a first preprocessing arithmetic device which is included in the information processing apparatus and is configured to execute preprocessing for analog data from a sensor, receiving the analog data from the sensor and converting the analog data into digital data;
by the first preprocessing arithmetic device, outputting feature data on the basis of a result of execution of feature extraction processing for the digital data;
by the first preprocessing arithmetic device, outputting the feature data;
by a post-processing arithmetic device which is included in the information processing apparatus and is configured to execute post-processing for first preprocessed data output by the first preprocessing arithmetic device, inputting the feature data;

by the post-processing arithmetic device, storing the feature data; and by the post-processing arithmetic device, store recognition result data in a memory based on a result of execution of recognition processing for the feature data, the post-processing arithmetic device is further coupled to a second preprocessing arithmetic device and a third preprocessing arithmetic device, the first preprocessing arithmetic device, the second preprocessing arithmetic device and the third preprocessing arithmetic device operate in parallel with one another, and the post-processing arithmetic device executes the recognition processing based on a reception of completion notifications from all of the first preprocessing arithmetic device, the second preprocessing arithmetic device and the third preprocessing arithmetic device, the second preprocessing arithmetic device includes a third processor and is configured to execute preprocessing for second analog data from a second sensor which is a sound sensor, the third processor is configured to:

receive analog sound data from the sound sensor and converts the analog sound data into digital sound data; and output sound feature data based on a result of execution of the feature extraction processing for the digital sound data, and the second processor is configured to:

input the sound feature data;

store the sound feature data in the first memory; and store sound recognition result data in the first memory based on a result of execution of the recognition processing for the sound feature data.

\* \* \* \* \*